(12) United States Patent
Chong et al.

(10) Patent No.: US 12,341,662 B2
(45) Date of Patent: *Jun. 24, 2025

(54) COMMUNICATION METHOD AND RELATED DEVICE

(71) Applicant: Huawei Technologies Co., Ltd., Shenzhen (CN)

(72) Inventors: Weiwei Chong, Shenzhen (CN); Xiaobo Wu, Shenzhen (CN); Yang Xin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,983

(22) Filed: Dec. 7, 2022

(65) Prior Publication Data

US 2023/0098662 A1 Mar. 30, 2023

Related U.S. Application Data

(63) Continuation of application No. 17/216,371, filed on Mar. 29, 2021, now Pat. No. 11,646,968, which is a (Continued)

(30) Foreign Application Priority Data

Sep. 30, 2018 (CN) .......................... 201811163075.6

(51) Int. Cl.
*H04L 47/24* (2022.01)
*H04L 41/0894* (2022.01)
(Continued)

(52) U.S. Cl.
CPC .......... *H04L 41/0894* (2022.05); *H04L 41/40* (2022.05); *H04L 43/08* (2013.01);
(Continued)

(58) Field of Classification Search
CPC ....... H04L 47/20; H04L 47/24; H04L 47/627; H04W 72/543
See application file for complete search history.

(56) References Cited

U.S. PATENT DOCUMENTS 11,425,583 B2   8/2022   Lee et al.
2006/0221829 A1  10/2006  Holmstrom et al.
(Continued)

FOREIGN PATENT DOCUMENTS

CN   102306336 A   1/2012
CN   102396259 A   3/2012
(Continued)

OTHER PUBLICATIONS

Huawei, et al., "Solution for Key Issue 5: NWDAF-Assisted QoS Profile Provisioning," SA WG2 Meeting #127, Apr. 16-20, 2018, Sanya, China, S2-185706, 5 pages.
(Continued)

*Primary Examiner* — Melanie Jagannathan
(74) *Attorney, Agent, or Firm* — Conley Rose, P.C.

(57) ABSTRACT

A communication method includes: sending, by a policy control network element, first query information to a data analytics network element, where the first query information is used to obtain service quality information; and receiving, by the policy control network element, first response information sent by the data analytics network element, where the first response information includes the quality information that is of the service and that is requested using the first query information.

26 Claims, 10 Drawing Sheets

Related U.S. Application Data continuation of application No. PCT/CN2019/109035, filed on Sep. 29, 2019.

(51) Int. Cl.
  *H04L 41/40* (2022.01)
  *H04L 43/08* (2022.01)
  *H04L 43/20* (2022.01)
  *H04L 47/20* (2022.01)
  *H04L 47/625* (2022.01)
  *H04W 72/543* (2023.01)

(52) U.S. Cl.
  CPC .............. *H04L 43/20* (2022.05); *H04L 47/20* (2013.01); *H04L 47/24* (2013.01); *H04L 47/627* (2013.01); *H04W 72/543* (2023.01)

(56) References Cited

U.S. PATENT DOCUMENTS

| | | |
|---|---|---|
| 2012/0023236 A1 | 1/2012 | Backholm et al. |
| 2015/0189539 A1 | 7/2015 | Li et al. |
| 2016/0156513 A1 | 6/2016 | Zhang et al. |
| 2017/0332282 A1* | 11/2017 | Dao .................... H04L 1/0002 |
| 2017/0359749 A1 | 12/2017 | Dao |
| 2018/0027463 A1 | 1/2018 | Chen et al. |
| 2018/0199240 A1 | 7/2018 | Dao et al. |
| 2018/0262924 A1 | 9/2018 | Dao et al. |
| 2018/0352050 A1 | 12/2018 | Li et al. |
| 2018/0376445 A1 | 12/2018 | Yoon et al. |
| 2019/0222489 A1* | 7/2019 | Shan ................. H04M 15/8022 |
| 2019/0230645 A1 | 7/2019 | Cheng et al. |
| 2019/0238467 A1 | 8/2019 | Guan et al. |
| 2019/0356558 A1 | 11/2019 | Han et al. |
| 2020/0252813 A1 | 8/2020 | Li et al. |
| 2020/0322845 A1 | 10/2020 | Jeong et al. |
| 2021/0014141 A1 | 1/2021 | Patil et al. |
| 2021/0212010 A1 | 7/2021 | Lee et al. |
| 2021/0367892 A1 | 11/2021 | Young et al. |
| 2022/0264540 A1 | 8/2022 | Panchal et al. |
| 2023/0164877 A1* | 5/2023 | Kim ..................... H04W 76/22 370/328 |
| 2023/0189105 A1* | 6/2023 | Pancorbo Marcos ........................ H04M 15/66 370/235 |
| 2024/0283772 A1* | 8/2024 | Karampatsis ....... H04L 61/4511 |
| 2024/0323828 A1* | 9/2024 | Ianev ................... H04W 48/16 |

FOREIGN PATENT DOCUMENTS

| | | |
|---|---|---|
| JP | 2018515008 A | 6/2018 |
| KR | 20160129189 A | 11/2016 |
| KR | 20180031250 A | 3/2018 |
| RU | 2413372 C2 | 2/2011 |
| WO | 2011050540 A1 | 5/2011 |
| WO | 2014036704 A1 | 3/2014 |
| WO | 2018097601 A1 | 5/2018 |

OTHER PUBLICATIONS

Huawei, et al., "Solution for KI#3: Enhancements for QoS Monitoring and Control," SA WG2 Meeting #127bis, Newport Beach, CA, USA, May 28-Jun. 1, 2018, S2-186278, 3 pages.

Huawei, et al., "Update Solution for Key Issue 5: NWDAF-Assisted QoS Profile Provisioning," SA WG2 Meeting #128, Jul. 2-6, 2018, Vilnius, Lithuania, S2-187197, 5 pages.

3GPP TR 23.791 V1.0.0 (Sep. 2018), "3rd Generation Partnership Project; Technical Specification Group Services and System Aspects; Study of Enablers for Network Automation for 5G (Release 16)," 66 pages.

"3rd Generation Partnership Project; Technical Specification Group Services and System Aspects; Study of Enablers for Network Automation for 5G (Release 16)", 3GPP TR 23.791 V1.1.0, Jan. 1, 2018, XP055787400, 102 pages.

Huawei et al: "Solution for QoS Provisioning and Adjustment", 3GPP Draft; S2-183635, Apr. 10, 2018, XP051437936, 5 pages.

3GPP TS 23.502 V15.3.0, Sep. 2018, "3rd Generation Partnership Project; Technical Specification Group Services and System Aspects; Procedures for the 5G System; Stage 2 (Release 15)," 330 pages.

3GPP TS 23.503 V15.3.0, Sep. 2018, "3rd Generation Partnership Project; Technical Specification Group Services and System Aspects; Policy and Charging Control Framework for the 5G System; Stage 2 (Release 15)," 70 pages.

ITU-T P.1203.3, Oct. 2017, "Series P: Telephone Transmission Quality, Telephone Installations, Local Line Networks. Models and tools for quality assessment of streamed media. Parametric bitstream-based quality assessment of progressive download and adaptive audiovisual streaming services over reliable transport—Quality integration module," 20 pages.

3GPP TR 23.791 V0.6.0, Aug. 2018, "3rd Generation Partnership Project; Technical Specification Group Services and System Aspects; Study of Enablers for Network Automation for 5G (Release 16)," 66 pages.

Huawei, et al., "Discussion about NWDAF interactions with OAM," SA WG2 Meeting #128, Jul. 2-6, 2018, Vilnius, Lithuania, S2-186666, 12 pages.

Huawei, et al., Update Solution for Key Issue 5: NWDAF-Assisted QoS Profile Provisioning, SA WG2 Meeting #128, Jul. 2-6, 2018, Vilnius, Lithuania, S2-187260, 5 pages.

* cited by examiner

COMMUNICATION METHOD AND RELATED DEVICE

CROSS-REFERENCE TO RELATED APPLICATIONS

This is a continuation of U.S. patent application Ser. No. 17/216,371 filed on Mar. 29, 2021, which is a continuation of Int'l Patent App. No. PCT/CN2019/109035 filed on Sep. 29, 2019, which claims priority to Chinese Patent App. No. 201811163075.6 filed on Sep. 30, 2018, all of which are incorporated by reference.

TECHNICAL FIELD

This application relates to the field of communications technologies, and more specifically, to a communication method and a related device.

BACKGROUND

With continuous emergence of various communications services, different communications services have a significant difference in requirements on network performance. However, currently, an effective solution has not been proposed in the industry to obtain an operating status of a service.

SUMMARY

This application provides a communication method and a related device, to help obtain an operating status of a service.

According to a first aspect, an embodiment of this application provides a communication method. The method includes: sending, by a policy control network element, first query information to a data analytics network element, where the first query information is used to obtain service quality information; and receiving, by the policy control network element, first response information sent by the data analytics network element, where the first response information includes the quality information that is of the service and that is requested using the first query information.

With reference to the first aspect, in a possible implementation of the first aspect, the service quality information includes information that reflects a degree to which quality-of-service parameter information of the service satisfies a service requirement.

With reference to the first aspect, in a possible implementation of the first aspect, the first query information includes time information, and the first query information is used to obtain service quality information corresponding to the time information.

With reference to the first aspect, in a possible implementation of the first aspect, the first query information includes space information, and the first query information is used to obtain service quality information corresponding to the space information.

With reference to the first aspect, in a possible implementation of the first aspect, the method further includes: adjusting, by the policy control network element, the quality-of-service parameter information of the service based on the service quality information; or applying, by the policy control network element, the quality-of-service parameter information of the service to the service based on the service quality information.

With reference to the first aspect, in a possible implementation of the first aspect, the adjusting, by the policy control network element, the quality-of-service parameter information of the service based on the service quality information includes: determining, by the policy control network element, that the service quality information is lower than a preset condition; and adjusting, by the policy control network element, the quality-of-service parameter information of the service based on that the service quality information is lower than the preset condition.

With reference to the first aspect, in a possible implementation of the first aspect, the applying, by the policy control network element, the quality-of-service parameter information of the service to the service based on the service quality information includes: determining, by the policy control network element, that the service quality information is not lower than a preset condition; and applying, by the policy control network element, the quality-of-service parameter information of the service to the service based on that the service quality information is not lower than the preset condition.

With reference to the first aspect, in a possible implementation of the first aspect, the adjusting, by the policy control network element, the quality-of-service parameter information of the service based on the service quality information includes: sending, by the policy control network element, first request information to the data analytics network element, where the first request information is used to request a recommended value of the quality-of-service parameter information of the service; receiving, by the policy control network element, at least one group of recommended values that is of the quality-of-service parameter information of the service and that is sent by the data analytics network element; and adjusting, by the policy control network element, a quality-of-service parameter of the service based on the at least one group of recommended values of the quality-of-service parameter information of the service.

With reference to the first aspect, in a possible implementation of the first aspect, the first request information further includes a service quality requirement on the service and/or user category information, and the first request information is used to request a recommended value that is of the quality-of-service parameter information of the service and that corresponds to the service quality requirement and/or the user category information. Additionally, each of the at least one group of recommended values of the quality-of-service parameter information of the service corresponds to the service quality requirement and/or the user category information.

With reference to the first aspect, in a possible implementation of the first aspect, the service quality requirement includes a plurality of service quality requirements on the service.

With reference to the first aspect, in a possible implementation of the first aspect, the service quality requirement includes a mean-opinion-score value range requirement on the service.

With reference to the first aspect, in a possible implementation of the first aspect, the user category information includes a plurality of pieces of user category information.

With reference to the first aspect, in a possible implementation of the first aspect, before the sending first request information, the method further includes: determining, by the policy control network element, that the service is in a test phase.

With reference to the first aspect, in a possible implementation of the first aspect, the first request information further includes first indication information, and the first indication information is used to indicate that the service is in the test phase.

With reference to the first aspect, in a possible implementation of the first aspect, the method further includes: receiving, by the policy control network element, second request information sent by a service server, where the second request information is used to request to set up the service for a first user; and determining, by the policy control network element based on user category information of the first user and/or a service quality requirement of the first user on the service and the at least one group of recommended values of the quality-of-service parameter information of the service, target quality-of-service parameter information that is of the service and that corresponds to the first user.

According to a second aspect, an embodiment of this application provides a communication method. The method includes: receiving, by a data analytics network element, first query information sent by a policy control network element, where the first query information is used to obtain service quality information; and sending, by the data analytics network element, first response information to the policy control network element, where the first response information includes the service quality information that is requested using the first query information.

With reference to the second aspect, in a possible implementation of the second aspect, the service quality information includes information that reflects a degree to which quality-of-service parameter information of the service satisfies a service requirement.

With reference to the second aspect, in a possible implementation of the second aspect, the method further includes: determining, by the data analytics network element, the service quality information based on the first query information.

With reference to the second aspect, in a possible implementation of the second aspect, the first response information includes time information, and the first response information includes service quality information corresponding to the time information.

With reference to the second aspect, in a possible implementation of the second aspect, the first response information includes space information, and the first response information includes service quality information corresponding to the space information.

With reference to the second aspect, in a possible implementation of the second aspect, the method further includes: receiving, by the data analytics network element, first request information sent by the policy control network element, where the first request information is used to request a recommended value of the quality-of-service parameter information of the service; and sending, by the data analytics network element, at least one group of recommended values of the quality-of-service parameter information of the service to the policy control network element.

With reference to the second aspect, in a possible implementation of the second aspect, the first request information further includes a service quality requirement on the service and/or user category information, and the first request information is used to request a recommended value that is of the quality-of-service parameter information of the service and that corresponds to the service quality requirement and/or the user category information; and each of the at least one group of recommended values of the quality-of-service parameter information of the service corresponds to the service quality requirement and/or the user category information.

With reference to the second aspect, in a possible implementation of the second aspect, the method further includes: determining, by the data analytics network element, the at least one group of recommended values of the quality-of-service parameter information of the service based on the first request information.

With reference to the second aspect, in a possible implementation of the second aspect, the service quality requirement includes a plurality of service quality requirements on the service.

With reference to the second aspect, in a possible implementation of the second aspect, the service quality requirement includes a mean-opinion-score value range requirement on the service.

With reference to the second aspect, in a possible implementation of the second aspect, the user category information includes a plurality of pieces of user category information.

With reference to the second aspect, in a possible implementation of the second aspect, the first request information further includes first indication information, and the first indication information is used to indicate that the service is in a test phase.

According to a third aspect, an embodiment of this application provides a communication method. The method includes: sending, by a policy control network element, a service quality classification request message to a data analytics network element, where the service quality classification request message is used to request classification information of service quality; and receiving, by the policy control network element, a service quality classification response message sent by the data analytics network element, where the service quality classification response message includes the classification information of the service quality.

With reference to the third aspect, in a possible implementation of the third aspect, the service quality classification request message includes time information, and the service quality classification request message is used to request classification information that is of the service quality and that corresponds to the time information.

With reference to the third aspect, in a possible implementation of the third aspect, the service quality classification request message includes space information, and the service quality classification request message is used to request classification information that is of the service quality and that corresponds to the space information.

With reference to the third aspect, in a possible implementation of the third aspect, the service quality classification request message includes a first classification quantity, and the first classification quantity is used to indicate, to the data analytics network element, a classification value recommended or expected by the policy control network element on the service quality of the service.

With reference to the third aspect, in a possible implementation of the third aspect, the method further includes: sending, by the policy control network element, first request information to the data analytics network element based on the classification information of the service quality, where the first request information is used to request quality-of-service parameter information of the service; and receiving, by the policy control network element, at least one group of quality-of-service parameter information of the service that is sent by the data analytics network element.

With reference to the third aspect, in a possible implementation of the third aspect, the sending, by the policy control network element, first request information to the data analytics network element based on the classification information of the service quality includes: generating, by the policy control network element, a service quality requirement based on the classification information of the service quality; and sending, by the policy control network element, the first request information to the data analytics network element, where the first request information includes the service quality requirement, and the first request information is used to request quality-of-service parameter information that is of the service and that corresponds to the service quality requirement.

With reference to the third aspect, in a possible implementation of the third aspect, the classification information of the service quality includes a plurality of pieces of classification information of the service.

With reference to the third aspect, in a possible implementation of the third aspect, the classification information of the service quality includes a classification of a mean-opinion-score value range of the service.

With reference to the third aspect, in a possible implementation of the third aspect, before the sending first request information, the method further includes: determining, by the policy control network element, that the service is in a test phase.

With reference to the third aspect, in a possible implementation of the third aspect, the first request information further includes first indication information, and the first indication information is used to indicate that the service is in the test phase.

With reference to the third aspect, in a possible implementation of the third aspect, the method further includes: receiving, by the policy control network element, second request information sent by a service server, where the second request information is used to request to set up the service for a first user; and determining, by the policy control network element based on user category information of the first user and/or a service quality requirement of the first user on the service and a recommended value of the at least one group of quality-of-service parameter information of the service, target quality-of-service parameter information that is of the service and that corresponds to the first user.

According to a fourth aspect, an embodiment of this application provides a communication method. The method includes: receiving, by a data analytics network element, a service quality classification request message sent by a policy control network element, where the service quality classification request message is used to request classification information of service quality; and sending, by the data analytics network element, a service quality classification response message to the policy control network element, where the service quality classification response message includes the classification information of the service quality.

With reference to the fourth aspect, in a possible implementation of the fourth aspect, the data analytics network element determines the classification information of the service quality based on the service quality classification request message.

With reference to the fourth aspect, in a possible implementation of the fourth aspect, the service quality classification response message includes time information, and the service quality classification response message includes classification information that is of the service quality and that corresponds to the time information.

With reference to the fourth aspect, in a possible implementation of the fourth aspect, the service quality classification response message includes space information, and the service quality classification response message includes classification information that is of the service quality and that corresponds to the space information.

With reference to the fourth aspect, in a possible implementation of the fourth aspect, the service quality classification request message includes a first classification quantity, and the first classification quantity is used to indicate, to the data analytics network element, a classification value recommended or expected by the policy control network element on the service quality of the service.

With reference to the fourth aspect, in a possible implementation of the fourth aspect, the method further includes: receiving, by the data analytics network element, first request information sent by the policy control network element, where the first request information is used to request quality-of-service parameter information of the service; and sending, by the data analytics network element, at least one group of quality-of-service parameter information of the service to the policy control network element.

With reference to the fourth aspect, in a possible implementation of the fourth aspect, the method further includes: determining, by the data analytics network element, the at least one group of quality-of-service parameter information of the service based on the first request information.

With reference to the fourth aspect, in a possible implementation of the fourth aspect, the first request information includes the service quality requirement, the service quality requirement is generated by the policy control network element based on the classification information of the service quality, and the first request information is used to request quality-of-service parameter information that is of the service and that corresponds to the service quality requirement. Additionally, the data analytics network element sends, to the policy control network element, at least one group of quality-of-service parameter information that is of the service and that corresponds to the service quality requirement.

With reference to the fourth aspect, in a possible implementation of the fourth aspect, the service quality requirement includes a plurality of service quality requirements on the service.

With reference to the fourth aspect, in a possible implementation of the fourth aspect, the service quality requirement includes a mean-opinion-score value range requirement on the service.

With reference to the fourth aspect, in a possible implementation of the fourth aspect, the first request information further includes first indication information, and the first indication information is used to indicate that the service is in a test phase.

With reference to the fourth aspect, in a possible implementation of the fourth aspect, the classification information of the service quality includes a plurality of pieces of classification information of the service.

With reference to the fourth aspect, in a possible implementation of the fourth aspect, the classification information of the service quality includes a classification of a mean-opinion-score value range of the service.

According to a fifth aspect, an embodiment of this application provides a quality-of-service parameter obtaining method. The method includes: sending, by a policy control network element, first request information to a data analytics network element, where the first request information includes identification information of a service, and the first request information is used to request quality-of-service parameter information of the service; and receiving, by the policy control network element, at least one group of quality-of-service parameter information of the service that is sent by the data analytics network element.

With reference to the fifth aspect, in a possible implementation of the fifth aspect, the first request information further includes a service quality requirement on the service and/or user category information, and the first request information is used to request quality-of-service parameter information that is of the service and that corresponds to the service quality requirement and/or the user category information. Additionally, each of the at least one group of quality-of-service parameter information of the service corresponds to the service quality requirement and/or the user category information.

With reference to the fifth aspect, in a possible implementation of the fifth aspect, before the sending first request information, the method further includes: determining, by the policy control network element, that the service is in a test phase.

With reference to the fifth aspect, in a possible implementation of the fifth aspect, the first request information further includes first indication information, and the first indication information is used to indicate that the service is in the test phase.

With reference to the fifth aspect, in a possible implementation of the fifth aspect, the method further includes: sending, by the policy control network element, first cancellation information to the data analytics network element after the test phase ends, where the first cancellation information is used to instruct to cancel obtaining the quality-of-service parameter information that is of the service and that corresponds to the service quality requirement and/or the user category information.

With reference to the fifth aspect, in a possible implementation of the fifth aspect, the service quality requirement includes a plurality of service quality requirements on the service.

With reference to the fifth aspect, in a possible implementation of the fifth aspect, the user category information includes a plurality of pieces of user category information.

With reference to the fifth aspect, in a possible implementation of the fifth aspect, the service quality requirement includes a mean-opinion-score value range requirement on the service.

With reference to the fifth aspect, in a possible implementation of the fifth aspect, the method further includes: receiving, by the policy control network element, at least one piece of service quality information that is sent by the data analytics network element, where the at least one piece of service quality information is in a one-to-one correspondence with the at least one group of quality-of-service parameter information of the service. Additionally, each of the at least one piece of service quality information is used to indicate a degree to which a corresponding quality-of-service parameter of the service satisfies the service quality requirement.

With reference to the fifth aspect, in a possible implementation of the fifth aspect, the method further includes: receiving, by the policy control network element, second request information sent by a service server, where the second request information is used to request to set up the service for a first user; and determining, by the policy control network element based on user category information of the first user and/or a service quality requirement of the first user on the service and the at least one group of quality-of-service parameter information of the service, target quality-of-service parameter information that is of the service and that corresponds to the first user.

With reference to the fifth aspect, in a possible implementation of the fifth aspect, the determining target quality-of-service parameter information that is of the service and that corresponds to the first user includes: determining, based on the at least one piece of service quality information, the target quality-of-service parameter information that is of the service and that corresponds to the first user.

With reference to the fifth aspect, in a possible implementation of the fifth aspect, the method further includes: sending, by the policy control network element to the data analytics network element, the target quality-of-service parameter information that is of the service and that corresponds to the first user.

With reference to the fifth aspect, in a possible implementation of the fifth aspect, the method includes: sending, by the policy control network element to the data analytics network element, service quality information that corresponds to the target quality-of-service parameter information that is of the service and that corresponds to the first user.

With reference to the fifth aspect, in a possible implementation of the fifth aspect, before the sending, by a policy control network element, first request information to a data analytics network element, the method further includes: receiving, by the policy control network element, third request information sent by the service server, where the third request information is used to request to set up the service for a second user; and determining, by the policy control network element, the service quality requirement and/or the user category information based on the third request information, where the service quality requirement is a service quality requirement of the second user on the service, and the user category information is user category information of the second user.

With reference to the fifth aspect, in a possible implementation of the fifth aspect, the method further includes: determining, by the policy control network element based on the at least one group of quality-of-service parameter information of the service, target quality-of-service parameter information that is of the service and that corresponds to the second user.

With reference to the fifth aspect, in a possible implementation of the fifth aspect, the determining target quality-of-service parameter information that is of the service and that corresponds to the second user includes: determining, based on the at least one piece of service quality information, the target quality-of-service parameter information that is of the service and that corresponds to the second user.

With reference to the fifth aspect, in a possible implementation of the fifth aspect, the method further includes: sending, by the policy control network element to the data analytics network element, the target quality-of-service parameter information that is of the service and that corresponds to the second user.

With reference to the fifth aspect, in a possible implementation of the fifth aspect, the method further includes: sending, by the policy control network element to the data analytics network element, service quality information that corresponds to the target quality-of-service parameter information that is of the service and that corresponds to the second user.

According to a sixth aspect, an embodiment of this application provides a quality-of-service parameter obtaining method. The method includes: determining, by a data analytics network element, at least one group of quality-of-service parameter information of a service, where each of the at least one group of quality-of-service parameter information of the service corresponds to a service quality requirement on the service and/or user category information; and sending, by the data analytics network element, the at least one group of quality-of-service parameter information of the service to a policy control network element.

With reference to the sixth aspect, in a possible implementation of the sixth aspect, the method further includes: sending, by the data analytics network element, at least one piece of service quality information to the policy control network element, where each of the at least one piece of service quality information is in a one-to-one correspondence with each group of quality-of-service parameters information of the service in the at least one group of quality-of-service parameter information of the service. Additionally, each piece of service quality information is used to indicate a degree to which a corresponding quality-of-service parameter of the service satisfies the service quality requirement.

With reference to the sixth aspect, in a possible implementation of the sixth aspect, the service quality requirement includes a plurality of service quality requirements on the service.

With reference to the sixth aspect, in a possible implementation of the sixth aspect, the user category information includes a plurality of pieces of user category information.

With reference to the sixth aspect, in a possible implementation of the sixth aspect, the service quality requirement includes a mean-opinion-score value range requirement on the service.

With reference to the sixth aspect, in a possible implementation of the sixth aspect, the method further includes: obtaining, by the data analytics network element, the service quality requirement and/or the user category information from a service server of the service.

With reference to the sixth aspect, in a possible implementation of the sixth aspect, the method further includes: receiving, by the data analytics network element, first request information sent by the policy control network element, where the first request information includes identification information of the service, the first request information further includes the service quality requirement and/or the user category information. Additionally, the first request information is used to request quality-of-service parameter information that is of the service and that corresponds to the service quality requirement and/or the user category information.

With reference to the sixth aspect, in a possible implementation of the sixth aspect, the method further includes: the first request message includes first indication information, and the first indication information is used to indicate that the service is in a test phase.

With reference to the sixth aspect, in a possible implementation of the sixth aspect, the determining, by a data analytics network element, at least one group of quality-of-service parameter information of a service includes: determining, by the data analytics network element based on user-level historical service quality data of the service and historical network data corresponding to the user-level historical service quality data, the at least one group of quality-of-service parameter information of the service.

With reference to the sixth aspect, in a possible implementation of the sixth aspect, the method further includes: receiving, by the data analytics network element, target quality-of-service parameter information that is sent by the policy control network element and that corresponds to the service quality requirement and/or the user category information.

With reference to the sixth aspect, in a possible implementation of the sixth aspect, the method further includes: receiving, by the data analytics network element, quality information that is of the service and corresponds to the target quality-of-service parameter information and that is sent by the policy control network element.

With reference to the sixth aspect, in a possible implementation of the sixth aspect, the method further includes: receiving, by the data analytics network element, first cancellation information sent by the policy control network element, where the first cancellation information is used to cancel obtaining the quality-of-service parameter information that is of the service and that corresponds to the service quality requirement of the service and/or the user category information.

According to a seventh aspect, an embodiment of this application provides a quality-of-service parameter obtaining method. The method includes: determining, by a data analytics network element, at least one group of quality-of-service parameter information of a service, where each of the at least one group of quality-of-service parameter information corresponds to a service quality requirement on the service and/or user category information.

With reference to the seventh aspect, in a possible implementation of the seventh aspect, the service quality requirement on the service includes a plurality of service quality requirements on the service.

With reference to the seventh aspect, in a possible implementation of the seventh aspect, the service quality requirement on the service includes a mean-opinion-score value range requirement.

With reference to the seventh aspect, in a possible implementation of the seventh aspect, the user category information includes a plurality of pieces of user category information.

With reference to the seventh aspect, in a possible implementation of the seventh aspect, the method further includes: obtaining, by the data analytics network element, the service quality requirement on the service and/or the user category information from a service server of the service.

With reference to the seventh aspect, in a possible implementation of the seventh aspect, the determining, by a data analytics network element, at least one group of quality-of-service parameter information of a service includes: determining, by the data analytics network element based on user-level historical service quality data of the service and historical network data corresponding to the user-level historical service quality data, the at least one group of quality-of-service parameter information of the service.

With reference to the seventh aspect, in a possible implementation of the seventh aspect, the user-level historical service quality data of the service includes user-level historical service quality observation data of the service or user-level historical service quality evaluation data of the service.

With reference to the seventh aspect, in a possible implementation of the seventh aspect, the method further includes: obtaining, by the data analytics network element, the user-level historical service quality evaluation data of the service from a first device.

With reference to the seventh aspect, in a possible implementation of the seventh aspect, the first device includes a network data analytics function (NWDAF).

With reference to the seventh aspect, in a possible implementation of the seventh aspect, the method further includes: receiving, by the data analytics network element, a fourth request sent by the service server of the service, where the fourth request is used to request to set up the service for a third user; determining, by the data analytics network element based on the at least one group of quality-of-service parameter information, target quality-of-service parameter information that is of the service and that corresponds to the third user; and sending, by the data analytics network element, the target quality-of-service parameter information to a core network element.

With reference to the seventh aspect, in a possible implementation of the seventh aspect, the determining, by the data analytics network element based on the at least one group of quality-of-service parameter information, target quality-of-service parameter information that is of the service and that corresponds to the third user includes: receiving, by the data analytics network element, user-level service quality evaluation data that is of the service and corresponds to the third user and that is sent by the first device; and determining, by the data analytics network element based on the at least one group of quality-of-service parameter information and the user-level service quality evaluation data that is of the service and that corresponds to the third user, the target quality-of-service parameter information that is of the service and that corresponds to the third user.

With reference to the seventh aspect, in a possible implementation of the seventh aspect, the user-level service quality evaluation data that is of the service and that corresponds to the third user includes a user-level service quality value range that is evaluated by the first device and that corresponds to the third user.

According to an eighth aspect, an embodiment of this application provides a quality-of-service parameter obtaining method. The method includes: obtaining, by a first network device, user-level historical service quality observation data of a service from a server of the service; obtaining, by the first network device from a network, historical network data corresponding to the user-level historical service quality observation data of the service; and obtaining, by the first network device, user-level service quality evaluation data of the service based on the historical service quality observation data and the historical network data.

With reference to the eighth aspect, in a possible implementation of the eighth aspect, the method further includes: sending, by the first network device, the user-level service quality evaluation data of the service to the policy control function (PCF).

With reference to the eighth aspect, in a possible implementation of the eighth aspect, the method further includes: receiving, by the first network device, fifth request information sent by the PCF, where the fifth request information is used to request user-level service quality evaluation data that is of the service and that corresponds to a third user; and sending, by the first network device to the PCF, the user-level service quality evaluation data that is of the service and that corresponds to the third user.

With reference to the eighth aspect, in a possible implementation of the eighth aspect, the user-level service quality evaluation data that is of the service and that corresponds to the third user includes a user-level service quality value range that corresponds to the third user and that is evaluated by the first network device.

According to a ninth aspect, an embodiment of this application provides a network device, where the network device includes units configured to implement the method according to any one of the first aspect or the possible implementations of the first aspect.

According to a tenth aspect, an embodiment of this application provides a network device, where the network device includes units configured to implement the method according to any one of the second aspect or the possible implementations of the second aspect.

According to an eleventh aspect, an embodiment of this application provides a network device, where the network device includes units configured to implement the method according to any one of the third aspect or the possible implementations of the third aspect.

According to a twelfth aspect, an embodiment of this application provides a network device, where the network device includes units configured to implement the method according to any one of the fourth aspect or the possible implementations of the fourth aspect.

According to a thirteenth aspect, an embodiment of this application provides a network device, where the network device includes units configured to implement the method according to any one of the fifth aspect or the possible implementations of the fifth aspect.

According to a fourteenth aspect, an embodiment of this application provides a network device, where the network device includes units configured to implement the method according to any one of the sixth aspect or the possible implementations of the sixth aspect.

According to a fifteenth aspect, an embodiment of this application provides a network device, where the network device includes units configured to implement the method according to any one of the seventh aspect or the possible implementations of the seventh aspect.

According to a sixteenth aspect, an embodiment of this application provides a network device, where the network device includes units configured to implement the method according to any one of the eighth aspect or the possible implementations of the eighth aspect.

According to a seventeenth aspect, an embodiment of this application provides a storage medium, where the storage medium stores an instruction used to implement the method according to any one of the first aspect or the possible implementations of the first aspect.

According to an eighteenth aspect, an embodiment of this application provides a storage medium, where the storage medium stores an instruction used to implement the method according to any one of the second aspect or the possible implementations of the second aspect.

According to a nineteenth aspect, an embodiment of this application provides a storage medium, where the storage medium stores an instruction used to implement the method according to any one of the third aspect or the possible implementations of the third aspect.

According to a twentieth aspect, an embodiment of this application provides a storage medium, where the storage medium stores an instruction used to implement the method according to any one of the fourth aspect or the possible implementations of the fourth aspect.

According to a twenty-first aspect, an embodiment of this application provides a storage medium, where the storage medium stores an instruction used to implement the method according to any one of the fifth aspect or the possible implementations of the fifth aspect.

According to a twenty-second aspect, an embodiment of this application provides a storage medium, where the storage medium stores an instruction used to implement the method according to any one of the sixth aspect or the possible implementations of the sixth aspect.

According to a twenty-third aspect, an embodiment of this application provides a storage medium, where the storage medium stores an instruction used to implement the method according to any one of the seventh aspect or the possible implementations of the seventh aspect.

According to a twenty-fourth aspect, an embodiment of this application provides a storage medium, where the storage medium stores an instruction used to implement the method according to any one of the eighth aspect or the possible implementations of the eighth aspect.

According to a twenty-fifth aspect, this application provides a computer program product including an instruction. When the computer program product is run on a computer, the computer is enabled to perform the method according to any one of the first aspect or the possible implementations of the first aspect.

According to a twenty-sixth aspect, this application provides a computer program product including an instruction. When the computer program product is run on a computer, the computer is enabled to perform the method according to any one of the second aspect or the possible implementations of the second aspect.

According to a twenty-seventh aspect, this application provides a computer program product including an instruction. When the computer program product is run on a computer, the computer is enabled to perform the method according to any one of the third aspect or the possible implementations of the third aspect.

According to a twenty-eighth aspect, this application provides a computer program product including an instruction. When the computer program product is run on a computer, the computer is enabled to perform the method according to any one of the fourth aspect or the possible implementations of the fourth aspect.

According to a twenty-ninth aspect, this application provides a computer program product including an instruction. When the computer program product is run on a computer, the computer is enabled to perform the method according to any one of the fifth aspect or the possible implementations of the fifth aspect.

According to a thirtieth aspect, this application provides a computer program product including an instruction. When the computer program product is run on a computer, the computer is enabled to perform the method according to any one of the sixth aspect or the possible implementations of the sixth aspect.

According to a thirty-first aspect, this application provides a computer program product including an instruction. When the computer program product is run on a computer, the computer is enabled to perform the method according to any one of the seventh aspect or the possible implementations of the seventh aspect.

According to a thirty-second aspect, this application provides a computer program product including an instruction. When the computer program product is run on a computer, the computer is enabled to perform the method according to any one of the eighth aspect or the possible implementations of the eighth aspect.

According to a thirty-third aspect, this application provides a chip, where the chip is configured to perform the method according to any one of the first aspect or the possible implementations of the first aspect.

According to a thirty-fourth aspect, this application provides a chip, where the chip is configured to perform the method according to any one of the second aspect or the possible implementations of the second aspect.

According to a thirty-fifth aspect, this application provides a chip, where the chip is configured to perform the method according to any one of the third aspect or the possible implementations of the third aspect.

According to a thirty-sixth aspect, this application provides a chip, where the chip is configured to perform the method according to any one of the fourth aspect or the possible implementations of the fourth aspect.

According to a thirty-seventh aspect, this application provides a chip, where the chip is configured to perform the method according to any one of the fifth aspect or the possible implementations of the fifth aspect.

According to a thirty-eighth aspect, this application provides a chip, where the chip is configured to perform the method according to any one of the sixth aspect or the possible implementations of the sixth aspect.

According to a thirty-ninth aspect, this application provides a chip, where the chip is configured to perform the method according to any one of the seventh aspect or the possible implementations of the seventh aspect.

According to a fortieth aspect, this application provides a chip, where the chip is configured to perform the method according to any one of the eighth aspect or the possible implementations of the eighth aspect.

DESCRIPTION OF EMBODIMENTS

Figure 1:
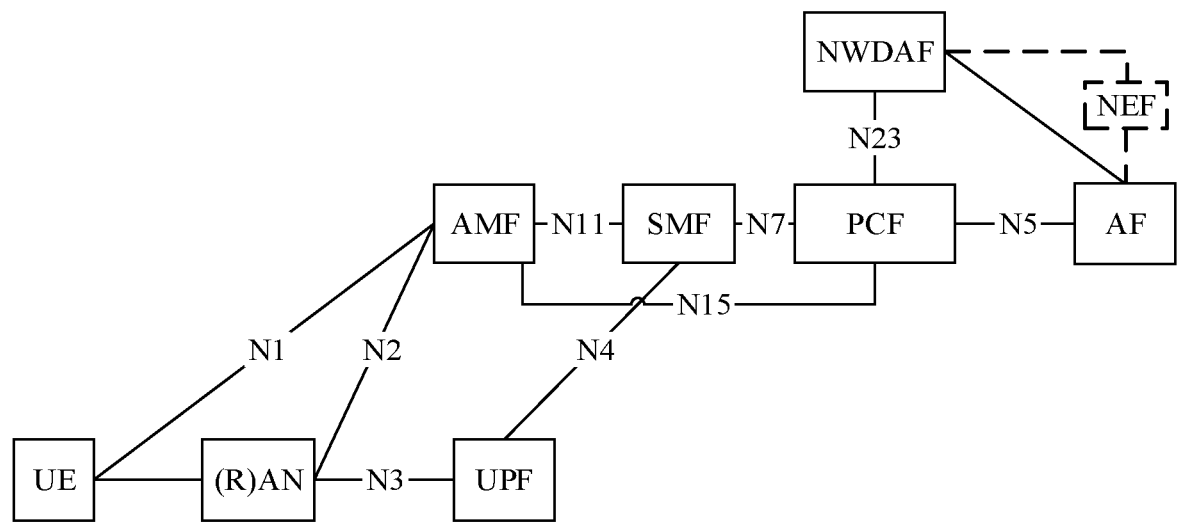
FIG. 1 is a schematic architectural diagram of a communications system according to an embodiment of this application.

The following describes technical solutions of this application with reference to the accompanying drawings.

In this application, "at least one" refers to one or more, "a plurality of" refers to two or more, and "and/or" describes an association relationship for describing associated objects and represents that three relationships may exist. For example, A and/or B may represent the following three cases: Only A exists, both A and B exist, and only B exists. A and B may be singular or plural. The character "/" generally indicates an "or" relationship between associated objects, and "at least one of the following" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural. In addition, in the embodiments of this application, words such as "first" and "second" do not limit a quantity and an execution sequence.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in an example manner.

The technical solutions in the embodiments of this application may be applied to a $5^{th}$ generation (5G) system, New Radio (NR) system, a future communications network, or the like.

First, for ease of understanding the embodiments of this application, some technical terms in the embodiments of this application are described.

A slice network described in the embodiments of this application may be one of a network slice, a network slice instance, or a network slice subnet instance.

The network slice (NS) may also be referred to as a slice for short. Network slices are different logical networks customized on a physical or virtual network infrastructure based on service requirements of different tenants on services. The network slice may be a complete end-to-end network that includes a terminal device, an access network, a transmission network, a core network, and a service server, or may include only a core network and be assisted with a terminal device, an access network, a transmission network, and a service server. The network slice can provide a complete communications service and has a network capability. The network slice may be a communications resource for ensuring that a bearer service or a service can meet a service level agreement requirement, or may be considered as a combination of a network function and a communications resource that are required for completing a communications service or some communications services. A network slice is identified using single network slice selection assistance information (S-NSSAI). The S-NSSAI includes a slice/service type (SST) and a slice differentiator (SD). The SST and the SD may be defined in a standard or defined by an operator. The SD is optional information for supplementing the SST, to distinguish between a plurality of network slices having a same SST. For example, the SD may be used to represent a homing relationship of a network slice.

The network slice instance (NSI) may also be referred to as a slice instance network, is an instantiated network created by an operator on an infrastructure based on a network slice template, and is formed by integrating different network function entities and physical resources. Different network slice instances are logically isolated from each other. One network slice may be instantiated into one or more NSIs, and each NSI is identified using a network slice instance identifier (NSI ID). In other words, one piece of S-NSSAI corresponds to one or more NSI IDs.

The network slice subnet instance (NSSI) may also be referred to as a slice subnet instance network, and includes a set of network function network elements and resources orchestrated and configured for these function network elements, to form a local logical network. The network slice subnet instance is introduced mainly to facilitate management of a network slice instance. For example, a network slice is divided into two network slice subnet instances based on a core network element and an access network element, to respectively orchestrate and configure a core network resource and an access network resource, to facilitate management.

A service level agreement (SLA) is a contract between a service provider and a customer of the service provider, and is used to record an application service provided by the service provider and define a performance criterion that the service provider is obliged to meet. The SLA can establish an expectation of the customer to the service provider in terms of performance and quality. The SLA may include a series of qualitative or quantitative rules such as availability, a performance indicator baseline, reliability, and a response time.

A tenant is a customer that leases a communications operator network and provides one or more services for a user of the tenant using the network. The tenant may be a tenant in a vertical industry, a tenant in the over-the-top (OTT) industry, or another third-party tenant. In addition, the operator network leased by the tenant may be a network slice, a slice network instance in a slice network, a slice network subnet instance, or another type of network. This is not specifically limited in the embodiments of this application.

FIG. 1 is a schematic architectural diagram of a communications system according to an embodiment of this application. The communications system includes a data analytics network element, a policy control network element, an application function (AF) network element (also referred to as a service server), a core network element, a radio access network (RAN) element or access network (AN) element, a terminal device, and a network exposure function (NEF) network element. The data analytics network element may be a network data analytics function (NWDAF) network element, the policy control network element may be a policy control function (PCF) network element, and the core network element may include a session management function (SMF) network element, an access and mobility function (AMF) network element, and a user plane function (UPF) network element. The terminal device may be a user equipment (UE).

The NWDAF network element may be deployed inside a core network, in other words, the NWDAF is also a core network element. Alternatively, the NWDAF network element may not be deployed inside a core network. This is not specifically limited in this embodiment of this application. In addition, the NWDAF may directly communicate, through a service interface, with a network element that the NWDAF needs to communicate with. For example, the network data analytics device may communicate, through the service interface, with network elements such as the PCF, the SMF, the AMF, the UPF, an NRF, and the RAN by invoking different services of the service interface.

It may be understood that in the communications system shown in FIG. 1, functions and interfaces of the network elements are merely examples. When the network elements are applied to the embodiments of this application, not all functions are necessary. In addition, in this application, the network elements may communicate with each other based on a point-to-point interface. For example, the NWDAF is connected to the PCF network element through an N23 interface. The PCF is connected to the AF network element through an N5 interface, is connected to the SMF network element through an N7 interface, and is connected to the AMF network element through an N15 interface. The PCF may formulate a dynamic QoS policy, and distribute corresponding policies to network elements such as the SMF and the AMF. The UPF is connected to the SMF network element through an N4 interface, and is connected to the RAN network element through an N3 interface. The AN is connected to the AMF network element through an N2 interface. The UE is connected to the AMF network element through an N1 interface. FIG. 1 shows only some of the interfaces listed above.

The terminal device includes but is not limited to: a user equipment (UE), a subscriber unit, a subscriber station, a mobile station, a remote station, a remote terminal device, a mobile terminal device, a user terminal device, a wireless communications device, a user agent, a user apparatus, a cellular phone, a cordless phone, a session initiation protocol (SIP) phone, a wireless local loop (WLL) station, a personal digital assistant (DA), a handheld device having a wireless communication function, a computing device, a processing device connected to a wireless modem, a vehicle-mounted device, a wearable device, a terminal device in the internet of things, a household appliance, a virtual reality device, a terminal device in a future 5G network, a terminal device in a future evolved public land mobile network (PLMN), and the like.

The application function network element is a server side providing a type of service for a user, and therefore may also be referred to as an application server or a service server.

The access network element may be a network element that communicates with the terminal device. The access network element may provide communication coverage for a particular geographic area, and may communicate with a terminal device in a coverage area (a cell). The access network element may communicate with any quantity of terminal devices. There may be a plurality of air interface connections between the access network element and the terminal device. For example, there are two air interface connections between the access network element and the terminal device, and the two air interface connections are respectively used to transmit a data flow A and a data flow B. The access network element may support communication protocols of different standards, or may support different communication modes. For example, the access network element may be a 5G base station, a next-generation NodeB (gNB), an evolved NodeB (eNodeB), a Wi-Fi access point (Wi-Fi AP), a worldwide interoperability for microwave access base station (WiMAX BS), or a radio controller in a cloud radio access network (CRAN). Alternatively, the network device may be an access network device in a future evolved PLMN, or the like.

The PCF network element has a policy control decision function, and provides a policy for a network. The AMF network element is used for mobility management, lawful interception, access authorization, authentication, and the like. The SMF network element is configured to implement session and bearer management, address allocation, and the like. The user plane function network element is used for functions such as routing and forwarding, threshold control, traffic monitoring, and verification of user plane data. A network repository function network element is configured to provide a function of service discovery or network element discovery and a function of maintaining a feature of a network element and a service supported by the network element. A transmission network element has a function of transmitting network data. For example, the transmission network element may be a router.

The NWDAF has data statistics and analysis functions, and may be configured to collect and analyze related data from a network element, a third-party service server, a terminal device, or a network management system, and provide a data analysis result for the network element, the third-party service server, the terminal device, or the network management system based on the related data. The analysis result may assist a network in selecting a quality-of-service parameter of a service, performing traffic routing, selecting a background traffic transmission policy, and so on. In the embodiments of this application, the data analytics device may further be configured to provide a network (for example, network slice or network slice instance) analysis result, such that the network performs network (for example, network slice or network slice instance) deployment or adjusts network resources based on the analysis result.

The network exposure function (NEF) network element has a function of providing or exposing a function of an operator network to an external server or an external device, and serves as an intermediate medium for internal and external communication of a network. For example, when an untrusted third-party service server needs to communicate with an interior of the network, the network exposure function network element needs to perform forwarding and processing operations. Certainly, when a service server inside the network or a trusted third-party service server communicates with the interior of the network, the network exposure function network element may not be required.

In the embodiments of this application, the access network device and all or some network elements in the core network may belong to a $3^{rd}$ generation partnership project (3GPP) network, or may belong to a non-3GPP network, for example, an enterprise intranet. All or some network elements in the core network may be physical network elements, or may be virtualized network elements. This is not limited herein.

The data analytics network element in this application is a network element that can provide a data analytics function. The data analytics function in this application may be deployed on the network data analytics function (NWDAF) network element, or may be deployed on another network element. In other words, the data analytics network element in this application may include but is not limited to the NWDAF. The data analytics network element may be a network element that is located on a control plane of the core network and that has the data analytics function in this application, or may be a network element that is located on a network management plane and that has the data analytics function in this application.

The policy control network element in this application is a network element that can provide a policy control function. The policy control function in this application may be deployed on the policy control function (PCF) network element, or may be deployed on another network element. In other words, the policy control network element in this application may include but is not limited to the PCF.

In addition, the data analytics function and another function may be combined and deployed on a same network element. For example, the data analytics function and the policy control function may be deployed together. In this case, the data analytics network element and the policy control network element are physically a same entity.

In addition, service quality described in the embodiments of this application may also be referred to as service experience.

Figure 2:
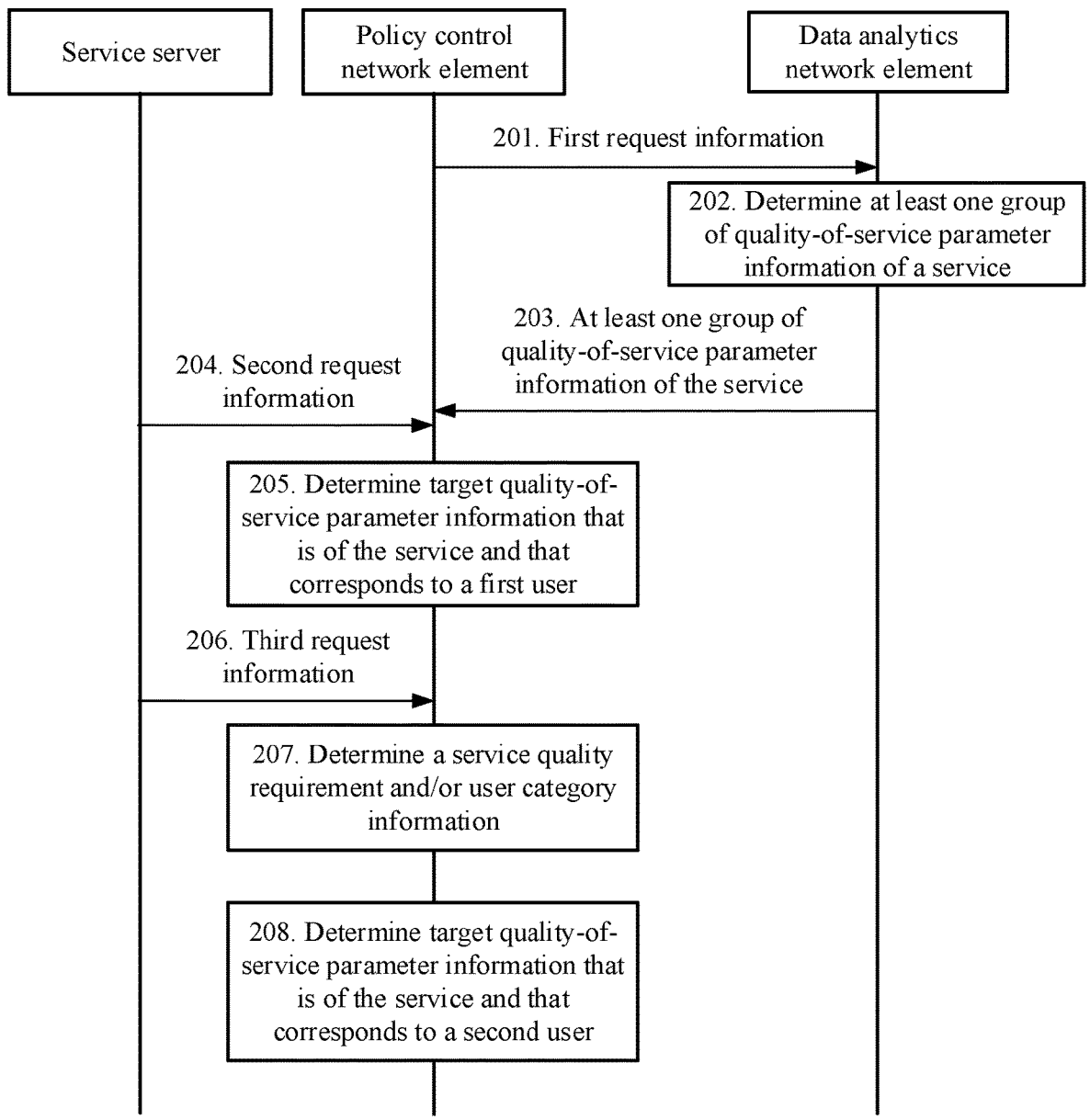
FIG. 2 is a schematic flowchart of a quality-of-service parameter obtaining method according to an embodiment of this application.

FIG. 2 is a schematic flowchart of a quality-of-service parameter obtaining method according to an embodiment of this application.

201. A policy control network element sends first request information to a data analytics network element, where the first request information includes identification information of a service, and the first request information is used to request quality-of-service parameter information of the service. Correspondingly, the data analytics network element receives the first request information sent by the policy control network element.

In some embodiments, the first request information further includes a service quality requirement on the service and/or user category information. In this case, the first request information is used to request quality-of-service parameter information that is of the service and that corresponds to the service quality requirement and/or the user category information. The identification information of the service is used to uniquely identify the service. The identification information of the service may be an identifier corresponding to the service, a type of the service, or a name of the service. For example, in some embodiments, different services may correspond to different identifiers. For example, an identifier of a voice service may be an identifier 1, an identifier of a data service may be an identifier 2, and an identifier of a video service may be an identifier 3. In this case, the identification information of the service may be the identifier of the service. For another example, in some embodiments, the identification information of the service may alternatively be a specific service type. For example, the identification information of the service may be a voice service type, the identification information of the service is a data service type, or the identification information of the service is a video service type.

Unless otherwise specified, the service quality requirement in this embodiment of this application is a user-level service quality requirement. The user-level service quality requirement may be equivalent to a single-user service quality requirement, to be more specific, an experience requirement of a single user on the service. For example, that the service quality requirement is 5>MOS>4.5 indicates that a mean opinion score (MOS) of a single user is greater than 4.5 and less than 5.

In some embodiments, the service quality requirement may include one service quality requirement on the service. In some other embodiments, the service quality requirement may include a plurality of service quality requirements on the service.

In some embodiments, the user category information may include one piece of user category information. In some other embodiments, the user category information may include a plurality of pieces of user category information. Usually, one piece of user category information corresponds to one service quality requirement, and a plurality of different user categories correspond to a plurality of different service quality requirements.

In some embodiments, the first request information includes the identification information of the service and the service quality requirement. In this case, the first request information is used to request quality-of-service parameter information that is of the service and that corresponds to the service quality requirement.

Optionally, in some embodiments, the service quality requirement includes a mean-opinion-score value range requirement on the service.

For example, Table 1 shows an example of the first request information. It may be understood that although the first request information shown in Table 1 includes three service quality requirements, a possibility that the first request information includes only one service quality requirement is not excluded from this application.

TABLE 1

| Identification information of a service | Service quality requirement |
|---|---|
| Voice service | 5 > MOS > 4.5 |
|  | 4.5 > MOS > 4 |
|  | 4 > MOS > 3 |

A service indicated by the identification information of the service that is included in the first request information shown in Table 1 is a voice service. The first request information includes three service quality requirements on the voice service. The three service quality requirements shown in Table 1 are respectively that a mean opinion score (MOS) of the service is greater than 3 and less than 4, the MOS is greater than 4 and less than 4.5, and the MOS is greater than 4.5 and less than 5. It may be understood that a value requirement on the MOS herein is an example of a single-user service quality requirement on the voice service. It can be learned that the service quality requirement shown in Table 1 is the mean-opinion-score value range requirement on the service.

In some other embodiments, the service quality requirement may alternatively be another requirement, for example, a call completion rate requirement, a payment success rate requirement, a data packet loss rate requirement, or an average data packet transmission latency requirement.

In this application, single-user service quality is data for evaluating service experience of a single user. Correspondingly, the single-user service quality requirement is a requirement on the data for evaluating service experience of each user. A method for evaluating service experience of each user may be determined by a service provider. For example, a voice service server determines to evaluate single-user voice service quality using the MOS. A value range of the MOS is [0, 5], and a higher MOS indicates better voice service experience of a user. In this case, the service quality requirement on the voice service may be a requirement on a value of the MOS. How to calculate a MOS of each user belongs to an internal calculation method, and is not within the discussion scope of this patent. For the video service, a video service server determines to evaluate video service experience of each user using a video mean opinion score (vMOS), and methods for calculating the MOS and the vMOS are different. In this case, a service quality requirement on the video service may be a requirement on a value of the vMOS. Herein, evaluating the single-user service quality using the MOS and the vMOS is merely two examples for the voice service and the video service for description. For another type of service, there are a plurality of other methods for evaluating the single-user service quality. For example, for the data service, single-user service quality of the data service may be evaluated comprehensively using parameters such as a data packet loss rate and an average data packet transmission latency. In this case, a service quality requirement on the data service may be a comprehensive requirement on the plurality of parameters. This is not limited in this patent.

In some embodiments, the first request information includes the identification information of the service and the user category information. In this case, the first request information is used to request quality-of-service parameter information that is of the service and that corresponds to the user category information.

For example, Table 2 shows an example of the first request information. It may be understood that although the first request information shown in Table 2 includes a plurality of pieces of user category information, a possibility that the first request information includes only one piece of user category information is not excluded from this application.

TABLE 2

| Identification information of a service | User category |
|---|---|
| Voice service | Gold user |
| | Silver user |
| | Bronze user |

A service indicated by the identification information of the service that is included in the first request information shown in Table 2 is a voice service. The first request information includes three pieces of user category information that are respectively a gold user, a silver user, and a bronze user.

The gold user, the silver user, and the bronze user are examples for indicating user categories. Alternatively, the user categories may be classified in another manner, for example, are classified into a high-priority user, a medium-priority user, and a low-priority user. That is, the user category information may alternatively be user priority information. How to classify the user categories is not limited in this embodiment of this application.

In some embodiments, the first request information may further include an identifier of a slice network on which the service is located. The identifier of the slice network may be single network slice selection assistance information (S-NS-SAI), a network slice instance identifier (NSI ID), a network slice subnet instance identifier (NSSI ID), or the like.

In some embodiments, the service quality requirement may be a service quality requirement corresponding to one or more pieces of time information. To be more specific, the first request information may be used to request quality-of-service parameter information that is for the one or more pieces of time information and that is of the service and corresponds to the service quality requirement and/or the user category information. In this scenario, the first request information may further include the one or more pieces of time information. A specific form of the time information is not limited in this embodiment of this application, as long as that the time information can reflect a time. For example, the time information may be divided by hour. For example, first time information is from 8:00 to 10:00, and second time information is from 10:00 to 12:00. For another example, the time information may alternatively be divided by day. For example, first time information is from the first day to the tenth day of each month, and second time information is from the eleventh day to the twentieth day of each month. For another example, the time information may alternatively be divided by a time length after power-on performed by a user. For example, first time information is from the zeroth to the fourth hour after the power-on, and second time information is from the fourth to the eighth hour after the power-on. Table 3 shows an example of the first request information.

TABLE 3

| Identification information of a service | Time information | Service quality requirement |
|---|---|---|
| Voice service | Time information 1 | 5 > MOS > 4.5 |
| | | 4.5 > MOS > 4 |
| | | 4 > MOS > 3 |
| | Time information 2 | 5 > MOS > 4 |
| | | 4 > MOS > 3.5 |
| | | 3.5 > MOS > 3 |

A service indicated by the identification information of the service that is included in the first request information shown in Table 3 is a voice service. The first request information includes three service quality requirements on the voice service in different time. As shown in Table 3, when the time information is time information 1, the three service quality requirements are respectively that a mean opinion score (MOS) of the service is greater than 3 and less than 4, the MOS is greater than 4 and less than 4.5, and the MOS is greater than 4.5 and less than 5; when the time information is time information 2, the three service quality requirements are respectively that the MOS is greater than 3 and less than 3.5, the MOS is greater than 3.5 and less than 4, and the MOS is greater than 4 and less than 5. It may be understood that a value requirement on the MOS herein is an example of a single-user service quality requirement on the voice service.

In some embodiments, the service quality requirement may be a service quality requirement of one or more pieces of space information. To be more specific, the first request information may be used to request quality-of-service parameter information that is for the one or more pieces of space information and that is of the service and corresponds to the service quality requirement and/or the user category information. In this scenario, the first request information may further include the one or more pieces of space information. The space information may be location information, for example, a serving cell A or a registration area B, that is defined in a 3GPP communications network. Alternatively, the space information may be location information defined in a non-3GPP communications network. For example, the space information is a specific geographical location range (for example, latitude-longitude location information, or Global Positioning System (GPS) location information). Table 4 shows an example of the first request.

TABLE 4

| Identification information of a service | Space information | Service quality requirement |
|---|---|---|
| Voice service | Area 1 | 5 > MOS > 4.5 |
| | | 4.5 > MOS > 4 |
| | | 4 > MOS > 3 |
| | Area 2 | 5 > MOS > 4 |
| | | 4 > MOS > 3.5 |
| | | 3.5 > MOS > 3 |

A service indicated by the identification information of the service that is included in the first request information shown in Table 4 is a voice service. The first request information includes three service quality requirements on the voice service in different space. As shown in Table 4, when the space information is an area 1, the three service quality requirements are respectively that a mean opinion score (MOS) of the service is greater than 3 and less than 4, the MOS is greater than 4 and less than 4.5, and the MOS is greater than 4.5 and less than 5; when the space information is an area 2, the three service quality requirements are respectively that the MOS is greater than 3 and less than 3.5, the MOS is greater than 3.5 and less than 4, and the MOS is greater than 4 and less than 5. It may be understood that a value requirement on the MOS herein is an example of a single-user service quality requirement on the voice service.

In some embodiments, the user category information may be in a one-to-one correspondence with the service quality requirement. One piece of user category information corresponds to one service quality requirement, and a plurality of user categories respectively correspond to a plurality of service quality requirements.

In some embodiments, the first request information may include the identification information of the service, the service quality requirement, and the user category information. In this case, the first request information is used to request quality-of-service parameter information that is of the service and that corresponds to the service quality requirement and the user category information.

As described above, the service quality requirement may include a plurality of service quality requirements on the service, and the user category information may also include a plurality of pieces of user category information. The plurality of service quality requirements may be in a one-to-one correspondence with the plurality of pieces of user category information.

For example, Table 5 shows an example of the first request information. It may be understood that although the first request information shown in Table 5 includes a plurality of service quality requirements and a plurality of pieces of user category information, a possibility that the first request information includes only one service quality requirement and one piece of user category information is not excluded from this application.

TABLE 5

| Identification information of a service | User category | Service quality requirement |
|---|---|---|
| Voice service | Gold user | 5 > MOS > 4.5 |
| | Silver user | 4.5 > MOS > 4 |
| | Bronze user | 4 > MOS > 3 |

A service indicated by the identification information of the service that is included in the first request information shown in Table 5 is a voice service. The first request information further includes three user categories that are respectively a gold user, a silver user, and a bronze user. The first request information includes three service quality requirements on the voice service. The three service quality requirements shown in Table 5 are respectively that a MOS is greater than 3 and less than 4, the MOS is greater than 4 and less than 4.5, and the MOS is greater than 4.5 and less than 5. The three user categories in Table 5 are in a one-to-one correspondence with the three service quality requirements. For example, a service quality requirement corresponding to the gold user is that the MOS is greater than 4.5 and less than 5, a service quality requirement corresponding to the silver user is that the MOS is greater than 4 and less than 4.5, and a service quality requirement corresponding to the bronze user is that the MOS is greater than 3 and less than 4.

In this application, the quality-of-service parameter information that is of the service and that corresponds to the service quality requirement means that the quality-of-service parameter information can meet the service quality requirement. To be more specific, when the quality-of-service parameter is allocated to a service flow of a single user, service quality of the single user can meet the service quality requirement. For example, assuming that quality-of-service parameter information of the voice service includes a guaranteed flow bit rate (GFBR), a maximum flow bit rate (MFBR), and a latency, quality-of-service parameter information corresponding to the MOS>3 may be: the GFBR>300 megabits per second (Mbps), the MFBR>500 Mbps, and the latency<2 milliseconds (ms).

For example, in some embodiments, different user categories correspond to different service quality requirements. The policy control network element may store a correspondence between a service quality requirement and a user category. Using Table 5 as an example, the correspondence that is between a service quality requirement and a user category and that is stored by the policy control network element may be: the service quality requirement corresponding to the gold user is that the MOS is greater than 4.5 and less than 5, the service quality requirement corresponding to the silver user is that the MOS is greater than 4 and less than 4.5, and the service quality requirement corresponding to the bronze user is that the MOS is greater than 3 and less than 4. In a procedure in which each user executes the service, the policy control network element may first determine a user category of the user, and then determine a corresponding service quality requirement based on the user category of the user. For another example, in some embodiments, the policy control network element may not classify users into different user categories. In a procedure in which each user executes the service, the policy control network element may directly determine a specific service quality requirement of the user.

In a procedure in which a single user executes the service, the policy control network element requests each network device to allocate a network resource based on quality-of-service parameter information that is of the service and that corresponds to a service quality requirement of the user, such that corresponding service quality of the user can meet the service quality requirement of the user. A manner in which the policy control network element requests each network device to allocate the network resource based on a quality-of-service parameter may be: the policy control network element directly or indirectly delivers a quality-of-service policy to each network device. The quality-of-service policy includes the quality-of-service parameter. For example, the PCF may add parameters such as the GFBR>300 Mbps, the MFBR>500 Mbps, and the latency<2 ms to a quality of service (QoS) profile, and deliver the quality of service profile to a base station using an SMF, such that the base station allocates a corresponding air interface resource based on the parameters: the GFBR>300 Mbps, the MFBR>500 Mbps, and the latency<2 ms.

In some embodiments, the first request information may be real-time request information. To be more specific, after the policy control network element sends the first request information to the data analytics network element, the data analytics network element immediately returns content requested using the first request information.

In some other embodiments, the first request information may be subscription request information. To be more specific, after the policy control network element sends the first request information to the data analytics network element, the data analytics network element does not need to immediately send, to the policy control network element, content requested using the first request information, but sends, to the policy control network element after waiting for a subscription event to occur or a subscription condition to be met, the content requested using the first request information.

Optionally, in some embodiments, before step 201, the policy control network element may further determine that the service is in a test state. In other words, the policy control network element obtains the quality-of-service parameter information of the service from the data analytics network element only in a test phase of the service, and performs, in this phase, policy control and resource allocation for the service based on the quality-of-service parameter information recommended by the data analytics network element. After a test is completed and the service enters a stable phase, the policy control network element no longer needs to obtain quality-of-service parameter information recommended by the data analytics network element. The policy control network element may learn, from a slice network management and control unit, whether the service is in the test state, or may directly learn, from a service tenant or a service server, whether the service is in the test state. The slice network management unit may be a network slice selection function (NSSF) network element, a network slice management function (NSMF) network element, a network repository function (NRF), or another network element that has slice network management and control functions.

Optionally, in some embodiments, the first request information may further include first indication information, and the first indication information is used to indicate that the service is in the test phase.

Optionally, in some embodiments, the first indication information may alternatively be sent as separate information to the data analytics network element. In other words, the policy control network element may separately send the first request information and the first indication information to the data analytics network element.

Optionally, in some embodiments, the policy control network element sends first cancellation information to the data analytics network element after the test phase ends, where the first cancellation information is used to instruct to cancel obtaining the quality-of-service parameter information that is of the service and that corresponds to the service quality requirement and/or the user category information. In other words, the policy control network element obtains the quality-of-service parameter information of the service from the data analytics network element only in the test phase of the service, and performs, in this phase, policy control and resource allocation for the service based on the quality-of-service parameter information recommended by the data analytics network element. After a test is completed and the service enters a stable phase, the policy control network element no longer needs to obtain quality-of-service parameter information recommended by the data analytics network element. The policy control network element may learn, from a slice network management and control unit, whether the service has been tested, or may directly learn, from a service tenant or a service server, whether the service has been tested. The slice network management unit may be a network slice selection function (NSSF) network element, a network slice management function (NSMF) network element, a network repository function (NRF), or another network element that has slice network management and control functions. In addition, the policy control network element may self-determine whether the service has been tested. For example, the policy control network element may determine, depending on whether quality information that is of the service and that corresponds to the obtained quality-of-service parameter information of the service is greater than a preset value, whether the service has been tested. For a meaning of the service quality information, refer to step 203.

Optionally, in some embodiments, the first cancellation information may further include second indication information, and the second indication information is used to indicate that the test phase already ends.

Similarly, the second indication information may alternatively be sent as separate information to the data analytics network element. In other words, the policy control network element may separately send the first cancellation information and the second indication information to the data analytics network element.

Optionally, in some embodiments, when receiving the first cancellation information, the data analytics network element may determine that the test phase already ends. In other words, the first cancellation information may also be used to indicate that the test phase already ends.

Optionally, in some embodiments, when receiving the first cancellation information, the data analytics network element has determined at least one group of quality-of-service parameter information of the service based on the first request information, but does not send the at least one group of quality-of-service parameter information of the service to the policy control network element. In this case, the data analytics network element may not send the at least one group of quality-of-service parameter information of the service to the policy control network element.

Optionally, in some embodiments, when receiving the first cancellation information, the data analytics network element has not completed a process of determining the at least one group of quality-of-service parameter information of the service. In this case, the data analytics network element may stop determining the at least one group of quality-of-service parameter information of the service.

Optionally, in some embodiments, before receiving the first cancellation information, the data analytics network element has sent the at least one group of quality-of-service parameter information of the service to the policy control network element. If the policy control network element has determined, when receiving the at least one group of quality-of-service parameter information of the service, that the test phase has ends, the policy control network element may ignore the at least one group of quality-of-service parameter information of the service. For example, the policy control network element may directly delete the received at least one group of quality-of-service parameter information of the service.

202. The data analytics network element determines the at least one group of quality-of-service parameter information of the service.

In some embodiments, the data analytics network element may determine the at least one group of quality-of-service parameter information of the service based on the first request information.

In some embodiments, each of the at least one group of quality-of-service parameter information of the service corresponds to the service quality requirement on the service and/or the user category information.

The quality-of-service parameter information is different resource parameters or performance status parameters allocated by a network to a single user in a single service process. For example, QoS parameters of a 5G quality of service (QoS) flow that are defined in an existing standard, such as a GFBR, an MFBR, a 5G QoS class identifier (5QI), an allocation and retention priority (ARP), an average window size, and an uplink (UL) or downlink (DL) maximum packet loss rate (UL/DL MaxPLR), are quality-of-service parameters. However, the quality-of-service parameter in this application may alternatively be a new parameter that is undefined but affects service experience, such as a jitter buffer size, a Transmission Control Protocol (TCP) congestion window size, a TCP receive window size, a media coding type, a coding rate, a base station buffer size, or a radio access type (RAT). In addition, the new parameter may be a normalized parameter, and the normalized parameter is obtained by mapping a physical value of the parameter to fixed value space.

For a particular service, the data analytics network element obtains a user-level service experience model of the service by analyzing a large amount of collected user-level service quality data and flow-level network data. Service experience may reflect service quality. Therefore, the service quality described in this embodiment of this application may also be referred to as service experience. For example, the service experience model may also be referred to as a service quality model, and the service quality data may also be referred to as service experience data. The user-level service experience model refers to a variation relationship between the user-level service quality data of the service and the related flow-level network data. The user-level service quality data is service quality data at a single-user service flow level, that is, quality data generated by a single user in a single service process. Quality data generated by different users in service processes forms a set of the user-level service quality data collected by the data analytics network element. The flow-level network data is flow-level (a 5G network flow is a QoS flow) network data related to the user-level service quality data. For example, the flow-level network data is different resource parameters or status parameters (for example, the QoS parameters of the 5G QoS flow that are defined in the existing standard, such as the GFBR, the MFBR, the QCI, and the average window size, or the new parameter that is undefined but affects the service quality) allocated by the network to the single user in the single service process. The data analytics network element may collect a large quantity of resource parameters or status parameters allocated by the network to different users in the service processes, to form the flow-level network data.

The data analytics network element may obtain a user-level service experience model of a service using the following two steps.

A: The data analytics network element obtains training data of the service, where the training data may include user-level historical service quality data of the service and flow-level historical network data corresponding to the user-level historical service quality data.

For example, the data analytics network element first collects data separately from the service server (for example, an AF), an access network element (for example, a RAN), a user plane function network element (for example, a UPF), a terminal device (for example, a UE), a mobility management function network element (for example, an AMF), a session management function network element (for example, an SMF), a policy control function network element (for example, a PCF), a network management system, and the like, and then associates the data of the network elements using information such as identification information of the service, a service flow identifier, a terminal identifier, an identifier of a session on which a service flow is located, a user association identifier existing on each network element, a time, and a location, to obtain the complete training data. The training data includes the following content.

(1). User-level historical service quality of the service: The user-level historical service quality comes from the AF or another network element that can provide the service quality data, and may be, for example, user-level historical MOS data of the voice service.

In some embodiments, the user-level historical service quality of the service may be historical service quality in a space dimension. In other words, the historical service quality may include historical service quality corresponding to different space information. A specific form of the space information is not limited in this embodiment of this application. The space information may be space information, for example, the serving cell A or the registration area B, that is defined in the 3GPP communications network. Alternatively, the space information may be space information defined in the non-3GPP communications network. For example, the space information is a specific geographical location range (for example, latitude-longitude space information, or GPS space information). For example, the historical service quality may include historical service quality in an area 1 and historical service quality in an area 2. In this way, the obtained service experience model may be a service experience model that includes different space information.

In some embodiments, the historical service quality may be historical service quality in a time dimension. In other words, the historical service quality may include historical service quality corresponding to different time information. A specific form of the time information is not limited in this embodiment of this application, as long as that the time information can reflect a time. For example, the time information may be divided by hour. For example, first time information is from 8:00 to 10:00, and second time information is from 10:00 to 12:00. For another example, the time information may alternatively be divided by day. For example, first time information is from the first day to the tenth day of each month, and second time information is from the eleventh day to the twentieth day of each month. For another example, the time information may alternatively be divided by a time length after power-on performed by a user. For example, first time information is from the zeroth to the fourth hour after the power-on, and second time information is from the fourth to the eighth hour after the power-on. For example, the historical service quality may include historical service quality of time information 1 and historical service quality of time information 2. In this way, the obtained service experience model may be a service experience model that includes different time information.

(2). Time-variant parameter data affecting the user-level historical service quality of the service, namely, the flow-level historical network data corresponding to the user-level historical service quality data, namely, historical quality-of-service parameter information of the service, including:

i. TCP congestion window data, TCP receive window data, jitter buffer data, media coding type and coding rate data, buffer data, and data of at least one data type that are from the AF network element;

ii. flow bit rate data, packet loss rate data, latency data, radio channel quality data, and data of at least one data type that are from the RAN element;

iii. flow bit rate data, packet loss rate data, latency data, and data of at least one data type that are from the UPF network element;

iv. flow bit rate data, packet loss rate data, latency data, TCP congestion window data, TCP receive window data, jitter buffer data, media coding type and coding rate data, buffer data, CPU usage, memory usage, and data of at least one data type that are from the terminal device; and v. other data.

In some embodiments, the flow-level historical network data corresponding to the user-level historical service quality data may be flow-level historical network data in the space dimension. In other words, the flow-level historical network data may include flow-level historical network data corresponding to different space information. For example, the flow-level historical network data may include flow-level historical network data in the area 1 and flow-level historical network data in the area 2.

It should be noted that space information in the historical service quality data and space information in the flow-level historical network data that are obtained by the data analytics network element may be inconsistent. For example, the former is GPS space information, and the latter is cell identification information. In this case, the data analytics network element may establish a mapping relationship between the two different types of space information using user association identifier information that is included in both the historical service quality data and the flow-level historical network data. Subsequently, the data analytics network element may train the service experience model based on one type of space information.

In some embodiments, the flow-level historical network data corresponding to the user-level historical service quality data may be flow-level historical network data in the time dimension. In other words, the flow-level historical network data may include flow-level historical network data corresponding to different time information. For example, the flow-level historical network data may include flow-level historical network data of the time information 1 and flow-level historical network data of the time information 2.

B. For example, the data analytics network element may obtain a relational model between the user-level historical service quality of the service and the flow-level historical network data, namely, the user-level service experience model, based on a linear regression method. Details are as follows:

$$f(x) = m_0 x_0 + m_1 x_1 + m_2 x_2 + m_3 x_3 + \ldots + m_g x_g \quad \text{(formula 1.4)}$$

In the formula (1.4), $f(x)$ is user-level service quality of a service, for example, a single-user MOS value of the voice service. $X = (x_1, x_2, x_3, \ldots, x_g)$ is an eigenvector. For example, $x_1$ indicates a latency, $x_2$ indicates a packet loss rate, $x_3$ indicates a flow bit rate, ..., $x_g$ indicates a TCP congestion window, and $x_0$ is the constant 1. $M = (m_1, m_2, m_3, \ldots, m_g)$ is a parameter vector, and is also referred to as a weight vector, and $m_i$ indicates a value of a weight of an $i^{th}$ parameter affecting the user-level service quality data.

The foregoing linear regression is only an example of a data analysis algorithm, and the data analytics network element may obtain the user-level service experience model based on another algorithm. This is not specifically limited in this application.

It can be learned that, when a value requirement on a function value $f(x)$ is given, that is, a requirement on the user-level service quality is given, a value of the X vector that satisfies the requirement on the function value may be obtained using the foregoing $f(x)$ function model. Certainly, because $f(x)$ is a multivariate function, finally obtained X that satisfies the requirement may have a plurality of solutions, for example, X1 $(x_{11}, x_{12}, x_{13}, \ldots, x_{1g})$, X2 $(x_{21}, x_{22}, x_{23}, \ldots, x_{2g})$, and X3 $(x_{31}, x_{32}, x_{33}, \ldots, x_{3g})$.

In this way, after obtaining the service quality requirement, the data analytics network element may determine, based on the service quality requirement and the user-level service experience model, at least one group of quality-of-service parameter information that is of the service and that corresponds to the service quality requirement. It should be noted that a process of training the service experience model by the data analytics network element may not depend on an operation of obtaining the service quality requirement from the policy control network element in step 201. To be more specific, the data analytics network element may train the service experience model in advance, and then obtain a corresponding solution based on the service quality requirement obtained from the policy control network element in step 201. Alternatively, the data analytics network element may first obtain the service quality requirement in step 201, then train the service experience model, and finally obtain a corresponding solution based on the service quality requirement and the service experience model. In addition, the service quality requirement may not be from the policy control network element, but from the service server or configured on the data analytics network element.

For example, when $f(x)$ means that the MOS is greater than 3 and less than 4, a solution of X may be X1 $(x_{11}, x_{12}, x_{13}, \ldots, x_{1g})$, X2 $(x_{21}, x_{22}, x_{23}, \ldots, x_{2g})$, X3 $(x_{31}, x_{32}, x_{33}, \ldots, x_{3g})$, X4 $(x_{41}, x_{42}, x_{43}, \ldots, x_{4g})$, and X5 $(x_{51}, x_{52}, x_{53}, \ldots, x_{5g})$. For another example, when $f(x)$ means that the MOS is greater than 4.5 and less than 5, a solution of X may be X6 $(x_{61}, x_{62}, x_{63}, \ldots, x_{6g})$ and X7 $(x_{71}, x_{72}, x_{73}, \ldots, x_{7g})$.

It may be understood that, when the quality-of-service parameter information that is of the service and that corresponds to the service quality requirement is determined using the user-level service experience model, the service quality requirement may be used as a given value requirement on the function value $f(x)$.

As described above, in some embodiments, the first request information may include the identification information of the service and the service quality requirement. In this case, the data analytics network element may directly determine, using the service quality requirement in the first request information, the at least one piece of quality-of-service parameter information that is of the service and that corresponds to the service quality requirement.

In some embodiments, the first request information may include the identification information of the service and the user category information. In this case, the data analytics network element may determine, based on a correspondence between user category information and a service quality requirement, a service quality requirement corresponding to the user category information in the first request information, and then determine, based on the service quality requirement, at least one group of quality-of-service parameter information that is of the service and that corresponds to the user category information. In some embodiments, the data analytics network element may obtain the correspondence between user category information and a service quality requirement from the policy control network element. In some other embodiments, the data analytics network element may obtain the correspondence between user category information and a service quality requirement from the service server of the service. In some other embodiments, the correspondence between user category information and a service quality requirement may alternatively be configured in the data analytics network element.

In some embodiments, the first request information may include the identification information of the service, the service quality requirement, and the user category information. In this case, the data analytics network element may directly determine the at least one group of quality-of-service parameter information of the service using the service quality requirement in the first request information. Each of the at least one group of quality-of-service parameter information of the service corresponds to the service quality requirement and the user category information.

In some embodiments, step 201 may not be performed. To be more specific, the data analytics network element does not need to determine quality-of-service parameter information of a service based on the first request information, but self-determines the quality-of-service parameter information of the service. For example, after the data analytics network element configures, or obtains from the service server of the service, a service quality requirement and/or user category information similar to those described in step 201, the data analytics network element determines the quality-of-service parameter information of the service based on the model trained in step 202 and the service quality requirement and/or the user category information.

203. The data analytics network element sends the at least one group of quality-of-service parameter information of the service to the policy control network element. Correspondingly, the policy control network element receives the at least one group of quality-of-service parameter information of the service that is sent by the data analytics network element.

In some embodiments, each group of quality-of-service parameter information may include at least one quality-of-service parameter type and a corresponding quality-of-service parameter value. For example, the GFBR may be a quality-of-service parameter type; if the GFBR=300, 300 is a quality-of-service parameter value. Each group of quality-of-service parameter information may further include a service quality requirement and/or user category information corresponding to the group of quality-of-service parameter information.

In some embodiments, the data analytics network element may further send, to the policy control network element, identification information of the service corresponding to the at least one group of quality-of-service parameter information of the service. Alternatively, in some embodiments, each group of quality-of-service parameter information may include the identification information of the corresponding service.

In some embodiments, the data analytics network element may further send, to the policy control network element, identification information of a slice network corresponding to the at least one group of quality-of-service parameter information of the service. Alternatively, in some embodiments, each group of quality-of-service parameter information may include identification information of a corresponding slice network.

In some embodiments, each group of quality-of-service parameter information of the service may further include an applicable condition corresponding to the group of quality-of-service parameter information of the service. In this way, the policy control network element may subsequently determine applicable target quality-of-service parameter information for a service procedure of a single user based on the applicable condition.

The applicable condition may be any one or more of a time condition, a space condition, a network parameter condition (for example, configuration of a network performance parameter key performance indicator (KPI)), a load condition of a slice network, and the like.

A specific form of the space condition is not limited in this embodiment of this application, as long as that the space condition can reflect space information. For example, the space information may be location information, for example, a serving cell A or a registration area B, that is defined in the 3GPP communications network. Alternatively, the space information may be space information defined in the non-3GPP communications network. For example, the space information is a specific geographical location range. In some embodiments, when step 201 is performed, and the first request information carries the space information corresponding to the service quality requirement and/or the user category, the space condition may be consistent with the space information.

A specific form of the time condition is not limited in this embodiment of this application, as long as that the time condition can reflect a time. For example, the time condition may be divided by hour. For example, the time condition may be from 8:00 to 10:00. For another example, the time condition may alternatively be divided by day. For example, the time condition may be from the first day to the tenth day of each month. For another example, the time condition may alternatively be divided by a time length after power-on performed by a user. For example, the time condition may be from the zeroth to the fourth hour after the power-on. In some embodiments, when step 201 is performed, and the first request information carries the time information corresponding to the service quality requirement and/or the user category, the time condition may be consistent with the time information.

A specific form of the network parameter condition is not limited in this embodiment of this application, as long as that the network parameter condition can reflect network performance. The network performance may be one or more of user-level network performance, device-level network performance, interface-level network performance, or network-level network performance. For example, the user-level network performance may be a QoS parameter of a single-user service, the device-level network performance may be a capacity of a network device, the access-level network performance may be a latency or a throughput of a network interface, and the network-level network performance may be an end-to-end latency of a network.

Optionally, in some embodiments, the data analytics network element may further send at least one piece of service quality information to the policy control network element, where the at least one piece of service quality information is in a one-to-one correspondence with the at least one group of quality-of-service parameter information of the service.

In some embodiments, the service quality information may be information that reflects a degree to which the quality-of-service parameter information satisfies a service requirement, in other words, use effect information of the quality-of-service parameter information. For example, the service quality information may include three levels: "high", "medium", and "low", where "high" indicates a very high degree to which the quality-of-service parameter satisfies the service requirement, "medium" indicates a medium degree to which the quality-of-service parameter satisfies the service requirement, and "low" indicates a very low degree to which the quality-of-service parameter satisfies the service requirement. Certainly, the degree to which the quality-of-service parameter satisfies the service requirement may alternatively be expressed in another form. This is not limited herein. For example, the degree may be a specific value in an interval [0, 1]. How to calculate the degree to which the quality-of-service parameter information satisfies the service requirement belongs to an internal algorithm of the data analytics network element. This is not limited in this application.

In some embodiments, the service quality information may be information that reflects service experience. For example, network-evaluated service quality data can reflect the service experience. Network-evaluated service quality includes evaluated average MOS information or service user satisfaction information. The average MOS information is an average value of MOSs evaluated by the data analytics network element for all service users in the entire network or some areas of the network. Service user satisfaction is a percentage of users who meet a single-user service quality requirement of the service. For example, a percentage of users whose MOSs of the voice service are greater than three scores is 95%.

In some embodiments, the service quality information may be trustworthiness information of the service, and the trustworthiness information is information that can reflect a degree of proximity between network-evaluated service quality and actual service quality of the service. For example, the trustworthiness information may be a floating point value in [0, 1]. A larger value indicates higher trustworthiness, namely, a higher degree of proximity between the network-evaluated service quality and the actual service quality of the service. For example, compared with a case in which a value of the trustworthiness information is 0.3, a case in which a value of the trustworthiness information is 0.8 corresponds to a higher degree of proximity between the network-evaluated service quality and the actual service quality of the service. For example, the data analytics network element may calculate trustworthiness based on an absolute difference between the network-evaluated service quality and the actual service quality of the service, where a smaller difference indicates higher trustworthiness. For example, an evaluated service quality MOS is equal to 3, an actual MOS is equal to 4, an absolute difference between the evaluated MOS and the actual MOS is 1, and a trustworthiness value corresponding to 1 is 0.8. For another example, an evaluated service quality MOS is equal to 3.8, an actual MOS is equal to 4, an absolute difference between the evaluated MOS and the actual MOS is 0.2, and a trustworthiness value corresponding to 0.2 is 0.98. There may further be another algorithm for calculating the trustworthiness in this application. This is not limited in this application.

In this application, the service quality information may be one type or a combination of several types of the service quality information that is described in the foregoing three embodiments. Certainly, the service quality information may alternatively be expressed in another form, as long as that a level of the service quality can be reflected.

For example, descriptions are provided in Table 6 using an example in which the service quality information reflects the degree to which the quality-of-service parameter information satisfies the service requirement.

TABLE 6

| Service quality requirement | Quality-of-service parameter information | Quality information of a service |
|---|---|---|
| 4 > MOS > 3 | GFBR = 300, MFBR = 500, and latency = 5 | 85% |
|  | GFBR = 300, MFBR = 500, and latency = 4 | 95% |
|  | GFBR = 300, MFBR = 500, and latency = 3 | 98% |
| 4.5 > MOS > 4 | GFBR = 200, MFBR = 500, and latency = 3 | 98% |
|  | GFBR = 300, MFBR = 800, and latency = 2 | 92% |
| 5 > MOS > 4.5 | GFBR = 500, MFBR = 500, and latency = 1 | 90% |

As shown in Table 6, quality information that is of the service and that corresponds to quality-of-service parameter information GFBR=300, MFBR=500, and latency=5 is 85, indicating that a degree to which GFBR=300, MFBR=500, and latency=5 can meet the service requirement of 4>MOS>3 is 85%.

Table 7 shows an example of the at least one group of quality-of-service parameter information of the service.

TABLE 7

| Service quality requirement | Quality-of-service parameter information |
|---|---|
| 4 > MOS > 3 | GFBR = 300, MFBR = 500, and latency = 5 |
|  | GFBR = 300, MFBR = 500, and latency = 4 |
|  | GFBR = 300, MFBR = 500, and latency = 3 |
| 4.5 > MOS > 4 | GFBR = 200, MFBR = 500, and latency = 3 |
|  | GFBR = 300, MFBR = 800, and latency = 2 |
| 5 > MOS > 4.5 | GFBR = 500, MFBR = 500, and latency = 1 |

As shown in Table 7, the service quality requirement of 4>MOS>3 corresponds to three groups of quality-of-service parameter information, the service quality requirement of 4.5>MOS>4 corresponds to two groups of quality-of-service parameter information, and the service quality requirement of 5>MOS>4.5 corresponds to one group of quality-of-service parameter information. The quality-of-service parameter information shown in Table 7 is quality-of-service parameters. For example, one of the three groups of quality-of-service parameter information that correspond to the service quality requirement of 4>MOS>3 includes: the guaranteed flow bit rate (GFBR) is equal to 300, the maximum flow bit rate (MFBR) is equal to 500, and the latency is five seconds.

As shown in Table 7, different service quality requirements correspond to different quality-of-service parameter information, and different service quality requirements also correspond to different quantities of groups of quality-of-service parameter information. As shown in Table 7, the service quality requirement of 5>MOS>4.5 corresponds to one group of quality-of-service parameters, the service quality requirement of 4.5>MOS>4 corresponds to two groups of quality-of-service parameter information, and the service quality requirement of 4>MOS>3 corresponds to three groups of quality-of-service parameter information.

In some embodiments, different service quality requirements may correspond to a same quantity of pieces of quality-of-service parameter information.

In some other embodiments, the quality-of-service parameter information may further include intermediate information. The policy control network element may derive a quality-of-service parameter value based on the intermediate information. For example, one group of quality-of-service parameter values may correspond to one index, and the index may be used to indicate the corresponding quality-of-service parameter values. In this case, the quality-of-service parameter information may be the index. For another example, the quality-of-service parameter information delivered by the data analytics network element is not a quality-of-service parameter (for example, a QoS parameter) that is finally delivered by the policy control network element in a quality-of-service policy to each network element for use, but is some intermediate parameters. In this case, after receiving the at least one group of quality-of-service parameter information, the policy control network element further needs to first map or calculate the received at least one group of quality-of-service parameter information into the quality-of-service parameter included in the quality-of-service policy, and then deliver the quality-of-service policy to each related network element.

For example, Table 8 shows an example of the at least one group of quality-of-service parameter information of the service.

TABLE 8

| Service quality requirement | Quality-of-service parameter information |
|---|---|
| 4 > MOS > 3 | 1 |
|  | 2 |
|  | 3 |
| 4.5 > MOS > 4 | 4 |
|  | 5 |
| 5 > MOS > 4.5 | 6 |

Table 9 shows a correspondence between quality-of-service parameter values and an index.

TABLE 9

| Index | Quality-of-service parameter value |
|---|---|
| 1 | GFBR = 300, MFBR = 500, and latency = 5 |
| 2 | GFBR = 300, MFBR = 500, and latency = 4 |
| 3 | GFBR = 300, MFBR = 500, and latency = 3 |
| 4 | GFBR = 200, MFBR = 500, and latency = 3 |
| 5 | GFBR = 300, MFBR = 800, and latency = 2 |
| 6 | GFBR = 500, MFBR = 500, and latency = 1.5 |

The data analytics network element may first determine at least one group of quality-of-service parameter values, and then determine, based on the correspondence between quality-of-service parameter values and an index, an index corresponding to the at least one group of quality-of-service parameter values. The at least one group of quality-of-service parameter information of the service that is sent by the data analytics network element to the policy control network element may be the index corresponding to the at least one group of quality-of-service parameter values. After receiving the at least one group of quality-of-service parameter information of the service, the policy control network element may determine specific quality-of-service parameter values based on the correspondence between quality-of-service parameter values and an index.

The correspondence between quality-of-service parameter values and an index may be determined by the data analytics network element, and then sent to the policy control network element.

In some embodiments, the method shown in FIG. 2 may further include step 204 and step 205.

204. The policy control network element receives second request information sent by the service server, where the second request information is used to request to set up the service for a first user.

The second request information may be sent by the service server to the policy control network element in a process in which the first user sets up the service. The second request information may include identification information of the first user. Optionally, the second request information may further include user category information of the first user and/or a service quality requirement of the first user on the service.

Optionally, the second request message may further include service description information corresponding to the first user. The service description information is used to describe information about an application layer or a media plane that is used by the first user to perform the service, and may include one or more of the following information: identification information of a service to which a service flow belongs, Internet Protocol (IP) filtering information, a media bandwidth requirement, traffic routing information, a jitter buffer requirement, a media coding type requirement, a coding rate requirement of the media coding type requirement, a TCP congestion window requirement, a TCP receive window requirement, a buffer requirement, or a value requirement of at least one data type.

205. The policy control network element determines, based on the user category information of the first user and/or the service quality requirement of the first user and the at least one group of quality-of-service parameter information of the service, target quality-of-service parameter information that is of the service and that corresponds to the first user.

Optionally, in some embodiments, the target quality-of-service parameter information that is of the service and that corresponds to the first user may be included in the at least one group of quality-of-service parameter information of the service. In other words, the policy control network element may determine, based on the user category information of the first user and/or the service quality requirement of the first user, one of the at least one group of quality-of-service parameter information of the service as the target quality-of-service parameter information that is of the service and that corresponds to the first user.

Optionally, in some other embodiments, the policy control network element may generate, based on the user category information of the first user and/or the service quality requirement of the first user and the at least one group of quality-of-service parameter information of the service, the target quality-of-service parameter information that is of the service and that corresponds to the first user. In other words, the target quality-of-service parameter information that is of the service and that corresponds to the first user is not included in the at least one group of quality-of-service parameter information of the service.

For example, the policy control network element may first determine, based on the user category information of the first user and/or the service quality requirement of the first user, one of the at least one group of quality-of-service parameter information of the service as reference quality-of-service parameter information that is of the service and that corresponds to the first user; and then determine, based on the reference quality-of-service parameter information that is of the service and that corresponds to the first user, the target quality-of-service parameter information that is of the service and that corresponds to the first user.

For example, the policy control network element may modify one or more parameters in the reference quality-of-service parameter information that is of the service and that corresponds to the first user, and the modified reference quality-of-service parameter information that is of the service and that corresponds to the first user is the target quality-of-service parameter information that is of the service and that corresponds to the first user. The policy control network element may modify, based on a current local policy and a current network resource status, the one or more parameters in the reference quality-of-service parameter information that is of the service and that corresponds to the first user.

For another example, the policy control network element may generate a quality-of-service policy based on one of the at least one group of quality-of-service parameter information of the service, and the quality-of-service policy is used as the target quality-of-service parameter information that is of the service and that corresponds to the first user. For example, the quality-of-service parameter information includes coding information of the service. The policy control network element generates a maximum packet loss rate of a data packet based on the coding information, and the maximum packet loss rate of the data packet is used as the target quality-of-service parameter information.

It may be understood that step 204 and step 205 may be performed after step 203. Alternatively, step 204 may be performed before step 203, but step 205 needs to be performed after step 203.

If the policy control network element receives a plurality of groups of quality-of-service parameter information of the service, the plurality of groups of quality-of-service parameter information of the service may include quality-of-service parameter information corresponding to different user category information and/or service quality requirements.

For example, assuming that the policy control network element receives N groups of quality-of-service parameter information of the service, where N is a positive integer greater than 1, the N groups of quality-of-service parameter information of the service may include $N_1$ groups of quality-of-service parameter information corresponding to $A^{th}$ user category information and/or an $A^{th}$ service quality requirement, $N_2$ groups of quality-of-service parameter information corresponding to $B^{th}$ user category information and/or a $B^{th}$ service quality requirement, and $N_3$ groups of quality-of-service parameter information corresponding to $C^{th}$ user category information and/or a $C^{th}$ service quality requirement, where $N_1$, $N_2$, and $N_3$ are all positive integers greater than or equal to 1, and a sum of $N_1$, $N_2$, and $N_3$ is N.

The policy control network element may first determine, based on the user category information of the first user and/or the service quality requirement of the first user, quality-of-service parameter information that is of the service and that corresponds to the user category information of the first user and/or the service quality requirement of the first user. If the plurality of groups of quality-of-service parameter information of the service include only one group of quality-of-service parameter information that is of the service and that corresponds to the user category information of the first user and/or the service quality requirement of the first user, the target quality-of-service parameter information that is of the service and that corresponds to the first user is the group of quality-of-service parameter information that is of the service and that corresponds to the user category information of the first user and/or the service quality requirement of the first user. If the plurality of groups of quality-of-service parameter information of the service include only a plurality of groups of quality-of-service parameter information of the service that correspond to the user category information of the first user and/or the service quality requirement of the first user, the policy control network element may determine one group of quality-of-service parameter information of the service in the plurality of groups of quality-of-service parameter information of the service as the target quality-of-service parameter information corresponding to the first user. In some embodiments, the policy control network element may alternatively determine, based on one or more of the identification information of the slice network, the identification information of the service, or the applicable condition that correspond to each of the plurality of groups of quality-of-service parameter information of the service, the target quality-of-service parameter information that is of the service and that corresponds to the first user.

The policy control network element may determine, based on a network status and a matched applicable condition, the target quality-of-service parameter information that is of the service and that corresponds to the first user. For example, assuming that the applicable condition corresponding to each group of quality-of-service parameters is a time condition, the policy control network element selects, from the plurality of groups of quality-of-service parameter information of the service that correspond to the user category information of the first user and/or the service quality requirement of the first user, one group of quality-of-service parameters that matches the time condition as target quality-of-service parameters based on current time information. For another example, assuming that the applicable condition corresponding to each group of quality-of-service parameters is load information of a slice network on which the user performs the service, the policy control network element may alternatively determine, based on current load information of the slice network, one group of quality-of-service parameters in the plurality of groups of quality-of-service parameter information of the service that correspond to the user category information of the first user and/or the service quality requirement of the first user as the target quality-of-service parameter information that is of the service and that corresponds to the first user. For example, when the load information of the slice network is a level, the policy control network element selects one group of quality-of-service parameters from the plurality of groups of quality-of-service parameter information of the service that correspond to the user category information of the first user and/or the service quality requirement of the first user as the target quality-of-service parameter information that is of the service and that corresponds to the first user. When the load information of the slice network is another level, the policy control network element selects another group of quality-of-service parameters from the plurality of groups of quality-of-service parameter information of the service that correspond to the user category information of the first user and/or the service quality requirement of the first user as the target quality-of-service parameter information that is of the service and that corresponds to the first user.

In some embodiments, if the second request information carries the user category information of the first user and/or the service quality requirement of the first user on the service, the policy control network element may directly determine, based on the user category information of the first user and/or the service quality requirement of the first user on the service in the second request information, the target quality-of-service parameter information that is of the service and that corresponds to the first user. A method for determining, by the policy control network element, the target quality-of-service parameter information that is of the service and that corresponds to the first user has been described above. Details are not described herein again.

In some other embodiments, the policy control network element may store, or learn of in advance, a correspondence between the first user and the user category information. Therefore, if the second request information includes the identification information of the first user but does not include the user category information of the first user, the policy control network element may determine a user category of the first user based on the correspondence. Then, the policy control network element may determine a group of target quality-of-service parameter information of the service for the first user in quality-of-service parameter information that is of the service and that corresponds to the user category. For example, the policy control network element learns, based on subscription information of the first user that is obtained from unified data management (UDM), that the user category information of the first user is a gold user. In this case, the policy control network element obtains, from the at least one group of quality-of-service parameter information of the service that is received in step 203, one or more groups of quality-of-service parameter information that correspond to the gold user, and finally selects one of the one or more groups of quality-of-service parameter information that correspond to the gold user as the target quality-of-service parameters of the service that correspond to the first user. For example, Table 10 shows an example of the at least one group of quality-of-service parameter information of the service.

TABLE 10

| User category | Quality-of-service parameter information |
|---|---|
| Bronze user | GFBR = 300, MFBR = 500, and latency = 5 |
|  | GFBR = 300, MFBR = 500, and latency = 4 |
|  | GFBR = 300, MFBR = 500, and latency = 3 |
| Silver user | GFBR = 200, MFBR = 500, and latency = 3 |
|  | GFBR = 300, MFBR = 800, and latency = 2 |
| Gold user | GFBR = 500, MFBR = 500, and latency = 1 |

It is assumed that the at least one group of quality-of-service parameter information of the service that is received by the policy control network element is that shown in Table 10. If the user category information of the first user is the gold user, the policy control network element may determine that the target quality-of-service parameters of the service that correspond to the first user are: GFBR=500, MFBR=500, and latency=1. If the user category information of the first user is the silver user, the policy control network element may determine that the target quality-of-service parameters of the service that correspond to the first user are one of (GFBR=200, MFBR=500, and latency=3) and (GFBR=500, MFBR=500, and latency=1). A policy determined by the policy control network element may be randomly determined, or may be determined according to a preset rule. For example, a group of quality-of-service parameters with a minimum value (for example, a minimum latency value) in the quality-of-service parameters is determined as the target quality-of-service parameter information that is of the service and that corresponds to the first user. The policy control network element may alternatively determine, based on one or more of the identification information of the slice network, the identification information of the service, or the applicable condition that correspond to each group of quality-of-service parameter information, the target quality-of-service parameter information, the target quality-of-service parameter information that is of the service and that corresponds to the first user. A method for determining, by the policy control network element, the target quality-of-service parameter information that is of the service and that corresponds to the first user has been described above. Details are not described herein again.

In some other embodiments, the policy control network element may store, or learn of in advance, a correspondence between the first user and the service quality requirement. Therefore, if the second request information includes the identification information of the first user but does not include the user category information of the first user nor the service quality requirement information of the first user, the policy control network element may determine the service quality requirement of the first user based on the correspondence. Then, the policy control network element may determine, in quality-of-service parameter information corresponding to the service quality requirement, the target quality-of-service parameter information that is of the service and that corresponds to the first user. For example, the policy control network element learns, based on subscription information of the first user that is obtained from UDM, that the quality-of-service parameter information that is of the service and that corresponds to the first user is 5>MOS>4.5. In this case, the policy control network element obtains, from the at least one group of quality-of-service parameter information of the service that is received in step 203, quality-of-service parameter information corresponding to 5>MOS>4.5, and selects one group from the quality-of-service parameter information as the target quality-of-service parameters of the service that correspond to the first user.

It is assumed that the at least one group of quality-of-service parameter information of the service that is received by the policy control network element is that shown in Table 7. If the service quality requirement of the first user on the service is 5>MOS>4.5, the policy control network element may determine that the target quality-of-service parameters of the service that correspond to the first user are: GFBR=500, MFBR=500, and latency=1. If the service quality requirement of the first user on the service is 4.5>MOS>4, the policy control network element may determine that the target quality-of-service parameters of the service that correspond to the first user are one of (GFBR=200, MFBR=500, and latency=3) and (GFBR=500, MFBR=500, and latency=1). A policy determined by the policy control network element may be randomly determined, or may be determined according to a preset rule. For example, a group of quality-of-service parameters with a minimum value (for example, a minimum latency value) in the quality-of-service parameters is determined as the target quality-of-service parameters of the service that correspond to the first user. The policy control network element may alternatively determine, based on one or more of the identification information of the slice network, the identification information of the service, or the applicable condition that correspond to each group of quality-of-service parameter information, the target quality-of-service parameter information that is of the service and that corresponds to the first user. A method for determining, by the policy control network element, the target quality-of-service parameter information that is of the service and that corresponds to the first user has been described above. Details are not described herein again.

In some other embodiments, the policy control network element may store, or learn of in advance, a correspondence between the service description information and the user category information and/or the service quality requirement. Therefore, if the second request information includes the service description information of the first user but does not include the user category information nor the service quality requirement information of the first user, the policy control network element may determine a user category and/or the service quality requirement of the first user based on the correspondence. Then, the policy control network element may determine, based on the user category information and/or the service quality requirement of the first user, the target quality-of-service parameter information that is of the service and that corresponds to the first user. A method for determining, by the policy control network element, the target quality-of-service parameter information that is of the service and that corresponds to the first user has been described above. Details are not described herein again. After determining the target quality-of-service parameter information that is of the service and that corresponds to the first user, the policy control network element may generate, based on the target quality-of-service parameter information, a quality-of-service policy corresponding to a service procedure of the first user, and send the quality-of-service policy to a related network element or terminal, such that the related network element or terminal allocates a resource to or sets the quality-of-service parameter for the service procedure of the first user based on the quality-of-service policy, thereby ensuring that the service procedure of the first user has corresponding service quality. The quality-of-service policy may be the target quality-of-service parameter information, or may not be the target quality-of-service parameter information but is obtained after intermediate processing is performed on the target quality-of-service parameter information.

Optionally, in some embodiments, when the data analytics network element further sends the at least one piece of service quality information to the policy control network element, the policy control network element may further determine, based on the at least one piece of service quality information, the target quality-of-service parameter information that is of the service and that corresponds to the first user.

In some embodiments, when determining the target quality-of-service parameter information that is of the service and that corresponds to the first user, the policy control network element may select quality-of-service parameter information that is of the service and that corresponds to optimal service quality information.

For example, as described above, the policy control network element may first determine, based on the user category information of the first user and/or the service quality requirement of the first user, quality-of-service parameter information that is of the service and that corresponds to the user category information of the first user and/or the service quality requirement of the first user. In some cases, there may be a plurality of groups of quality-of-service parameter information of the service that correspond to the user category information of the first user and/or the service quality requirement of the first user. In this case, the policy control network element may determine, based on a plurality of pieces of service quality information that correspond to the plurality of groups of quality-of-service parameter information of the service, the target quality-of-service parameter information corresponding to the first user. For example, the policy control network element may determine optimal service quality information in the plurality of pieces of service quality information. Quality-of-service parameter information that is of the service and that corresponds to the optimal service quality information is the target quality-of-service parameter information corresponding to the first user. If there are a plurality of pieces of optimal service quality information, quality-of-service parameter information that is of the service and that corresponds to one of the plurality of pieces of optimal service quality information may be randomly determined as the target quality-of-service parameter information corresponding to the first user.

Table 6 is used as an example. It is assumed that the six groups of quality-of-service parameter information of the service that are shown in Table 6 are all quality-of-service parameter information that is of the service and that corresponds to the first user. Assuming that the service quality requirement of the first user is 4>MOS>3, it can be learned from Table 6 that, when the corresponding service quality requirement is 4>MOS>3, quality information that is of the service and that corresponds to GFBR=300, MFBR=500, and latency=3 is the highest. Therefore, the policy control network element may select GFBR=300, MFBR=500, and latency=3 as the target quality-of-service parameter information that is of the service and that corresponds to the first user.

Optionally, in some embodiments, the policy control network element may further send the target quality-of-service parameter information that is of the service and that corresponds to the first user to the data analytics network element. Correspondingly, the data analytics network element may receive the target quality-of-service parameter information that is of the service and corresponds to the first user and that is sent by the policy control network element. In this manner, the data analytics network element can obtain target quality-of-service parameters of each service that correspond to all users in the entire network, and the data analytics network element can obtain, through training based on the target quality-of-service parameter information, a load model corresponding to the network.

Optionally, in some embodiments, the policy control network element may further send target service quality information to the data analytics network element. The target service quality information is service quality information that is in the at least one piece of service quality information and that corresponds to the target quality-of-service parameter information that is of the service and that corresponds to the first user. Correspondingly, the data analytics network element may receive the target service quality information. In this manner, the data analytics network element can learn of quality information that is of the service and that corresponds to the target quality-of-service parameters of each service that correspond to all the users in the entire network. This helps provide service quality data to support the data analytics network element in subsequently obtaining, through training, the load model corresponding to the network.

As described above, the target quality-of-service parameter information that is of the service and that corresponds to the first user is included in the at least one group of quality-of-service parameter information of the service, in other words, the target quality-of-service parameter information is one of the at least one group of quality-of-service parameter information of the service. In some other embodiments, the target quality-of-service parameter information that is of the service and that corresponds to the first user may alternatively be generated based on the at least one group of quality-of-service parameter information of the service, in other words, the target quality-of-service parameter information may not be one of the at least one group of quality-of-service parameter information of the service. For example, the policy control network element may modify one of the at least one group of quality-of-service parameter information of the service, and use the modified group of quality-of-service parameter information of the service as the target quality-of-service parameter information that is of the service and that corresponds to the first user. Alternatively, the policy control network element may generate a quality-of-service policy based on one of the at least one group of quality-of-service parameter information of the service, and the quality-of-service policy is used as the target quality-of-service parameter information that is of the service and that corresponds to the first user.

In some embodiments, the method shown in FIG. 2 may further include step 206, step 207, and step 208. It may be understood that step 206 and step 207 may be performed before step 201, and step 208 is performed after step 203.

206. The policy control network element receives third request information sent by the service server, where the third request information is used to request to set up the service for a second user.

The third request information may be sent by the service server to the policy control network element in a process in which the second user sets up the service. The third request information may include identification information of the second user. Optionally, the third request information may further include user category information of the second user and/or a service quality requirement of the second user on the service.

Optionally, the third request message may further include service description information corresponding to the second user. The service description information is used to describe information about an application layer or a media plane that is used by the second user to perform the service, and may include one or more of the following information: identification information of a service to which a service flow belongs, IP filtering information, a media bandwidth requirement, traffic routing information, a jitter buffer requirement, a media coding type requirement, a coding rate requirement of the media coding type requirement, a TCP congestion window requirement, a TCP receive window requirement, a buffer requirement, or a value requirement of at least one data type.

207. The policy control network element determines the service quality requirement and/or the user category information based on the third request information, where the service quality requirement is the service quality requirement of the second user, and the user category information is the user category information of the second user.

That is, the quality-of-service parameter information that corresponds to the service quality requirement and/or the user category information and that is requested in the first request information is quality-of-service parameter information that is of the service and that corresponds to the service quality requirement of the second user and/or the user category information of the second user. Correspondingly, each of the at least one group of quality-of-service parameter information of the service corresponds to the service quality requirement of the second user and/or a user category of the second user. It should be noted that when step 206 and step 207 are included, the first request information may be real-time request information. To be more specific, the policy control network element generates the first request information in real time based on the third request information sent by the service server, and sends the first request message to the data analytics network element; the data analytics network element returns the content requested using the first request information. In addition, when step 206 and step 207 are included, the first request information may include only one piece of user category information and/or one piece of service quality requirement information. To be more specific, the first request information includes the user category information of the second user and/or the service quality requirement of the second user.

It may be understood that, if step 206 and step 207 are not performed, the policy control network element may self-determine the service quality requirement and/or the user category information that are/is included in the first request information. For example, the policy control network element may determine, according to an internal configuration or an internal policy, the service quality requirement and/or the user category information that are/is included in the first request information. It should be noted that, when step 206 and step 207 are not performed, the first request information may be real-time request information or subscription request information. When the first request information is subscription request information, the data analytics network element does not need to immediately send, to the policy control network element, the content requested using the first request information, but sends, to the policy control network element after waiting for a subscription event to occur or a subscription condition to be met, the content requested using the first request information. In addition, when step 206 and step 207 are not performed, the first request information may include a plurality of user categories and/or a plurality of service quality requirements.

208. The policy control network element determines, based on the at least one group of quality-of-service parameter information of the service, target quality-of-service parameter information that is of the service and that corresponds to the second user.

In some embodiments, the target quality-of-service parameter information that is of the service and that corresponds to the second user may be included in the at least one group of quality-of-service parameter information of the service.

A manner in which the policy control network element determines the target quality-of-service parameter information that is of the service and that corresponds to the second user is similar to the manner in which the policy control network element determines the target quality-of-service parameter information that is of the service and that corresponds to the first user in step 205. Details are not necessarily described herein again.

Similarly, the data analytics network element may further send at least one piece of service quality information to the policy control network element, where the at least one piece of service quality information is in a one-to-one correspondence with the at least one group of quality-of-service parameter information of the service, and each of the at least one piece of service quality information is used to indicate a trustworthiness degree of the corresponding quality-of-service parameter information of the service or indicate a degree to which the corresponding quality-of-service parameter information of the service satisfies the service quality requirement. In this way, the policy control network element can determine, based on the at least one piece of service quality information, the target quality-of-service parameter information that is of the service and that corresponds to the second user.

Optionally, in some embodiments, the policy control network element may further send the target quality-of-service parameter information that is of the service and that corresponds to the second user to the data analytics network element. Correspondingly, the data analytics network element may receive the target quality-of-service parameter information that is of the service and corresponds to the second user and that is sent by the policy control network element. In this manner, the data analytics network element can obtain target quality-of-service parameters of each service that correspond to all users in the entire network, and the data analytics network element can obtain, through training based on the target quality-of-service parameter information, a load model corresponding to the network.

Optionally, in some embodiments, the policy control network element may further send target service quality information to the data analytics network element. The target service quality information is service quality information that is in the at least one piece of service quality information and that corresponds to the target quality-of-service parameter information that is of the service and that corresponds to the second user. Correspondingly, the data analytics network element may receive the target service quality information. In this manner, the data analytics network element can learn of quality information that is of the service and that corresponds to the target quality-of-service parameters of each service that correspond to all the users in the entire network. This helps provide service quality data to support the data analytics network element in subsequently obtaining, through training, the load model corresponding to the network.

After determining the target quality-of-service parameter information that is of the service and that corresponds to the second user, the policy control network element may generate, based on the target quality-of-service parameter information, a quality-of-service policy corresponding to a service procedure of the second user, and send the quality-of-service policy to a related network element or terminal. As such, the related network element or terminal allocates a resource to or sets the quality-of-service parameter for the service procedure of the second user based on the quality-of-service policy, thereby ensuring that the service procedure of the second user has corresponding service quality. The quality-of-service policy may be the target quality-of-service parameter information, or may not be the target quality-of-service parameter information but is obtained after intermediate processing is performed on the target quality-of-service parameter information. As described above, the target quality-of-service parameter information that is of the service and that corresponds to the second user is included in the at least one group of quality-of-service parameter information of the service, in other words, the target quality-of-service parameter information is one of the at least one group of quality-of-service parameter information of the service. In some other embodiments, the target quality-of-service parameter information that is of the service and that corresponds to the second user may alternatively be generated based on the at least one group of quality-of-service parameter information of the service. In other words, the target quality-of-service parameter information may not be one of the at least one group of quality-of-service parameter information of the service. For example, the policy control network element may modify one of the at least one group of quality-of-service parameter information of the service, and use the modified group of quality-of-service parameter information of the service as the target quality-of-service parameter information that is of the service and that corresponds to the second user. Alternatively, the policy control network element may generate a quality-of-service policy based on one of the at least one group of quality-of-service parameter information of the service, and the quality-of-service policy is used as the target quality-of-service parameter information that is of the service and that corresponds to the second user.

Figure 3:
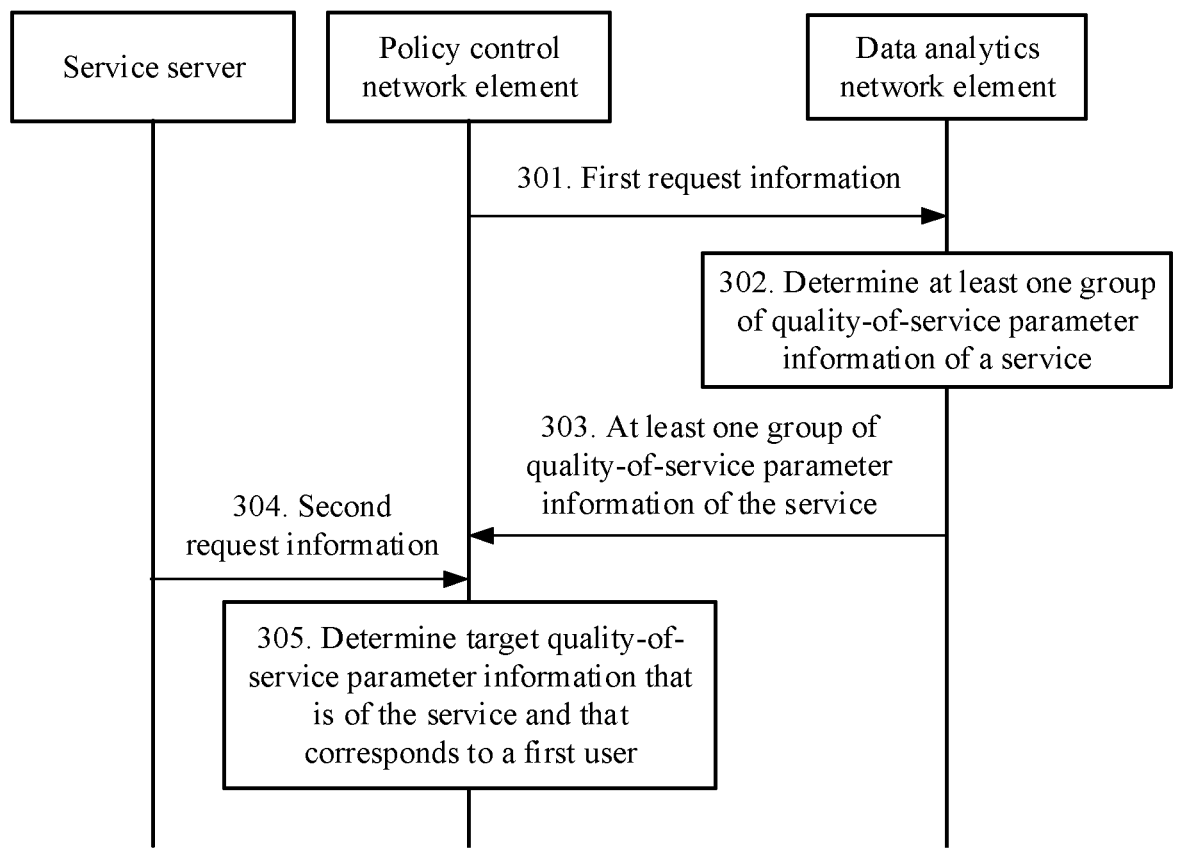
FIG. 3 is a schematic flowchart of another quality-of-service parameter obtaining method according to an embodiment of this application.

FIG. 3 is a schematic flowchart of another quality-of-service parameter obtaining method according to an embodiment of this application.

301. A policy control network element sends first request information to a data analytics network element.

The first request information may be real-time request information or subscription request information. For an implementation of step 301, refer to the descriptions of step 201 in the method shown in FIG. 2. Details are not necessarily described herein again.

302. The data analytics network element determines at least one group of quality-of-service parameter information of a service based on the first request information.

For an implementation of step 302, refer to the descriptions of step 202 in the method shown in FIG. 2. Details are not necessarily described herein again.

303. The policy control network element receives the at least one group of quality-of-service parameter information of the service that is sent by the data analytics network element.

For an implementation of step 303, refer to the descriptions of step 203 in the method shown in FIG. 2. Details are not necessarily described herein again.

304. The policy control network element receives second request information sent by a service server, where the second request information is used to request to set up the service for a first user.

For an implementation of step 304, refer to the descriptions of step 204 in the method shown in FIG. 2. Details are not necessarily described herein again.

305. The policy control network element determines, based on user category information of the first user and/or a service quality requirement of the first user and the at least one group of quality-of-service parameter information of the service, target quality-of-service parameter information that is of the service and that corresponds to the first user.

In some embodiments, the policy control network element may further receive an applicable condition that is of each group of quality-of-service parameter information of the service and that is sent by the data analytics network element. In this way, the policy control network element can determine corresponding target quality-of-service parameter information based on the applicable condition.

For an implementation of step 305, refer to the descriptions of step 205 in the method shown in FIG. 2. Details are not necessarily described herein again.

Figure 4:
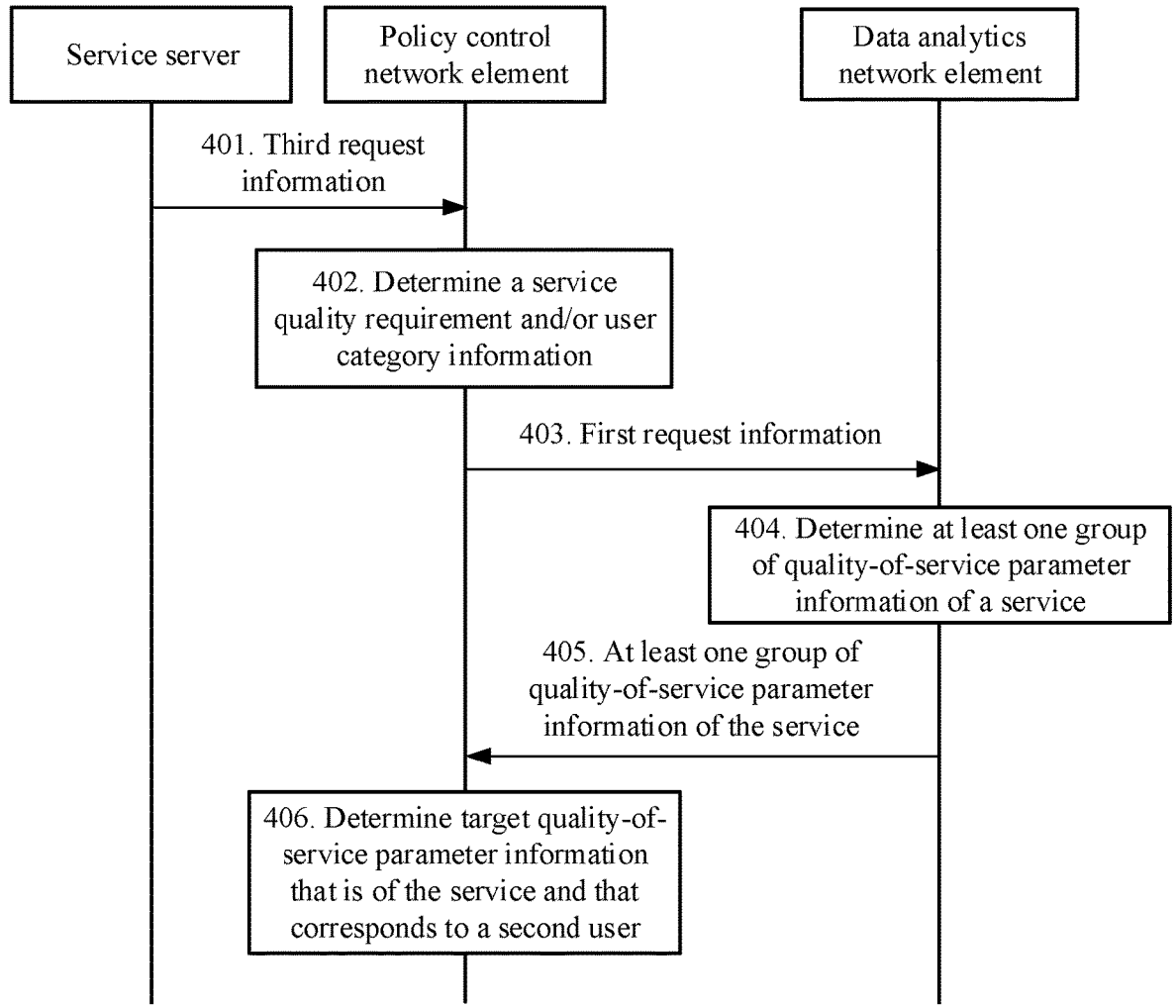
FIG. 4 is a schematic flowchart of another quality-of-service parameter obtaining method according to an embodiment of this application.

FIG. 4 is a schematic flowchart of another quality-of-service parameter obtaining method according to an embodiment of this application.

401. A policy control network element receives third request information sent by a service server, where the third request information is used to request to set up a service for a second user.

For an implementation of step 401, refer to the descriptions of step 206 in the method shown in FIG. 2. Details are not necessarily described herein again.

402. The policy control network element determines a service quality requirement and/or user category information based on the third request information, where the service quality requirement is a service quality requirement of the second user, and the user category information is user category information of the second user.

For an implementation of step 402, refer to the descriptions of step 207 in the method shown in FIG. 2. Details are not necessarily described herein again.

403. The policy control network element sends first request information to a data analytics network element.

The first request information may be real-time request information or subscription request information. For an implementation of step 403, refer to the descriptions of step 201 in the method shown in FIG. 2. Details are not necessarily described herein again.

404. The data analytics network element determines at least one group of quality-of-service parameter information of the service based on the first request information.

For an implementation of step 404, refer to the descriptions of step 202 in the method shown in FIG. 2. Details are not necessarily described herein again.

405. The policy control network element receives the at least one group of quality-of-service parameter information of the service that is sent by the data analytics network element.

For an implementation of step 405, refer to the descriptions of step 202 in the method shown in FIG. 2. Details are not necessarily described herein again.

In some embodiments, the policy control network element may further receive an applicable condition that is of each group of quality-of-service parameter information of the service and that is sent by the data analytics network element. In this way, the policy control network element can determine corresponding target quality-of-service parameter information based on the applicable condition.

406. The policy control network element determines, based on the at least one group of quality-of-service parameter information of the service, target quality-of-service parameter information that is of the service and that corresponds to the second user.

For an implementation of step 405, refer to the descriptions of step 208 in the method shown in FIG. 2. Details are not necessarily described herein again.

Figure 5:
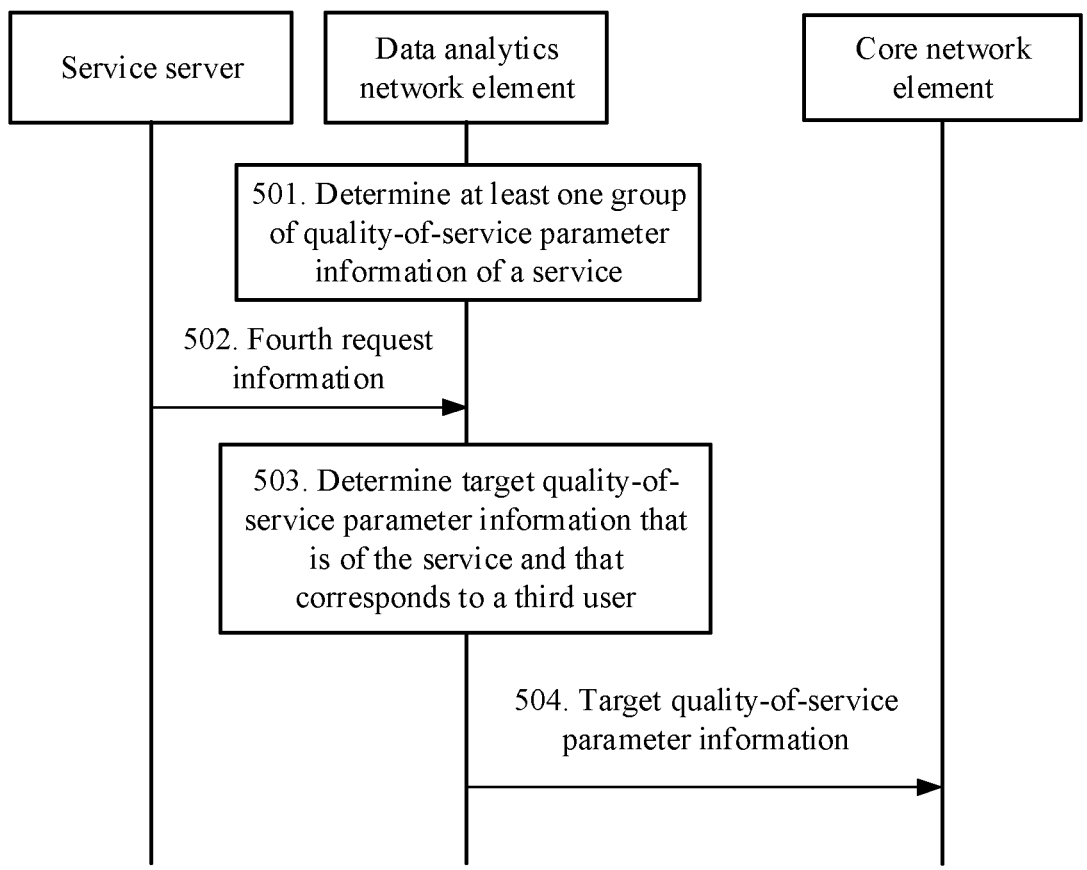
FIG. 5 is a schematic flowchart of another quality-of-service parameter obtaining method according to an embodiment of this application.

FIG. 5 is a schematic flowchart of another quality-of-service parameter obtaining method according to an embodiment of this application. In this embodiment, a data analytics network element may be a PCF or another network element having a data analytics function.

501. The data analytics network element determines at least one group of quality-of-service parameter information of a service, where each of the at least one group of quality-of-service parameter information corresponds to a service quality requirement on the service and/or user category information.

For details of meanings and content of the service quality requirement and/or the user category information, refer to the meanings and content of the service quality requirement and/or the user category information that are/is included in the first request message in step 201. The details are not described herein again. The data analytics network element may obtain the service quality requirement on the service and/or the user category information from a service server of the service.

For an implementation of step 501, refer to the descriptions of step 202 in the method shown in FIG. 2, and at least one difference is as follows.

(1) In addition to an AF, user-level historical service quality data of the service that is obtained by the data analytics network element may further come from another network device, for example, from another network element that has a network device analytics function, such as an NWDAF.

(2) The user-level historical service quality data herein may be user-level historical service quality observation data, and a meaning of the user-level historical service quality data is the same as a meaning of the user-level historical service quality data in step 202. Alternatively, the user-level historical service quality data may be user-level historical service quality evaluation data, where the user-level historical service quality evaluation data may be service quality data that is obtained after a first network device (for example, the NWDAF) performs intermediate processing and that can reflect a user level. However, regardless of which type of the historical service quality data, a method for obtaining, by the data analytics network element based on the historical service quality data, the at least one group of quality-of-service parameter information of the service is similar to that in step 202. Details are not described herein again.

A method for obtaining the user-level service quality evaluation data by the first network device (for example, the NWDAF) is as follows.

The first network device obtains the user-level historical service quality observation data of the service from the server of the service. For a meaning of the historical service quality observation data, refer to the user-level historical service quality data provided by the AF in step 202.

The first network device obtains, from a network, historical network data corresponding to the user-level historical service quality observation data of the service. For a meaning of the historical network data herein, refer to the meaning of the historical network data in step 202.

The first network device obtains the user-level service quality evaluation data of the service based on the user-level historical service quality observation data of the service and the corresponding historical network data.

For example, the first network device learns of, based on a large amount of user-level historical service quality observation data and corresponding historical network data, a model relationship between user-level service quality observation data and corresponding historical network data. The first device may further learn of user-level service quality data based on the model relationship and current network data, where the learned user-level service quality data is used as the user-level service quality evaluation data.

502. The data analytics network element receives fourth request information sent by the service server, where the fourth request information is used to request to set up the service for a third user.

For an implementation of step 502, refer to the descriptions of step 204 in the method shown in FIG. 2. A difference lies in: An execution body of this step is changed from the policy control network element in step 204 to the data analytics network element, in other words, in this step, the data analytics network element performs an operation of the policy control network element in step 204.

503. The data analytics network element determines, based on user category information of the third user and/or a service quality requirement of the third user and the at least one group of quality-of-service parameter information of the service, target quality-of-service parameter information that is of the service and that corresponds to the third user.

The target quality-of-service parameter information that is of the service and that corresponds to the third user is included in the at least one group of quality-of-service parameter information of the service, in other words, the target quality-of-service parameter information is one of the at least one group of quality-of-service parameter information of the service. In some other embodiments, the target quality-of-service parameter information that is of the service and that corresponds to the third user may alternatively be generated based on the at least one group of quality-of-service parameter information of the service, in other words, the target quality-of-service parameter information may not be one of the at least one group of quality-of-service parameter information of the service. For example, the policy control network element may modify one of the at least one group of quality-of-service parameter information of the service, and use the modified group of quality-of-service parameter information of the service as the target quality-of-service parameter information that is of the service and that corresponds to the third user. Alternatively, the policy control network element may generate a quality-of-service policy based on one of the at least one group of quality-of-service parameter information of the service, and the quality-of-service policy is used as the target quality-of-service parameter information that is of the service and that corresponds to the third user.

For an implementation of step 503, refer to the descriptions of step 205 in the method shown in FIG. 2. A difference only lies in: An execution body of this step is changed from the policy control network element in step 205 to the data analytics network element, in other words, in this step, the data analytics network element performs an operation of the policy control network element in step 205.

In some embodiments, the data analytics network element may not determine, based on the user category information of the third user and/or the service quality requirement of the third user, the target quality-of-service parameter information that is of the service and that corresponds to the third user. Before determining the target quality-of-service parameter information that is of the service and that corresponds to the third user, the data analytics network element first obtains, from the first device, current user-level service quality evaluation data corresponding to the third user, and then determines, based on the current user-level service quality evaluation data corresponding to the third user and the at least one group of quality-of-service parameter information of the service, the target quality-of-service parameter information that is of the service and that corresponds to the third user.

It should be noted that the current user-level service quality evaluation data corresponding to the third user that is sent by the first device to the data analytics network element may be a current user-level service quality value range corresponding to the third user, for example, a current MOS value range of the third user.

504. The data analytics network element sends the target quality-of-service parameter information to a core network element.

After determining the target quality-of-service parameter information that is of the service and that corresponds to the third user, the data analytics network element may send the quality-of-service parameter information to a related network element or terminal, such that the related network element or terminal allocates a resource to or sets a quality-of-service parameter for a service procedure of the third user based on the quality-of-service parameter information, thereby ensuring that the service procedure of the third user has corresponding service quality.

Figure 6:
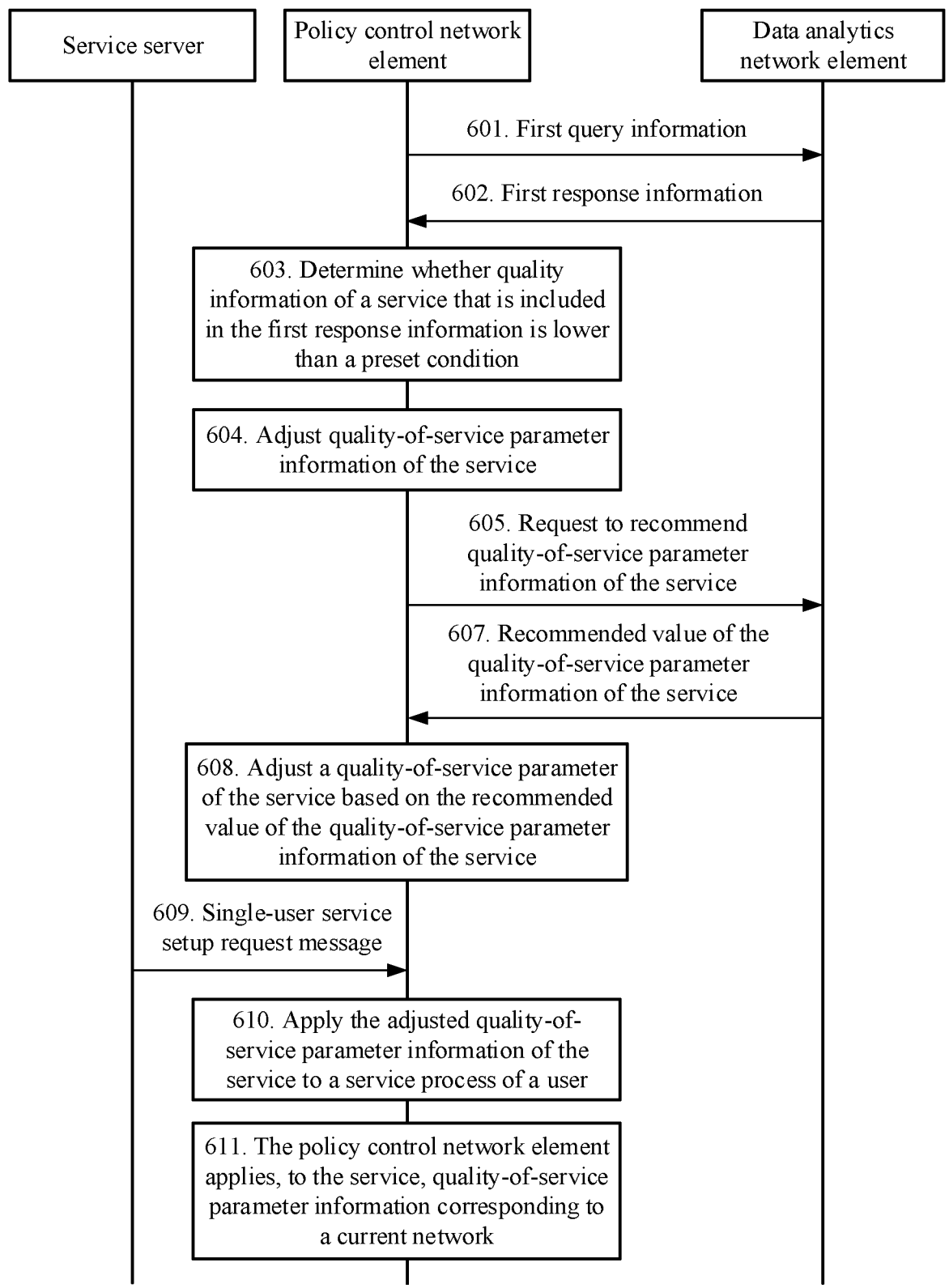
FIG. 6 is a schematic flowchart of another quality-of-service parameter obtaining method according to an embodiment of this application.

FIG. 6 is a schematic flowchart of another quality-of-service parameter obtaining method according to an embodiment of this application.

601. A policy control network element sends first query information to a data analytics network element, where the first query information is used to obtain service quality information. Correspondingly, the data analytics network element receives the first query information sent by the policy control network element.

In some embodiments, the service quality information may be information that reflects a degree to which quality-of-service parameter information of the service satisfies a service requirement, in other words, use effect information of the quality-of-service parameter information. For example, the service quality information may include three levels: "high", "medium", and "low", where "high" indicates a very high degree to which the quality-of-service parameter satisfies the service requirement, "medium" indicates a medium degree to which the quality-of-service parameter satisfies the service requirement, and "low" indicates a very low degree to which the quality-of-service parameter satisfies the service requirement. Certainly, the degree to which the quality-of-service parameter satisfies the service requirement may alternatively be expressed in another form. This is not limited herein. For example, the degree may be a specific value in an interval [0, 1]. How to calculate the degree to which the quality-of-service parameter information satisfies the service requirement belongs to an internal algorithm of the data analytics network element. This is not limited in this application.

In some embodiments, the service quality information may be information that reflects service experience. For example, network-evaluated service quality data can reflect the service experience. Network-evaluated service quality includes evaluated average MOS information or service user satisfaction information. The average MOS information is an average value of MOSs evaluated by the data analytics network element for all service users in an entire network or some areas of the network. Service user satisfaction is a percentage of users who meet a single-user service quality requirement of the service. For example, a percentage of users whose MOSs of a voice service are greater than three scores is 95%.

In some embodiments, the service quality information may be trustworthiness information of the service, and the trustworthiness information is information that can reflect a degree of proximity between network-evaluated service quality and actual service quality of the service. For example, the trustworthiness information may be a floating point value in [0, 1]. A larger value indicates higher trustworthiness, namely, a higher degree of proximity between the network-evaluated service quality and the actual service quality of the service. For example, compared with a case in which a value of the trustworthiness information is 0.3, a case in which a value of the trustworthiness information is 0.8 corresponds to a higher degree of proximity between the network-evaluated service quality and the actual service quality of the service. For example, the data analytics network element may calculate trustworthiness based on an absolute difference between the network-evaluated service quality and the actual service quality of the service, where a smaller difference indicates higher trustworthiness. For example, an evaluated service quality MOS is equal to 3, an actual MOS is equal to 4, an absolute difference between the evaluated MOS and the actual MOS is 1, and a trustworthiness value corresponding to 1 is 0.8. For another example, an evaluated service quality MOS is equal to 3.8, an actual MOS is equal to 4, an absolute difference between the evaluated MOS and the actual MOS is 0.2, and a trustworthiness value corresponding to 0.2 is 0.98. There may further be another algorithm for calculating the trustworthiness in this application. This is not limited in this application.

In this application, the service quality information may be one type or a combination of several types of the service quality information that is described in the foregoing three embodiments. Certainly, the service quality information may alternatively be expressed in another form, as long as that a level of the service quality can be reflected.

The network-evaluated service quality may be determined by the data analytics network element. The actual service quality of the service may be obtained by the data analytics network element from another network device. For example, the data analytics network element may obtain the actual service quality of the service from a service server.

The data analytics network element generates the network-evaluated service quality data, for example, a user-level MOS evaluation value of the voice service, namely, a MOS evaluation value of a single user, based on one or more of data reported by a user performing the service, data reported by each network device related to the service, or data reported by the service server.

In some embodiments, the data analytics network element obtains user-level or flow-level network data of the service, and obtains the network-evaluated service quality data of the service based on the user-level or flow-level network data.

The user-level or flow-level network data is network flow data corresponding to a single service process of each user. The network flow herein may be a QoS flow in a 5G network. The network flow data may include a quality of service (QoS) parameter provided by a network device, user equipment, or the service server for the single service process of the user, for example, a guaranteed flow bit rate (GFBR), a maximum flow bit rate (MFBR), an uplink or downlink maximum packet loss rate (UL or DL Max PLR), a packet delay budget (PDB), a packet error rate (PER), an average window size, or a maximum data burst volume.

For example, this manner may be divided into three execution phases.

Phase 1: The data analytics network element obtains a single-user service quality model of the service, namely, a user-level service quality model. The model refers to a variation relationship between user-level service quality of the service and the user-level or flow-level network data.

For example, the data analytics network element may obtain the single-user service quality model of the service using the following two steps.

A: The data analytics network element obtains training data of the service, where the training data is correspondingly the user-level actual service quality data and the user-level or flow-level network data.

The data analytics network element first collects data separately from network elements such as the service server (for example, an AF), an access network element (for example, a RAN), a user plane function network element (for example, a UPF), a terminal device (for example, a UE), a mobility management function network element (for example, an AMF), a session management function network element (for example, an SMF), and a policy control function network element (for example, a PCF), and then associates the data of the network elements using information such as a service identifier, a service flow identifier, a terminal identifier, an identifier of a session on which a service flow is located, an association identifier existing on each network element, and a time, to obtain the complete training data. The training data includes the following content.

(1). User-level actual service quality data, coming from the service server.

The user-level actual service quality data includes service quality data of at least one single user, and user-level service quality may be equivalent to single-user service quality, namely, service experience of a single user. The user-level service quality is data for evaluating service experience of each user. For example, for the voice service, a MOS is used to evaluate single-user voice service quality, and a value range of the MOS is [0, 5]. A higher MOS indicates better voice service experience of a user. For example, for a voice MOS=4.5 and a voice MOS=3 of a user, voice service experience corresponding to the voice MOS=4.5 is better. For a video service, video service experience of each user is evaluated using a vMOS. Methods for calculating the MOS and the vMOS are different. Herein, evaluating the single-user service quality using the MOS and the vMOS is merely two examples for the voice service and the video service for description. For another type of service, there are a plurality of other methods for evaluating the single-user service quality. For example, for a data service, single-user service quality of the data service may be evaluated comprehensively using parameters such as a data packet loss rate and an average data packet transmission latency. This is not limited in this patent.

(2). Other time-variant parameter data affecting the user-level actual service quality data, namely, the user-level or flow-level network data, including:

i. TCP congestion window data, TCP receive window data, jitter buffer data, media coding type and coding rate data, buffer data, and data of at least one data type that are from the AF network element;

ii. flow bit rate data, packet loss rate data, latency data, radio channel quality data, and data of at least one data type that are from the RAN element;

iii. flow bit rate data, packet loss rate data, latency data, and data of at least one data type that are from the UPF network element;

iv. flow bit rate data, packet loss rate data, latency data, data of at least one data type, TCP congestion window data, TCP receive window data, jitter buffer data, media coding type and coding rate data, buffer data, central processing unit (CPU) usage, memory usage, and data of at least one data type that are from the UE; and v. other data.

It should be noted that the user-level or flow-level network data may also include normalized network data and the like. This is not specifically limited in this embodiment of this application.

B. For example, the data analytics network element obtains a relational model between the user-level actual service quality data and the user-level or flow-level network data, namely, a single-user service experience model, based on a linear regression method. Details are as follows:

$$h(x)=w_0 x_0+w_1 x_1+w_2 x_2+w_3 x_3+\ldots+w_D x_D \quad \text{(formula 1.1)}$$

In the formula (1.1), $h(x)$ is user-level actual service quality of a service, for example, a single-user MOS value of the voice service. $X=(x_1, x_2, x_3, \ldots, x_D)$ is an eigenvector. For example, $x_1$ indicates a latency, $x_2$ indicates a packet loss rate, $x_3$ indicates a flow bit rate, ..., $x_D$ indicates a TCP congestion window, and $x_0$ is the constant 1. $W=(w_1, w_2, w_3, \ldots, w_D)$ is a parameter vector, and is also referred to as a weight vector, and $w_1$ indicates a value of a weight of an $i^{th}$ parameter affecting the user-level service quality.

The foregoing linear regression is only an example of a data analysis algorithm, and the data analytics network element may obtain the single-user service experience model based on another algorithm. This is not specifically limited in this application.

Phase 2: The data analytics network element obtains user-level service quality evaluation data based on the existing single-user service quality model and the user-level or flow-level network data.

It should be noted that, a difference between the user-level or flow-level network data in Phase 2 and the user-level or flow-level network data in Phase 1 lies in that, in terms of time, the former is generated after the latter, to be more specific, the user-level or flow-level network data described in Phase 1 is historical data of the user-level or flow-level network data described in Phase 2. It can be inferred from this that user-level service quality data corresponding to the user-level or flow-level network data described in Phase 1 is also historical data of user-level service quality data corresponding to the user-level or flow-level network data described in Phase 2. In addition, a difference between the user-level actual service quality data in Phase 1 and the user-level service quality evaluation data in Phase 2 lies in that, the former is obtained by the data analytics network element from the service server, and the latter is a value evaluated by the data analytics network element on the service quality.

If the data analytics network element has learned of the h(x)=model in the formula (1.1), the data analytics network element can calculate, based on a specific value of the independent variable $X=(x_1, x_2, x_3, \ldots, x_D)$ at a subsequent time point (to be more specific, flow-level network data corresponding to a subsequent time point), a specific value of h(x) that corresponds to the subsequent time point. For example, when h(x) is the MOS=3 of the voice service, a value of h(x) is derived single-user service quality. A large amount of single-user service quality data obtained using the process method for a plurality of times forms the user-level service quality evaluation data.

In the method in this phase, after obtaining the stable single-user service quality model using the method in Phase 1, the data analytics network element may further conversely derive the corresponding user-level service quality data using the user-level or flow-level network data. The conversely derived user-level service quality data is used as the service quality evaluation data. In addition, the data analytics network element may further calculate, using the obtained user-level service quality evaluation data, an average of service quality evaluation data of all service users in the entire network or some areas of the network or a degree of satisfaction of a service user.

The first query information may include identification information of the service, and the identification information of the service is used to uniquely identify the service. For details of the identification information of the service, refer to the descriptions of the identification information of the service in FIG. 2. Details are not described herein again.

Optionally, in some embodiments, the first query information may further include time information, in other words, the first query information is used to obtain service quality information corresponding to the time information. A specific form of the time information is not limited in this embodiment of this application. For example, the time information may be an absolute time, for example, from 00:00 on Jan. 1, 2017 to 24:00 on Jan. 30, 2017. Alternatively, the time information may be relative time information, for example, from one month earlier than a time at which the first query information is sent to the time at which the first query information is sent. A granularity of the time information may be an hour, a minute, or a day. This is not limited in this embodiment of this application.

Optionally, in some embodiments, the first query information may further include space information, in other words, the first query information is used to query service quality information corresponding to the space information. A specific form of the space information is not limited in this embodiment of this application. The space information may be space information defined in a 3GPP communications network (referred to as communications network space information for short below), for example, a serving cell A or a registration area B. Alternatively, the space information may be space information defined in a non-3GPP communications network. For example, the space information is a specific geographical location range (for example, latitude-longitude space information, or global positioning system (GPS) space information, where the space information defined in the non-3GPP communications network is referred to as geographical space information for short below).

Optionally, in some embodiments, the first query information may further include service description information of the service, in other words, the first query information is used to query quality information that is of the service and that corresponds to the service description information. For details of a meaning of the service description information, refer to the descriptions of the service description information in the embodiment shown in FIG. 2. Details are not necessarily described herein again.

Optionally, in some embodiments, if the service runs on a slice network, the first query information may further include identification information of the slice network, and the identification information of the slice network may be NSSAI, S-NSSAI, an NSI, or the like. In other words, the first query information is used to query quality information that is of the service and that corresponds to the slice network indicated by the slice network identifier.

Optionally, in some embodiments, the first query information may further include data network name (DNN) information corresponding to the service. In other words, the first query information is used to query service quality information corresponding to the DNN.

Optionally, in some embodiments, the first query information may further include an access point name (APN) corresponding to the service. In other words, the first query information is used to query quality information that is of the service and that corresponds to the APN. Optionally, in some embodiments, the first query information may further include first quality-of-service parameter information. The first quality-of-service parameter information is quality-of-service parameter information that is of the service and that corresponds to a current network. For a meaning of the quality-of-service parameter information, refer to the quality-of-service parameter information shown in FIG. 2. Details are not described herein again. The first quality-of-service parameter information may be used by the data analytics network element to evaluate service quality. For example, the data analytics network element uses the first quality-of-service parameter as all or a part of the user-level or flow-level network data in Phase 2, to obtain the user-level service quality evaluation data.

Optionally, in some embodiments, the first query information may further include a service quality requirement on the service and/or user category information, in other words, the first query information is used to query quality information that is of the service and that corresponds to the service quality requirement and/or the user category information.

The service quality requirement may be a plurality of service quality requirements on the service. In this case, the first query information is used to query quality information that is of the service and that corresponds to each of the plurality of service quality requirements. The user category information may be a plurality of pieces of user category information. In this case, the first query information is used to query quality information that is of the service and that corresponds to each of the plurality of pieces of user category information.

602. The data analytics network element sends first response information to the policy control network element, where the first response information includes the quality information that is of the service and that is requested using the first query information. Correspondingly, the policy control network element receives the first response information sent by the data analytics network element.

Optionally, in some embodiments, the first response information includes the identification information of the service.

Optionally, in some embodiments, the first response information may further include the time information. In other words, the first response information includes the service quality information corresponding to the time information. The time information is used to indicate that the service quality information is service quality information at a time indicated by the time information.

Optionally, in some embodiments, the first response information may further include the space information, in other words, the first response information includes the service quality information corresponding to the space information. The space information is used to indicate that the service quality information is service quality information in space indicated by the space information.

Optionally, in some embodiments, the first response information may further include the service description information of the service. The service description information is used to indicate that the service quality information is quality information that is of the service and that corresponds to the service description information.

Optionally, in some embodiments, the first response information may further include the identification information of the slice network on which the service is located. In this way, the policy control network element can determine, based on the identification information of the slice network, a slice network corresponding to the service quality information.

Optionally, in some embodiments, the first response information may further include the data network name information corresponding to the service. In this way, the policy control network element can determine, based on the data network name information, a data network corresponding to the service quality information.

Optionally, in some embodiments, the first response information may further include the access point name corresponding to the service. In this way, the policy control network element can determine, based on the access point name, an access point corresponding to the service quality information.

Optionally, in some embodiments, when the first query information includes the first quality-of-service parameter information, the first response information may further include the first quality-of-service parameter information. The first quality-of-service parameter information is the quality-of-service parameter information that is of the service and that corresponds to the current network. The first quality-of-service parameter information is used to indicate that the quality-of-service parameter information of the service is quality information that is of the service and that corresponds to the current network.

Optionally, in some embodiments, the first response information may further include the service quality requirement information of the service and/or the user category information, in other words, the first response information includes the quality information that is of the service and that corresponds to the service quality requirement information and/or the user category information. The service quality requirement information may be a plurality of pieces of service quality requirement information of the service. In this case, the first response information includes the quality information that is of the service and that corresponds to each of the plurality of pieces of service quality requirement information. The user category information may be a plurality of pieces of user category information. In this case, the first response information includes the quality information that is of the service and that corresponds to each of the plurality of pieces of user category information.

Optionally, in some embodiments, the first response information further includes at least one group of quality-of-service parameter information of the service that is recommended by the data analytics network element. For a meaning and content of the quality-of-service parameter information of the service, refer to step 203. Details are not described herein again.

The policy control network element may determine, depending on whether the service quality information satisfies a preset condition, whether the quality-of-service parameter information that is of the service and that corresponds to the current network can enable service experience to reach an expected value. For example, that the service quality information is not lower than the preset condition may indicate that the quality-of-service parameter information that is of the service and that corresponds to the current network can enable the service experience to reach the expected value; and that the service quality information is lower than the preset condition may indicate that the quality-of-service parameter information that is of the service and that corresponds to the current network cannot enable the service experience to reach the expected value.

Optionally, in some embodiments, the method shown in FIG. 6 may further include step 603, and the method shown in FIG. 6 may further include some of step 604 to step 611.

603. The policy control network element determines whether the service quality information that is included in the first response information is lower than the preset condition.

In some embodiments, that the service quality information is lower than the preset condition may indicate that trustworthiness information of the service is lower than a preset value.

In some other embodiments, that the service quality information is lower than the preset condition may indicate that the service quality information is worse than other preset quality information, for example, that a MOS evaluation value of the service is low than a preset value.

That the service quality information is not lower than the preset condition may indicate that the quality-of-service parameter information that is of the service and that corresponds to the current network can enable the service experience to reach the expected value. That the service quality information is lower than the preset condition may indicate that the quality-of-service parameter information corresponding to the current network cannot enable the service experience to reach the expected value.

Optionally, in some embodiments, if the policy control network element determines that the service quality information that is included in the first response information is lower than the preset condition, step 604 is performed.

604. The policy control network element adjusts the quality-of-service parameter information of the service. The quality-of-service parameter information of the service is adjusted, such that the quality-of-service parameter information of the service can enable the service experience to reach the expected value.

The policy control network element may adjust the quality-of-service parameter information that is of the service and that corresponds to the current network, for example, adjust one or more pieces of parameter information in the quality-of-service parameter information, to improve the service quality. For example, for the service, the GFBR and the MFBR in the QoS parameters are increased, and a service latency and the like are decreased.

In some embodiments, when the first response information includes the time information, the policy control network element adjusts the quality-of-service parameter information that is of the service and that corresponds to the time information.

In some embodiments, when the first response information includes the space information, the policy control network element adjusts the quality-of-service parameter information that is of the service and that corresponds to the space information.

In some embodiments, when the first response information includes the identification information of the slice network, the policy control network element adjusts the quality-of-service parameter information that is of the service and that corresponds to the slice network.

In some embodiments, when the first response information includes the DNN information, the policy control network element adjusts the quality-of-service parameter information that is of the service and that corresponds to the DNN.

In some embodiments, when the first response information includes the APN, the policy control network element adjusts the quality-of-service parameter information that is of the service and that corresponds to the APN.

In some embodiments, when the first response information includes the service quality requirement and/or the user category information, the policy control network element adjusts the quality-of-service parameter information that is of the service and that corresponds to the quality requirement on the service and/or the user category information. The service quality requirement may be a plurality of service quality requirements on the service, and the user category information may be a plurality of pieces of user category information.

Optionally, in some embodiments, if the policy control network element determines that the service quality information that is included in the first response information is lower than the preset condition, some or all of steps 605 to 610 are performed.

605. The policy control network element requests the data analytics network element to recommend quality-of-service parameter information of the service.

As described above, that the service quality information is lower than the preset condition may indicate that the quality-of-service parameter information corresponding to the current network cannot enable the service experience to reach the expected value. Therefore, the policy control network element may request the data analytics network element to recommend quality-of-service parameter information that is of the service and that can meet expected service experience.

For this step, refer to the method described in step 201. Details are not described herein again. That the policy control network element requests the quality-of-service parameter information of the service from the data analytics network element using the first request information in step 201 is equivalent to that the policy control network element requests, using the first request information, the data analytics network element to recommend the quality-of-service parameter information of the service.

606. The data analytics network element determines a recommended value of the quality-of-service parameter information of the service.

For this step, refer to the method described in step 202. Details are not described herein again. The at least one group of quality-of-service parameters of the service that is determined by the data analytics network element in step 202 is equivalent to the recommended value of the quality-of-service parameter information herein.

607. The data analytics network element sends the recommended value of the quality-of-service parameter information of the service to the policy control network element.

For this step, refer to the method described in step 203. Details are not described herein again. The at least one group of quality-of-service parameters of the service that is sent by the data analytics network element in step 203 is equivalent to the sent recommended value of the quality-of-service parameter information of the service herein.

608. The policy control network element adjusts a quality-of-service parameter of the service based on the recommended value of the quality-of-service parameter information of the service.

The policy control network element performs, based on one or more of the at least one group of quality-of-service parameter information of the service that is sent by the data analytics network element, the operation of adjusting the quality-of-service parameter of the service. For example, when the at least one group of quality-of-service parameter information of the service corresponds to only one service quality requirement and/or only one piece of user category information, the policy control network element performs, based on one of the at least one group of quality-of-service parameter information of the service, the operation of adjusting the quality-of-service parameter of the service. When the at least one group of quality-of-service parameter information of the service corresponds to a plurality of service quality requirements and/or a plurality of pieces of user category information, for each service quality requirement and/or each piece of user category information, the policy control network element performs, based on one group that is in the at least one group of quality-of-service parameter information of the service and that corresponds to the service quality requirement and/or the user category information, the operation of adjusting the quality-of-service parameter of the service.

In some embodiments, the policy control network element may adjust and set the quality-of-service parameter information of the service completely based on the quality-of-service parameter information recommended by the data analytics network element. For example, quality-of-service parameters of the service that originally exist in the policy control network element are GFBR=300 and MFBR=500, and recommended quality-of-service parameters are GFBR=350 and MFBR=600. In this case, the policy control network element adjusts the GFBR from 300 to 350, and adjusts the MFBR from 500 to 600.

In some other embodiments, in a case different from the foregoing case, the policy control network element adjusts and sets the quality-of-service parameter information of the service only with reference to the quality-of-service parameter information recommended by the data analytics network element. The two pieces of quality-of-service parameter information are not limited to be completely the same. In addition, the two pieces of quality-of-service parameter information may be different not only in terms of values but also in terms of parameter types. For example, the quality-of-service parameter recommended by the data analytics network element may be coding information of the service, and the policy control network element adjusts maximum packet loss rate information of a data packet based on the coding information.

609. The policy control network element receives a single-user service setup request message sent by the service server, where the request message is used to request to set up the service for a user.

For details of this step, refer to step 204. The first user in step 204 is an example of a single user herein, and details are not described herein again.

610. The policy control network element applies the adjusted quality-of-service parameter information of the service to a service process of the user.

In some embodiments, the policy control network element may further determine user category information and/or a service quality requirement of the user, and determine, based on the user category information and/or the service quality requirement of the user, a corresponding group of adjusted quality-of-service parameter information of the service to be used.

The policy control network element directly or indirectly generates a corresponding quality-of-service policy for the service of the user based on the adjusted quality-of-service parameter information, and sends the quality-of-service policy to a corresponding network device, a corresponding terminal, and the service server.

In some embodiments, if the policy control network element determines that the service quality information that is included in the first response information is not lower than the preset condition, step 611 is performed.

611. The policy control network element applies, to the service, the quality-of-service parameter information corresponding to the current network.

That the service quality information is not lower than the preset condition may indicate that the quality-of-service parameter information corresponding to the current network can enable the service experience to reach the expected value. Therefore, the policy control network element may not need to request the recommended quality-of-service parameter information of the service from the data analytics network element. The policy control network element may apply, to the service, the quality-of-service parameter information corresponding to the current network. To be more specific, when a user initiates or performs the service, the policy control network element directly or indirectly generates a corresponding quality-of-service policy for the service of the user based on the quality-of-service parameter information corresponding to the current network, and sends the quality-of-service policy to a corresponding network device, a corresponding terminal, and the service server.

In some other embodiments, if the policy control network element determines that the service quality information that is included in the first response information is not lower than the preset condition, some or all of steps 605 to 610 may be performed.

Optionally, in some embodiments, the policy control network element may repeatedly perform the procedure shown in FIG. 6. In this way, it can be ensured that the policy control network element constantly queries and checks whether quality-of-service parameter information that is of the service and that is used by the network is appropriate, in other words, whether expected service quality information can be reached. Optionally, in some embodiments, the policy control network element may perform the procedure in FIG. 6 periodically or in a scheduled manner. Optionally, in some other embodiments, the policy control network element may perform the procedure in FIG. 6 in an event-triggered manner.

Figure 7:
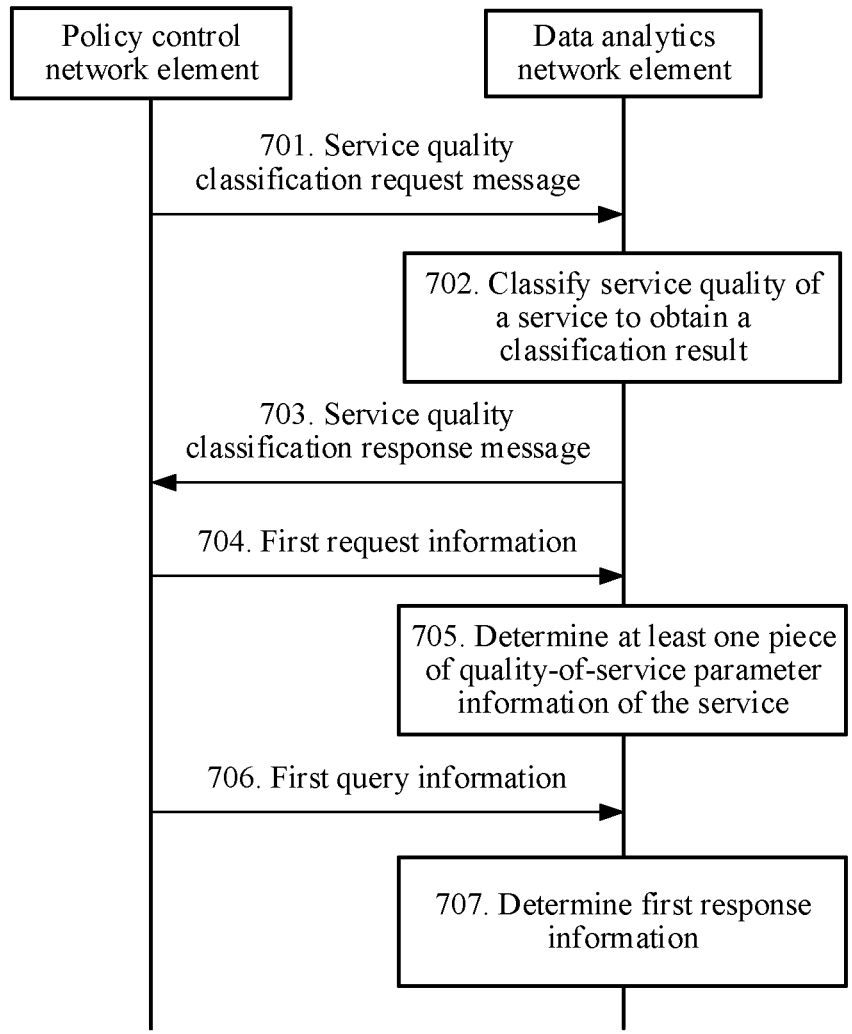
FIG. 7 is a schematic flowchart of a method for obtaining a classification of service quality according to an embodiment of this application.

FIG. 7 is a schematic flowchart of a method for obtaining a classification of service quality according to an embodiment of this application.

701. A policy control network element sends a service quality classification request message to a data analytics network element, where the service quality classification request message is used to request the data analytics network element to provide classification information of service quality for a service. Correspondingly, the data analytics network element receives the service quality classification request message sent by the policy control network element. The service quality classification request message includes identification information of the service, and the identification information of the service is used to uniquely identify the service. For details of the identification information of the service, refer to the descriptions of the identification information of the service in FIG. 2. Details are not described herein again.

Unless particularly specified, the service quality in this embodiment is user-level service quality. The user-level service quality may be equivalent to single-user service quality, namely, service experience of a single user. The user-level service quality is data for evaluating service experience of each user. For example, for a voice service, a MOS is used to evaluate single-user voice service quality, and a value range of the MOS is [0, 5]. A higher MOS indicates better voice service experience of a user. For example, for a voice MOS=4.5 and a voice MOS=3 of a user, voice service experience corresponding to the voice MOS=4.5 is better. For a video service, video service experience of each user is evaluated using a vMOS. Methods for calculating the MOS and the vMOS are different. Herein, evaluating the single-user service quality using the MOS and the vMOS is merely two examples for the voice service and the video service for description. For another type of service, there are a plurality of other methods for evaluating the single-user service quality. For example, for a data service, single-user service quality of the data service may be evaluated comprehensively using parameters such as a data packet loss rate and an average data packet transmission latency. This is not limited in this patent.

For a service, the data analytics network element has a large amount of service quality data, for example, a large amount of user-level MOS data of the voice service. The large amount of service quality data in the data analytics network element may be obtained from original service quality data, namely, actual service quality data, in a service server of the service. The large amount of service quality data in the data analytics network element may alternatively be generated by the data analytics network element, that is, the large amount of service quality data is network-evaluated service quality data. For example, the data analytics network element generates the network-evaluated service quality data, for example, user-level MOS evaluation data of the voice service, based on one or more of user data reported by a user performing the service, network data reported by each network device related to the service, or service data reported by the service server.

The classification information of the service quality is a classification result of user-level service quality data. For example, the classification information of the service quality may be division of a MOS value range of the service, for example, MOS [3, 4] and MOS [4, 5]. Optionally, in some embodiments, the service quality classification request message includes a first classification quantity, and the first classification quantity is used to indicate, to the data analytics network element, a classification value recommended or expected by the policy control network element on the service quality of the service. For example, for the voice service, MOSs recommended or expected by the policy control network element may be classified into three categories.

Optionally, in some embodiments, the service quality classification request message may further include time information, in other words, the service quality classification request message is used to request classification information that is of the service quality and that corresponds to the time information. A specific form of the time information is not limited in this embodiment of this application. For example, the time information may be an absolute time, for example, from 00:00 on Jan. 1, 2017 to 24:00 on Jan. 30, 2017. Alternatively, the time information may be relative time information, for example, from one month earlier than a time at which the first query information is sent to the time at which the first query information is sent. A granularity of the time information may be an hour, a minute, or a day. This is not limited in this embodiment of this application.

Optionally, in some embodiments, the service quality classification request message may further include space information, in other words, the service quality classification request message is used to request classification information that is of the service quality and that corresponds to the space information. A specific form of the space information is not limited in this embodiment of this application. The space information may be space information defined in a 3GPP communications network (referred to as communications network space information for short below), for example, a serving cell A or a registration area B. Alternatively, the space information may be space information defined in a non-3GPP communications network. For example, the space information is a specific geographical location range (for example, latitude-longitude space information, or global positioning system (GPS) space information, where the space information defined in the non-3GPP communications network is referred to as geographical space information for short below).

Optionally, in some embodiments, the service quality classification request message may further include service description information of the service, in other words, the service quality classification request message is used to request classification information that is of the service quality and that corresponds to the service description information. For details of a meaning of the service description information, refer to the descriptions of the service description information in the embodiment shown in FIG. 2. Details are not necessarily described herein again.

Optionally, in some embodiments, if the service runs on a slice network, the service quality classification request message may further include identification information of the slice network, and the identification information of the slice network may be NSSAI, S-NSSAI, an NSI, or the like. In other words, the service quality classification request message is used to request classification information that is of the service quality and that corresponds to the slice network indicated by the slice network identifier.

Optionally, in some embodiments, the service quality classification request message may further include data network name (DNN) information corresponding to the service. In other words, the service quality classification request message is used to request classification information that is of the service quality and that corresponds to the DNN.

In some embodiments, the service quality classification request message may further include APN information. In other words, the service quality classification request message is used to request classification information that is of the service quality and that corresponds to the APN.

702. The data analytics network element classifies the service quality of the service based on the service quality classification request message, to obtain a classification result.

For the service, the data analytics network element classifies the large amount of service quality data using an internal calculation method, to obtain the classification result.

For example, the data analytics network element classifies the large amount of user-level MOS data of the voice service using a K-Means algorithm, to obtain that the MOS of the voice service may be classified into five categories: MOS= [0, 1], MOS=[1, 2], MOS=[2, 3], MOS=[3, 4], and MOS=[4, 5]. MOS data of each single user may belong to one of the five categories, for example, if a voice MOS of a user is equal to 3.8, the MOS=3.8 may belong to the category of MOS=[3, 4].

The foregoing uses only the K-Means algorithm as an example for description. Actually, in this embodiment of this application, another internal calculation method such as a cosine angle classification method may alternatively be used. This is not limited herein.

In some embodiments, the data analytics network element may self-determine a classification quantity of the service quality data. For example, a classification quantity of the MOS of the voice service is 5. The data analytics network element may determine an optimal classification quantity based on a data volume of stored service quality data and an internal algorithm. The optimal classification quantity may make a classification degree not excessively high or not excessively low, and the data analytics network element may use the optimal classification quantity as the classification quantity of the service quality data.

In some other embodiments, the data analytics network element may determine the classification quantity of the service quality data based on the first classification quantity provided by the policy control network element in step 701. For example, the data analytics network element directly uses the first classification quantity as the classification quantity of the service quality data. Alternatively, the data analytics network element generates a second classification quantity based on the first classification quantity, and uses the second classification quantity as the classification quantity of the service quality data.

In some embodiments, when the service quality classification request message further includes the time information, the data analytics network element may classify the service quality of the service based on the time information. For example, only service quality data in a time period is classified.

In some embodiments, when the service quality classification request message further includes the space information, the data analytics network element may classify the service quality of the service based on the space information. For example, only service quality data in a spatial range is classified.

Optionally, in some embodiments, when the service quality classification request message further includes the service description information of the service, the data analytics network element may further classify the service quality of the service based on the service description information of the service.

Optionally, in some embodiments, when the service quality classification request message includes the identification information of the slice network, the data analytics network element may further classify the service quality of the service based on the identification information of the slice network.

Optionally, in some embodiments, when the service quality classification request message includes the data network name (DNN) information corresponding to the service, the data analytics network element may further classify the service quality of the service based on the DNN information.

Optionally, in some embodiments, when the service quality classification request message includes the APN information, the data analytics network element may further classify the service quality of the service based on the APN information.

703. The data analytics network element sends a service quality classification response message to the policy control network element, where the service quality classification response message includes the classification information of the service quality of the service. Correspondingly, the policy control network element receives the service quality classification response message sent by the data analytics network element.

The data analytics network element sends, as the classification information of the service quality to the policy control network element, one or more categories in the classification result determined in step 702. For example, the data analytics network element may send all of the MOS=[0, 1], MOS=[1, 2], MOS=[2, 3], MOS=[3, 4], and MOS=[4, 5] to the policy control network element as the classification information of the service quality. For another example, the data analytics network element may send only the MOS=[3, 4] and MOS=[4, 5] to the policy control network element.

In some embodiments, the data analytics network element may alternatively send an actual classification quantity to the policy control network element. The actual classification quantity is a classification quantity of the service quality data that is obtained by the data analytics network element. For example, in the example in step 702, the actual classification quantity is 5. The actual classification data may be the same as or different from the first classification quantity sent by the policy control network element. This is not limited in this application.

In some embodiments, the service quality classification response message may further include the time information. In other words, the service quality classification response message includes the classification information that is of the service quality of the service and that corresponds to the time information.

In some embodiments, the service quality classification response message may further include the space information. In other words, the service quality classification response message includes the classification information that is of the service quality of the service and that corresponds to the space information.

In some embodiments, the service quality classification response message may further include the service description information of the service. In other words, the service quality classification response message includes the classification information that is of the service quality of the service and that corresponds to the service description information of the service.

In some embodiments, the service quality classification response message may further include the identification information of the slice network. In other words, the service quality classification response message includes the classification information that is of the service quality of the service and that corresponds to the identification information of the slice network.

In some embodiments, the service quality classification response message may further include the data network name (DNN) information corresponding to the service. In other words, the service quality classification response message includes the classification information that is of the service quality of the service and that corresponds to the DNN information.

In some embodiments, the service quality classification response message may further include the APN information. In other words, the service quality classification response message includes the classification information that is of the service quality of the service and that corresponds to the APN information.

The foregoing step is actually a method for properly dividing a value range of the service quality using the data analytics network element. Subsequently, the policy control network element separately obtains quality-of-service parameter information for service quality of different categories based on the division of the value range of the service quality.

In some embodiments, the method shown in FIG. 7 may further include step 704 and step 705.

704. The policy control network element sends first request information to the data analytics network element. Correspondingly, the data analytics network element receives the first request information.

The first request information includes a service quality requirement. In other words, in this case, the first request information is used to request quality-of-service parameter information that is of the service and that corresponds to the service quality requirement.

The service quality requirement may be the classification information of the service quality, or may be generated by the policy control network element based on the classification information of the service quality. For the service quality requirement, refer to the meaning and content of the service quality requirement described in FIG. 2. Details are not described herein again.

In some embodiments, the policy control network element generates one service quality requirement based on one category in the classification information of the service quality. The service quality requirement is included in the first request information in step 201, and then the first request information is sent to the data analytics network element. For example, the policy control network element generates a service quality requirement of the MOS=[3, 4] based on the category of the MOS=[3, 4].

In some other embodiments, the policy control network element generates a plurality of service quality requirements based on a plurality of categories in the classification information of the service quality, and a plurality of pieces of service quality classification information correspond to the plurality of service quality requirements. The plurality of service quality requirements are included in the first request information in step 201, and then the first request information is sent to the data analytics network element. For example, the policy control network element generates a service quality requirement of the MOS=[3, 4] based on the category of the MOS=[3, 4], and generates a service quality requirement of the MOS=[4, 5] based on the category of the MOS=[4, 5].

It should be noted that the foregoing uses an example in which the service quality requirement is equal to the corresponding category of the service quality for description. Actually, whether the service quality requirement is the same as the corresponding category of the service quality is not limited in this application. For example, the policy control network element may generate a service quality requirement of the MOS=[3.5, 4] based on the category of the MOS=[3, 4].

705. The data analytics network element determines at least one piece of quality-of-service parameter information of the service based on the service quality requirement.

For an implementation of step 705, refer to the embodiment shown in FIG. 2. Details are not necessarily described herein again. It may be understood that the data analytics network element and the policy control network element may further perform step 203 in the embodiment shown in FIG. 2. The data analytics network element and the policy control network element may further perform some of step 204 to step 208 in the embodiment shown in FIG. 2. For an implementation, refer to the embodiment shown in FIG. 2. Details are not necessarily described herein again.

Optionally, in some embodiments, the method shown in FIG. 7 may further include step 706 and step 707.

706. The policy control network element may send first query information to the data analytics network element, where the first query information includes the service quality requirement. Correspondingly, the data analytics network element receives the first query information.

In other words, in this case, the first query information is used to obtain quality information that is of the service and that corresponds to the service quality requirement.

The service quality requirement may be the classification information of the service quality, or may be generated by the policy control network element based on the classification information of the service quality. For the service quality requirement, refer to the meaning and content of the service quality requirement shown in FIG. 2. Details are not described herein again.

In some embodiments, the policy control network element generates one service quality requirement based on one category in the classification information of the service quality. The service quality requirement is included in the first request information in step 201, and then the first request information is sent to the data analytics network element. For example, the policy control network element generates a service quality requirement of the MOS=[3, 4] based on the category of the MOS=[3, 4].

In some other embodiments, the policy control network element generates a plurality of service quality requirements based on a plurality of categories in the classification information of the service quality, and a plurality of pieces of service quality classification information correspond to the plurality of service quality requirements. The plurality of service quality requirements are included in the first request information in step 201, and then the first request information is sent to the data analytics network element. For example, the policy control network element generates a service quality requirement of the MOS=[3, 4] based on the category of the MOS=[3, 4], and generates a service quality requirement of the MOS=[4, 5] based on the category of the MOS=[4, 5].

It should be noted that the foregoing uses an example in which the service quality requirement is equal to the corresponding category of the service quality for description. Actually, whether the service quality requirement is the same as the corresponding category of the service quality is not limited in this application. For example, the policy control network element may generate a service quality requirement of the MOS=[3.5, 4] based on the category of the MOS=[3, 4].

The service quality requirement may be a plurality of service quality requirements on the service. In this case, the first query information is used to obtain quality information that is of the service and that corresponds to each of the plurality of service quality requirements.

For an implementation of step 706, refer to the method shown in FIG. 6. Details are not necessarily described herein again.

707. The data analytics network element determines first response information based on the service quality requirement.

For an implementation of step 707, refer to the embodiment shown in FIG. 6. Details are not necessarily described herein again. It may be understood that, the data analytics network element and the policy control network element may further perform some of step 603 to step 611 in the embodiment shown in FIG. 6. For an implementation, refer to the embodiment shown in FIG. 6. Details are not necessarily described herein again.

Figure 8:
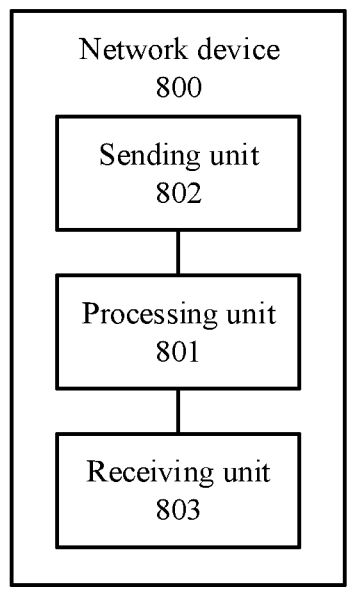
FIG. 8 is a structural block diagram of a network device according to an embodiment of this application.

FIG. 8 is a structural block diagram of a network device according to an embodiment of this application. The network device 800 shown in FIG. 8 includes a processing unit 801, a sending unit 802, and a receiving unit 803. The network device 800 may be the policy control network element in the embodiments shown in FIG. 2 to FIG. 4, FIG. 6, and FIG. 7.

For example, when the network device 800 is the policy control network element in the embodiment shown in FIG. 2, the sending unit may be configured to send first request information to a data analytics network element. The receiving unit may be configured to receive at least one group of quality-of-service parameter information of a service that is sent by the data analytics network element. The receiving unit may further be configured to receive second request information sent by a service server. The processing unit may be configured to determine target quality-of-service parameter information that is of the service and that corresponds to a first user. The receiving unit may further be configured to receive third request information sent by the service server. The processing unit may further be configured to determine a service quality requirement and/or user category information. The processing unit may further be configured to determine target quality-of-service parameter information that is of the service and that corresponds to a second user.

For another example, when the network device 800 is the policy control network element in the embodiment shown in FIG. 3, the sending unit may be configured to send first request information to a data analytics network element. The receiving unit may be configured to receive at least one group of quality-of-service parameter information of a service that is sent by the data analytics network element. The receiving unit may further be configured to receive second request information sent by a service server. The processing unit may be configured to determine target quality-of-service parameter information that is of the service and that corresponds to a first user.

For another example, when the network device 800 is the policy control network element in the embodiment shown in FIG. 4, the receiving unit may be configured to receive third request information sent by a service server. The processing unit may further be configured to determine a service quality requirement and/or user category information. The processing unit may further be configured to determine target quality-of-service parameter information that is of a service and that corresponds to a second user. The sending unit may be configured to send first request information to a data analytics network element. The receiving unit may be configured to receive at least one group of quality-of-service parameter information of the service that is sent by the data analytics network element. The receiving unit may further be configured to receive second request information sent by the service server. The processing unit may further be configured to determine target quality-of-service parameter information that is of the service and that corresponds to the second user.

For another example, when the network device 800 is the policy control network element in the embodiment shown in FIG. 6, the sending unit may be configured to send first query information. The receiving unit may be configured to receive first response information. The processing unit may be configured to determine whether quality parameter information of a service that is included in the first response information is lower than a preset condition. The processing unit may further be configured to adjust a quality-of-service parameter of the service. The sending unit may further be configured to request a data analytics network element to recommend quality-of-service parameter information of the service. The receiving unit may further be configured to receive a recommended value that is of the quality-of-service parameter information of the service and that is sent by the data analytics network element. The processing unit may further be configured to adjust the quality-of-service parameter of the service based on the recommended value of the quality-of-service parameter information of the service. The receiving unit may further be configured to receive a single-user service setup request message sent by a service server. The processing unit may further be configured to apply the adjusted quality-of-service parameter information of the service to a service process of the user. The processing unit may further be configured to apply, to the service, quality-of-service parameter information corresponding to a current network.

For another example, when the network device 800 is the policy control network element in the embodiment shown in FIG. 7, the sending unit may be configured to send a service quality classification request message. The receiving unit may be configured to receive a service quality classification response message. The processing unit may be configured to determine first request information. The sending unit may be configured to send the first request information.

In a possible implementation, the processing unit 801 may be implemented by a processor, the sending unit 802 may be implemented by a transmitter, and the receiving unit 803 may be implemented by a receiver. For functions and beneficial effects of the processing unit 801, the sending unit 802, and the receiving unit 803, refer to the methods shown in FIG. 2 to FIG. 4, FIG. 6, and FIG. 7. Details are not described herein again.

In a possible implementation, a communications apparatus is further provided. The communications apparatus may be a network device, or may be a component (for example, a chip or a circuit) of a network device. The communications apparatus may include a processor. The communications apparatus may further include a receiver, a transmitter, and a memory. The processor may be configured to implement a corresponding function and operation of the foregoing processing unit. The transmitter may be configured to implement a corresponding function and operation of the foregoing sending unit. The receiver may be configured to implement a function and an operation of the foregoing receiving unit. The transmitter and the receiver may be integrated together to be referred to as a transceiver. A component configured to implement a receiving function in the transceiver is considered as a receiving unit, and a component configured to implement a sending function is considered as a sending unit. The memory may be configured to store an executable instruction or application program code, where the processor controls execution to implement, together with the receiver and the transmitter, the methods provided in the foregoing embodiments of this application; and/or the memory may be configured to temporarily store some data, instruction information, and the like. The memory may be independent of the processor. In this case, the memory may be connected to the processor through a communications line. In another possible design, the memory may alternatively be integrated with the processor. This is not limited in this embodiment of this application.

Figure 9:
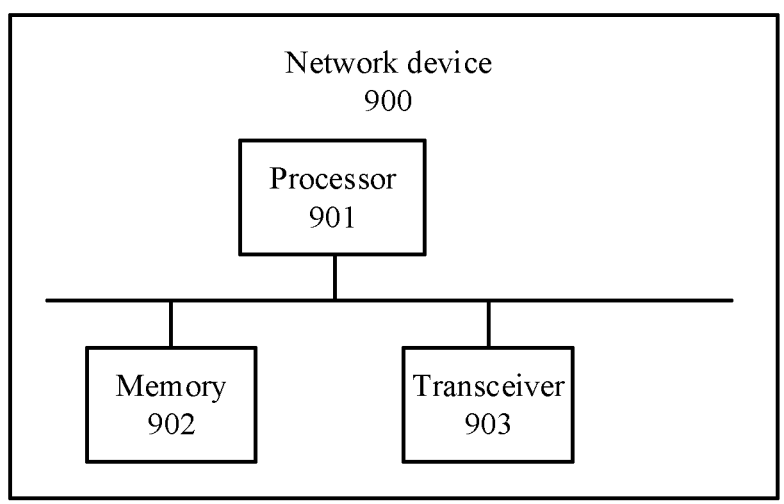
FIG. 9 is a structural block diagram of a network device according to an embodiment of this application.

FIG. 9 is a structural block diagram of a network device according to an embodiment of this application. As shown in FIG. 9, the network device 900 includes a processor 901 and a memory 902. The processor 901 may be configured to process a communication protocol and communication data, control the network device, execute a software program, process data of the software program, and so on. The memory 902 is mainly configured to store the software program and the data.

For ease of description, FIG. 9 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit or component with sending and receiving functions may be considered as a transceiver 903 of the network device, and a processor with a processing function is considered as a processing unit of the network device. The transceiver may also be referred to as a transceiver unit, a transceiver apparatus, or the like. The processing unit may also be referred to as a processor, a processing board, a processing module, a processing apparatus, or the like. A component configured to implement a receiving function in the transceiver 903 may be considered as a receiving unit, and a component configured to implement a sending function in the transceiver 903 may be considered as a sending unit. In other words, the transceiver 903 includes a receiving unit and a sending unit. The receiving unit sometimes may also be referred to as a receiver, a receiver circuit, or the like. The sending unit sometimes may also be referred to as a transmitter, a transmitter circuit, or the like.

The processor 901, the memory 902, and the transceiver 903 communicate with each other through an internal connection path, to transmit a control signal and/or a data signal.

The foregoing methods disclosed in the embodiments of this application may be applied to the processor 901, or may be implemented by the processor 901. The processor 901 may be an integrated circuit chip and has a signal processing capability. In an implementation process, steps in the foregoing methods may be completed using an integrated logic circuit of hardware in the processor 901 or using an instruction in a form of software.

The processor described in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component, and may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished using a combination of hardware and a software module in the decoding processor. The software module may be located in a mature storage medium in the art, such as a random-access memory (RAM), a flash memory, a read-only memory (ROM), a programmable read-only memory, an electrically erasable programmable memory, or a register. The storage medium is located in the memory, and the processor reads an instruction in the memory and completes the steps in the foregoing methods in combination with hardware of the processor.

In some embodiments, the memory 902 may store an instruction used to perform the method performed by the policy control network element in the method shown in FIG. 2. The processor 901 may execute the instruction stored in the memory 902 to implement, together with other hardware (for example, the transceiver 903), the steps performed by the policy control network element in the method shown in FIG. 2. For a working process and beneficial effects, refer to the descriptions in the embodiment shown in FIG. 2.

In some embodiments, the memory 902 may store an instruction used to perform the method performed by the policy control network element in the method shown in FIG. 3. The processor 901 may execute the instruction stored in the memory 902 to implement, together with other hardware (for example, the transceiver 903), the steps performed by the policy control network element in the method shown in FIG. 3. For a working process and beneficial effects, refer to the descriptions in the embodiment shown in FIG. 3.

In some embodiments, the memory 902 may store an instruction used to perform the method performed by the policy control network element in the method shown in FIG. 4. The processor 901 may execute the instruction stored in the memory 902 to implement, together with other hardware (for example, the transceiver 903), the steps performed by the policy control network element in the method shown in FIG. 4. For a working process and beneficial effects, refer to the descriptions in the embodiment shown in FIG. 4.

In some embodiments, the memory 902 may store an instruction used to perform the method performed by the policy control network element in the method shown in FIG. 6. The processor 901 may execute the instruction stored in the memory 902 to implement, together with other hardware (for example, the transceiver 903), the steps performed by the policy control network element in the method shown in FIG. 6. For a working process and beneficial effects, refer to the descriptions in the embodiment shown in FIG. 6.

In some embodiments, the memory 902 may store an instruction used to perform the method performed by the policy control network element in the method shown in FIG. 7. The processor 901 may execute the instruction stored in the memory 902 to implement, together with other hardware (for example, the transceiver 903), the steps performed by the policy control network element in the method shown in FIG. 7. For a working process and beneficial effects, refer to the descriptions in the embodiment shown in FIG. 7.

An embodiment of this application further provides a chip, including a transceiver unit and a processing unit. The transceiver unit may be an input/output circuit or a communications interface. The processing unit is a processor, a microprocessor, or an integrated circuit that is integrated on the chip. The chip may perform the method on the policy control network element side in the foregoing method embodiments.

An embodiment of this application further provides a computer-readable storage medium. The computer-readable storage medium stores an instruction; when the instruction is executed, the method on the policy control network element side in the foregoing method embodiments is performed.

An embodiment of this application further provides a computer program product including an instruction. When the instruction is executed, the method on the policy control network element side in the foregoing method embodiments is performed.

Figure 10:
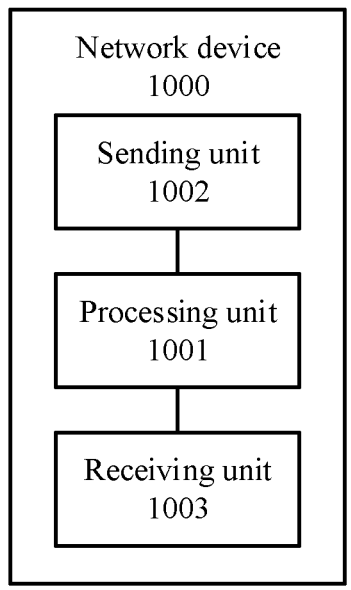
FIG. 10 is a structural block diagram of a network device according to an embodiment of this application.

FIG. 10 is a structural block diagram of a network device according to an embodiment of this application. The network device 1000 shown in FIG. 10 includes a processing unit 1001, a sending unit 1002, and a receiving unit 1003. The network device 1000 may be the data analytics network element in the embodiments shown in FIG. 2 to FIG. 7.

For example, when the network device 1000 is the data analytics network element in the embodiment shown in FIG. 2, the receiving unit may be configured to receive first request information sent by a policy control network element. The processing unit may be configured to determine at least one group of quality-of-service parameter information of a service. The sending unit may be configured to send the at least one group of quality-of-service parameter information of the service to the policy control network element.

For another example, when the network device 1000 is the data analytics network element in the embodiment shown in FIG. 3, the receiving unit may be configured to receive first request information sent by a policy control network element. The processing unit may be configured to determine at least one group of quality-of-service parameter information of a service. The sending unit may be configured to send the at least one group of quality-of-service parameter information of the service to the policy control network element.

For another example, when the network device 1000 is the data analytics network element in the embodiment shown in FIG. 4, the receiving unit may be configured to receive first request information sent by a policy control network element. The processing unit may be configured to determine at least one group of quality-of-service parameter information of a service. The sending unit may be configured to send the at least one group of quality-of-service parameter information of the service to the policy control network element.

For another example, when the network device 1000 is the data analytics network element in the embodiment shown in FIG. 5, the processing unit may be configured to determine at least one group of quality-of-service parameter information of a service. The receiving unit may be configured to receive fourth request information sent by a policy control network element. The processing unit may be configured to determine target quality-of-service parameter information that is of the service and that corresponds to a third user.

For another example, when the network device 1000 is the data analytics network element in the embodiment shown in FIG. 6, the receiving unit may be configured to receive first query information. The sending unit may be configured to send first response information. The receiving unit may further be configured to receive first request information that is sent by a policy control network element and that is used to request to recommend quality-of-service parameter information of the service. The sending unit may further be configured to send a recommended value of the quality-of-service parameter information of the service. The processing unit may be configured to determine the first response information and the recommended value of the quality-of-service parameter information of the service.

For another example, when the network device 1000 is the data analytics network element in the embodiment shown in FIG. 7, the receiving unit may be configured to receive a service quality classification request message. The processing unit may be configured to determine a classification result. The sending unit may be configured to send a service quality classification response message. The receiving unit may be configured to receive first request information.

In a possible manner, the processing unit 1001 may be implemented by a processor, and the sending unit 1002 may be implemented by a transmitter. For functions and beneficial effects of the processing unit 1001 and the sending unit 1002, refer to the methods shown in FIG. 2 to FIG. 7. Details are not described herein again.

In a possible implementation, a communications apparatus is further provided. The communications apparatus may be a network device, or may be a component (for example, a chip or a circuit) of a network device. The communications apparatus may include a processor. The communications apparatus may further include a transmitter and a memory. The processor may be configured to implement a corresponding function and operation of the foregoing processing unit. The transmitter may be configured to implement a corresponding function and operation of the foregoing sending unit. The transmitter and a receiver may be integrated together to be referred to as a transceiver. A component configured to implement a receiving function in the transceiver is considered as a receiving unit, and a component configured to implement a sending function is considered as a sending unit. The memory may be configured to store an executable instruction or application program code, where the processor controls execution to implement, together with the transmitter, the methods provided in the foregoing embodiments of this application; and/or the memory may be configured to temporarily store some data, instruction information, and the like. The memory may be independent of the processor. In this case, the memory may be connected to the processor through a communications line. In another possible design, the memory may alternatively be integrated with the processor. This is not limited in this embodiment of this application.

Figure 11:
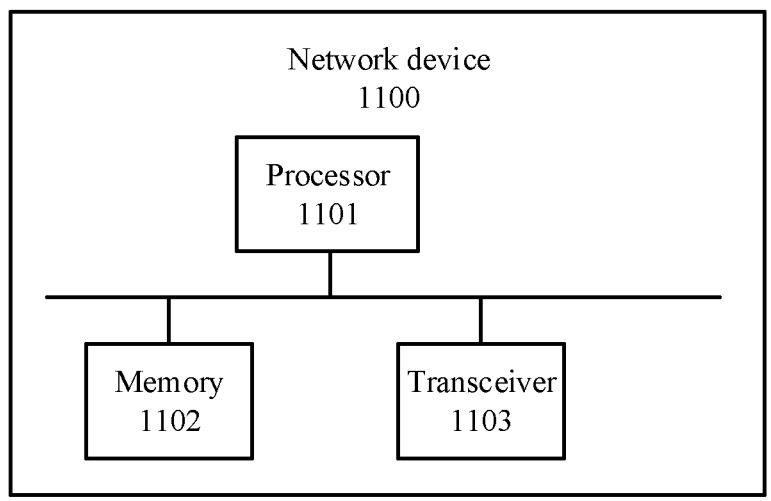
FIG. 11 is a structural block diagram of a network device according to an embodiment of this application.

FIG. 11 is a structural block diagram of a network device according to an embodiment of this application. As shown in FIG. 11, the network device 1100 includes a processor 1101 and a memory 1102. The processor 1101 may be configured to process a communication protocol and communication data, control the network device, execute a software program, process data of the software program, and so on. The memory 1102 is mainly configured to store the software program and the data.

For ease of description, FIG. 11 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit or component with sending and receiving functions may be considered as a transceiver 1103 of the network device, and a processor with a processing function is considered as a processing unit of the network device. The transceiver may also be referred to as a transceiver unit, a transceiver, a transceiver apparatus, or the like. The processing unit may also be referred to as a processor, a processing board, a processing module, a processing apparatus, or the like. A component configured to implement a receiving function in the transceiver 1103 may be considered as a receiving unit, and a component configured to implement a sending function in the transceiver 1103 may be considered as a sending unit. In other words, the transceiver 1103 includes a receiving unit and a sending unit. The receiving unit sometimes may also be referred to as a receiver, a receiver, a receiver circuit, or the like. The sending unit sometimes may also be referred to as a transmitter, a transmitter, a transmitter circuit, or the like.

The processor 1101, the memory 1102, and the transceiver 1103 communicate with each other through an internal connection path, to transmit a control signal and/or a data signal.

The foregoing methods disclosed in the embodiments of this application may be applied to the processor 1101, or may be implemented by the processor 1101. The processor 1101 may be an integrated circuit chip and has a signal processing capability. In an implementation process, steps in the foregoing methods may be completed using an integrated logic circuit of hardware in the processor 1101 or using an instruction in a form of software.

The processor described in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component, and may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished using a combination of hardware and a software module in the decoding processor. The software module may be located in a mature storage medium in the art, such as a random-access memory (RAM), a flash memory, a read-only memory (ROM), a programmable read-only memory, an electrically erasable programmable memory, or a register. The storage medium is located in the memory, and the processor reads an instruction in the memory and completes the steps in the foregoing methods in combination with hardware of the processor.

In some embodiments, the memory 1102 may store an instruction used to perform the method performed by the data analytics network element in the method shown in FIG. 2. The processor 1101 may execute the instruction stored in the memory 1102 to implement, together with other hardware (for example, the transceiver 1103), the steps performed by the data analytics network element in the method shown in FIG. 2. For a working process and beneficial effects, refer to the descriptions in the embodiment shown in FIG. 2.

In some embodiments, the memory 1102 may store an instruction used to perform the method performed by the data analytics network element in the method shown in FIG. 3. The processor 1101 may execute the instruction stored in the memory 1102 to implement, together with other hardware (for example, the transceiver 1103), the steps performed by the data analytics network element in the method shown in FIG. 3. For a working process and beneficial effects, refer to the descriptions in the embodiment shown in FIG. 3.

In some embodiments, the memory 1102 may store an instruction used to perform the method performed by the data analytics network element in the method shown in FIG. 4. The processor 1101 may execute the instruction stored in the memory 1102 to implement, together with other hardware (for example, the transceiver 1103), the steps performed by the data analytics network element in the method shown in FIG. 4. For a working process and beneficial effects, refer to the descriptions in the embodiment shown in FIG. 4.

In some embodiments, the memory 1102 may store an instruction used to perform the method performed by the data analytics network element in the method shown in FIG. 5. The processor 1101 may execute the instruction stored in the memory 1102 to implement, together with other hardware (for example, the transceiver 1103), the steps performed by the data analytics network element in the method shown in FIG. 5. For a working process and beneficial effects, refer to the descriptions in the embodiment shown in FIG. 5.

In some embodiments, the memory 1102 may store an instruction used to perform the method performed by the data analytics network element in the method shown in FIG. 6. The processor 1101 may execute the instruction stored in the memory 1102, to implement, together with other hardware (for example, the transceiver 1103), the steps performed by the NWDAF in the method shown in FIG. 6. For a working process and beneficial effects, refer to the descriptions in the embodiment shown in FIG. 6.

In some embodiments, the memory 1102 may store an instruction used to perform the method performed by the data analytics network element in the method shown in FIG. 7. The processor 1101 may execute the instruction stored in the memory 1102, to implement, together with other hardware (for example, the transceiver 1103), the steps performed by the data analytics network element in the method shown in FIG. 7. For a working process and beneficial effects, refer to the descriptions in the embodiment shown in FIG. 7.

An embodiment of this application further provides a chip, including a transceiver unit and a processing unit. The transceiver unit may be an input/output circuit or a communications interface. The processing unit is a processor, a microprocessor, or an integrated circuit that is integrated on the chip. The chip may perform the method on the data analytics network element side in the foregoing method embodiments.

An embodiment of this application further provides a computer-readable storage medium. The computer-readable storage medium stores an instruction; when the instruction is executed, the method on the data analytics network element side in the foregoing method embodiments is performed.

An embodiment of this application further provides a computer program product including an instruction. When the instruction is executed, the method on the data analytics network element side in the foregoing method embodiments is performed.

Figure 12:
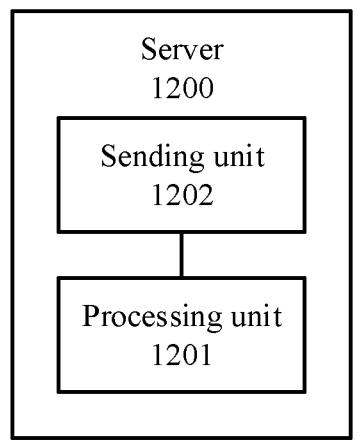
FIG. 12 is a structural block diagram of a server according to an embodiment of this application.

FIG. 12 is a structural block diagram of a server according to an embodiment of this application. The server 1200 shown in FIG. 12 includes a processing unit 1201 and a sending unit 1202. The server 1200 may be the service server in the embodiments shown in FIG. 2 to FIG. 6.

The sending unit may be configured to send information sent by the service server in any one of the embodiments shown in FIG. 2 to FIG. 6. The processing unit may be configured to determine the information sent by the sending unit.

For example, the sending unit may be configured to send second request information. The sending unit may be configured to send third request information. The sending unit may further be configured to send fourth request information. The sending unit may further be configured to send a single-user service setup message.

In a possible manner, the processing unit 1201 may be implemented by a processor, and the sending unit 1202 may be implemented by a transmitter. For functions and beneficial effects of the processing unit 1201 and the sending unit 1202, refer to the methods shown in FIG. 2 to FIG. 6. Details are not described herein again.

In a possible implementation, a communications apparatus is further provided. The communications apparatus may be a network device, or may be a component (for example, a chip or a circuit) of a network device. The communications apparatus may include a processor. The communications apparatus may further include a receiver and a memory. The processor may be configured to implement a corresponding function and operation of the foregoing processing unit. The receiver may be configured to implement a function and an operation of the foregoing receiving unit. The transmitter and the receiver may be integrated together to be referred to as a transceiver. A component configured to implement a receiving function in the transceiver is considered as a receiving unit, and a component configured to implement a sending function is considered as a sending unit. The memory may be configured to store an executable instruction or application program code, where the processor controls execution to implement, together with the receiver, the methods provided in the foregoing embodiments of this application; and/or the memory may be configured to temporarily store some data, instruction information, and the like. The memory may be independent of the processor. In this case, the memory may be connected to the processor through a communications line. In another possible design, the memory may alternatively be integrated with the processor. This is not limited in this embodiment of this application.

Figure 13:
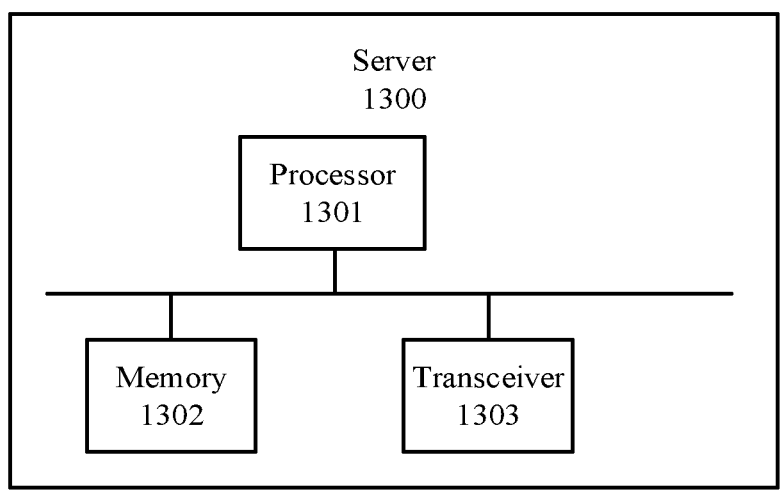
FIG. 13 is a structural block diagram of a server according to an embodiment of this application.

FIG. 13 is a structural block diagram of a server according to an embodiment of this application. As shown in FIG. 13, the server 1300 includes a processor 1301 and a memory 1302. The processor 1301 may be configured to process a communication protocol and communication data, control a network device, execute a software program, process data of the software program, and so on. The memory 1302 is mainly configured to store the software program and the data.

For ease of description, FIG. 13 shows only one memory and one processor. In an actual network device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, a circuit or component with sending and receiving functions may be considered as a transceiver 1303 of the network device, and a processor with a processing function is considered as a processing unit of the network device. The transceiver may also be referred to as a transceiver unit, a transceiver, a transceiver apparatus, or the like. The processing unit may also be referred to as a processor, a processing board, a processing module, a processing apparatus, or the like. A component configured to implement a receiving function in the transceiver 1303 may be considered as a receiving unit, and a component configured to implement a sending function in the transceiver 1303 may be considered as a sending unit. In other words, the transceiver 1303 includes a receiving unit and a sending unit. The receiving unit sometimes may also be referred to as a receiver, a receiver, a receiver circuit, or the like. The sending unit sometimes may also be referred to as a transmitter, a transmitter, a transmitter circuit, or the like.

The processor 1301, the memory 1302, and the transceiver 1303 communicate with each other through an internal connection path, to transmit a control signal and/or a data signal.

The foregoing methods disclosed in the embodiments of this application may be applied to the processor 1301, or may be implemented by the processor 1301. The processor 1301 may be an integrated circuit chip and has a signal processing capability. In an implementation process, steps in the foregoing methods may be completed using an integrated logic circuit of hardware in the processor 1301 or using an instruction in a form of software.

The processor described in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component, and may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished using a combination of hardware and a software module in the decoding processor. The software module may be located in a mature storage medium in the art, such as a random-access memory (RAM), a flash memory, a read-only memory (ROM), a programmable read-only memory, an electrically erasable programmable memory, or a register. The storage medium is located in the memory, and the processor reads an instruction in the memory and completes the steps in the foregoing methods in combination with hardware of the processor.

In some embodiments, the memory 1302 may store an instruction used to perform the method performed by the service server in the method shown in FIG. 2. The processor 1301 may execute the instruction stored in the memory 1302 to implement, together with other hardware (for example, the transceiver 1303), the steps performed by the service server in the method shown in FIG. 2. For a working process and beneficial effects, refer to the descriptions in the embodiment shown in FIG. 2.

In some embodiments, the memory 1302 may store an instruction used to perform the method performed by the service server in the method shown in FIG. 3. The processor 1301 may execute the instruction stored in the memory 1302 to implement, together with other hardware (for example, the transceiver 1303), the steps performed by the service server in the method shown in FIG. 3. For a working process and beneficial effects, refer to the descriptions in the embodiment shown in FIG. 3.

In some embodiments, the memory 1302 may store an instruction used to perform the method performed by the service server in the method shown in FIG. 4. The processor 1301 may execute the instruction stored in the memory 1302 to implement, together with other hardware (for example, the transceiver 1303), the steps performed by the service server in the method shown in FIG. 4. For a working process and beneficial effects, refer to the descriptions in the embodiment shown in FIG. 4.

In some embodiments, the memory 1302 may store an instruction used to perform the method performed by the service server in the method shown in FIG. 5. The processor 1301 may execute the instruction stored in the memory 1302 to implement, together with other hardware (for example, the transceiver 1303), the steps performed by the service server in the method shown in FIG. 5. For a working process and beneficial effects, refer to the descriptions in the embodiment shown in FIG. 5.

In some embodiments, the memory 1302 may store an instruction used to perform the method performed by the service server in the method shown in FIG. 6. The processor 1301 may execute the instruction stored in the memory 1302 to implement, together with other hardware (for example, the transceiver 1303), the steps performed by the service server in the method shown in FIG. 6. For a working process and beneficial effects, refer to the descriptions in the embodiment shown in FIG. 6.

An embodiment of this application further provides a chip, including a transceiver unit and a processing unit. The transceiver unit may be an input/output circuit or a communications interface. The processing unit is a processor, a microprocessor, or an integrated circuit that is integrated on the chip. The chip may perform the method on the service server side in the foregoing method embodiments.

An embodiment of this application further provides a computer-readable storage medium. The computer-readable storage medium stores an instruction; when the instruction is executed, the method on the service server side in the foregoing method embodiments is performed.

An embodiment of this application further provides a computer program product including an instruction. When the instruction is executed, the method on the service server side in the foregoing method embodiments is performed.

In the embodiments of this application, the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a UNIX operating system, an Android operating system, or a windows operating system, that implement service processing using a process. In addition, a specific structure of an execution body of the method provided in the embodiments of this application is not particularly limited in the embodiments of this application, as long as that the execution body can run a program that records code of the method provided in the embodiments of this application to perform communication based on the method provided in the embodiments of this application. For example, the execution body of the method provided in the embodiments of this application may be a network device, or a function module that can invoke and execute the program in the network device.

In the devices in FIG. 8 to FIG. 13 in this application, the components are in communication connection. To be more specific, the processing unit (or the processor), the storage unit (or the memory), and the transceiver unit (or the transceiver) communicate with each other through an internal connection path, to transmit a control signal and/or a data signal. The foregoing method embodiments of this application may be applied to the processor, or the processor implements the steps of the foregoing method embodiments. The processor may be an integrated circuit chip and has a signal processing capability. In an implementation process, steps in the foregoing method embodiments may be completed using an integrated logic circuit of hardware in the processor or using an instruction in a form of software. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate or a transistor logic device, or a discrete hardware component, and may implement or perform the methods, steps, and logical block diagrams that are disclosed in this application. The general-purpose processor may be a microprocessor, or the processor may be any conventional processor or the like. Steps of the methods disclosed in this application may be directly executed and accomplished by a hardware decoding processor, or may be executed and completed using a combination of hardware and a software module in the decoding processor. The software module may be located in a mature storage medium in the art, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. For example, the processor may be a single-core (single-CPU) processor, or may be a multi-core (multi-CPU) processor.

The memory is configured to store a computer instruction executed by the processor. The memory may be a storage circuit or a memory. The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content exchange between the processor and another unit or network element. For example, the transceiver may be a communications interface of the apparatus, may be a transceiver circuit or a communications unit. The transceiver may alternatively be a communications interface or a transceiver circuit of the processor. Optionally, the transceiver may be a transceiver chip. The transceiver may further include a sending unit and/or a receiving unit. In a possible implementation, the transceiver may include at least one communications interface. In another possible implementation, the transceiver may alternatively be a unit implemented in a software form. In the embodiments of this application, the processor may interact with another unit or network element using the transceiver. For example, the processor obtains or receives content from another network element using the transceiver. If the processor and the transceiver are two physically separated components, the processor may exchange content with another unit of the apparatus without using the transceiver.

In a possible implementation, the processor, the memory, and the transceiver may be connected through a bus. The bus may be a peripheral component interconnect (PCI) bus, an Extended Industry Standard Architecture (EISA) bus, or the like. The bus may be classified into an address bus, a data bus, a control bus, and the like.

In the embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in an example manner.

In the embodiments of this application, for ease of understanding, examples are used for description. However, these examples are merely examples, and it does not mean that these examples are best implementations for implementing this application.

In the embodiments of this application, for ease of description, a request message, a response message, and names of various other messages are used. However, these messages are merely used as examples to describe content that needs to be carried or a function that needs to be implemented. Specific names of the messages constitute no limitation on this application. For example, the messages may be a first message, a second message, and a third message. These messages may be specific messages, or may be some fields in the messages. These messages may alternatively represent various service operations.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices that are configured to store information and/or another machine-readable medium. The term "machine-readable medium" may include but is not limited to a radio channel and various other media that can store, contain, and/or carry an instruction and/or data.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system comprising:
   a policy control network element configured to:
      send a request message comprising first identification information of a service, a service requirement of the service, and second identification information of a slice network when the service runs on the slice network wherein the second identification information comprises single network slice selection assistance information (S-NSSAI), and wherein the request message requests service experience information of the service;
      receive the service experience information; and
      adjust quality of service (QOS) parameter information based on the service experience information; and
   a data analytics network element configured to:
      receive the request message from the policy control network element; and
      send the service experience information to the policy control network element.

2. The system of claim 1, wherein the service requirement comprises a mean opinion score (MOS) value range requirement on the service.

3. The system of claim 1, wherein the policy control network element is further configured to:
   make a determination that the service experience information is lower than a preset condition; and
   further adjust the QoS parameter information in response to the determination.

4. A method comprising:
   receiving, by a data analytics network element and from a policy control network element, a request message comprising first identification information of a service, a service requirement of the service, and second identification information of a slice network when the service runs on the slice network, wherein the second identification information comprises single network slice selection assistance information (S-NSSAI), and wherein the request message requests service experience information of the service; and
   sending, by the data analytics network element and to the policy control network element, the service experience information for adjusting quality of service (QOS) parameter information.

5. The method of claim 4, wherein the request message further comprises time information, and wherein the service experience information corresponds to the time information.

6. The method of claim 4, wherein the service requirement comprises a mean opinion score (MOS) value range requirement on the service.

7. The method of claim 4, further comprising:
   obtaining, by the data analytics network element, a service experience model of the service; and
   obtaining, by the data analytics network element, the service experience information based on the service experience model of the service.

8. An apparatus comprising:
a memory configured to store instructions; and
one or more processors coupled to the memory and configured to execute the instructions to cause the apparatus to:
receive, from a policy control network element, a request message comprising first identification information of a service, a service requirement of the service, and second identification information of a slice network when the service runs on the slice network, wherein the second identification information comprises single network slice selection assistance information (S-NSSAI), and wherein the request message requests service experience information of the service; and
send, to the policy control network element, the service experience information for adjusting quality of service (QOS) parameter information.

9. The apparatus of claim 8, wherein the request message further comprises time information, and wherein the service experience information corresponds to the time information.

10. The apparatus of claim 8, wherein the service requirement comprises a mean opinion score (MOS) value range requirement on the service.

11. The apparatus of claim 8, wherein the one or more processors are further configured to execute the instructions to cause the apparatus to:
obtain a service experience model of the service; and
obtain the service experience information based on the service experience model of the service.

12. The system of claim 1, wherein the first identification information comprises an identifier corresponding to the service, a type of the service, or a name of the service.

13. The method of claim 4, further comprising:
receiving, by the policy control network element and from the data analytics network element, the service experience information; and
adjusting, by the policy control network element, quality of service (QOS) parameter information based on the service experience information.

14. The method of claim 13, further comprising:
making, by the policy control network element, a determination that the service experience information is lower than a preset condition; and
further adjusting, by the policy control network element, the QoS parameter information in response to the determination.

15. A computer program product comprising instructions that are stored on a non-transitory computer-readable medium and that, when executed by one or more processors, cause an apparatus to:
send, to a data analytics network element, a request message comprising first identification information of a service, a service requirement of the service, and second identification information of a slice network when the service runs on the slice network, wherein the second identification information comprises single network slice selection assistance information (S-NSSAI), and wherein the request message requests service experience information of the service; and
receive, from the data analytics network element, the service experience information; and
adjust quality of service (QOS) parameter information based on the service experience information.

16. The computer program product of claim 15, wherein the instructions, when executed by the one or more processors, further cause the apparatus to:
make a determination that the service experience information is lower than a preset condition; and
further adjust the QoS parameter information in response to the determination.

17. A computer program product comprising instructions that are stored on a non-transitory computer-readable medium and that, when executed by one or more processors, cause an apparatus to:
receive, from a policy control network element, a request message comprising identification information of a service, a service requirement of the service, and second identification information of a slice network when the service runs on the slice network, wherein the second identification information comprises single network slice selection assistance information (S-NSSAI), and wherein the request message requests service experience information of the service; and
send, to the policy control network element, the service experience information for adjusting quality of service (QOS) parameter information.

18. The computer program product of claim 17, wherein the request message further comprises time information, and wherein the service experience information corresponds to the time information.

19. The computer program product of claim 15, wherein the service requirement comprises a mean opinion score (MOS) value range requirement on the service.

20. The computer program product of claim 15, wherein the first identification information comprises an identifier corresponding to the service, a type of the service, or a name of the service.

21. A method comprising:
sending a request message comprising first identification information of a service, a service requirement of the service, and second identification information of a slice network when the service runs on the slice network, wherein the second identification information comprises single network slice selection assistance information (S-NSSAI), and wherein the request message requests service experience information of the service;
receiving the service experience information; and
adjusting quality of service (QOS) parameter information based on the service experience information.

22. The method of claim 21, wherein the service requirement comprises a mean opinion score (MOS) value range requirement on the service.

23. The method of claim 21, further comprising:
making a determination that the service experience information is lower than a preset condition; and
further adjusting the QoS parameter information in response to the determination.

24. A communication apparatus comprising:
one or more processors configured to execute instructions to cause the communication apparatus to:
send a request message comprising first identification information of a service, a service requirement of the service, and second identification information of a slice network when the service runs on the slice network, wherein the second identification information comprises single network slice selection assistance information (S-NSSAI), and wherein the request message requests service experience information of the service;
receive the service experience information; and
adjust quality of service (QOS) parameter information based on the service experience information.

25. The communication apparatus of claim 24, wherein the service requirement comprises a mean opinion score (MOS) value range requirement on the service.

26. The communication apparatus of claim 24, wherein the one or more processors are further configured to execute the instructions to cause the communication apparatus to:
- make a determination that the service experience information is lower than a preset condition; and
- further adjust the QoS parameter information in response to the determination.

* * * * *